(12) United States Patent
Bakalash et al.

(10) Patent No.: US 8,463,736 B2
(45) Date of Patent: *Jun. 11, 2013

(54) RELATIONAL DATABASE MANAGEMENT SYSTEM HAVING INTEGRATED NON-RELATIONAL MULTI-DIMENSIONAL DATA STORE OF AGGREGATED DATA ELEMENTS

(75) Inventors: Reuven Bakalash, Shdema (IL); Guy Shaked, Beer Sheva (IL); Joseph Caspi, Herzlyia (IL)

(73) Assignee: Yanicklo Technology Limited Liability Company, Wilmington, DE (US)

(*) Notice: Subject to any disclaimer, the term of this patent is extended or adjusted under 35 U.S.C. 154(b) by 8 days.

This patent is subject to a terminal disclaimer.

(21) Appl. No.: 12/384,093

(22) Filed: Mar. 31, 2009

(65) Prior Publication Data

US 2009/0271384 A1 Oct. 29, 2009

Related U.S. Application Data

(63) Continuation of application No. 11/473,299, filed on Jun. 22, 2006, now abandoned, which is a continuation of application No. 10/314,868, filed on Dec. 9, 2002, now Pat. No. 7,392,248, which is a continuation of application No. 10/136,937, filed on May 1, 2002, now abandoned, which is a continuation of application No. 09/634,748, filed on Aug. 9, 2000, now Pat. No. 6,385,604, which is a continuation-in-part of application No. 09/514,611, filed on Feb. 28, 2000, now Pat. No. 6,434,544, and a continuation-in-part of application No. 09/368,241, filed on Aug. 4, 1999, now Pat. No. 6,408,292.

(51) Int. Cl.
*G06F 17/30* (2006.01)

(52) U.S. Cl.
USPC ............... 707/600; 707/605; 707/769

(58) Field of Classification Search
USPC ............ 707/661, 602, 603, 802, 601, 605, 707/759, 770
See application file for complete search history.

(56) References Cited

U.S. PATENT DOCUMENTS

| | | | |
|---|---|---|---|
| 4,590,465 | A | 5/1986 | Fuchs |
| 4,598,400 | A | 7/1986 | Hillis |

(Continued)

FOREIGN PATENT DOCUMENTS

| | | |
|---|---|---|
| EP | 0 314 279 | 5/1989 |
| EP | 0 657 052 | 6/1995 |

(Continued)

OTHER PUBLICATIONS

Scheuermann, P., J. Shim and R. Vingralek "WATCHMAN: A Data Warehouse Intelligent Cache Manager", Proceedings of the 22nd International Conference on Very Large Databases (VLDB), 1996, pp. 51-62.*

(Continued)

*Primary Examiner* — Sherief Badawi
(74) *Attorney, Agent, or Firm* — Knobbe, Martens, Olson & Bear LLP

(57) ABSTRACT

Improved method of and apparatus for joining and aggregating data elements integrated within a relational database management system (RDBMS) using a non-relational multi-dimensional data structure (MDD). The improved RDBMS system of the present invention can be used to realize achieving a significant increase in system performance (e.g. decreased access/search time), user flexibility and ease of use. The improved RDBMS system of the present invention can be used to realize an improved Data Warehouse for supporting on-line analytical processing (OLAP) operations or to realize an improved informational database system or the like.

7 Claims, 25 Drawing Sheets

U.S. PATENT DOCUMENTS

| | | |
|---|---|---|
| 4,641,351 A | 2/1987 | Preston, Jr. |
| 4,685,144 A | 8/1987 | McCubbrey et al. |
| 4,814,980 A | 3/1989 | Peterson et al. |
| 4,868,733 A | 9/1989 | Fujisawa et al. |
| 4,985,834 A | 1/1991 | Cline et al. |
| 4,985,856 A | 1/1991 | Kaufman et al. |
| 4,987,554 A | 1/1991 | Kaufmann |
| 4,989,141 A | 1/1991 | Lyons et al. |
| 5,095,427 A | 3/1992 | Tanaka et al. |
| 5,101,475 A | 3/1992 | Kaufman et al. |
| 5,189,608 A | 2/1993 | Lyons et al. |
| 5,197,005 A | 3/1993 | Shwartz et al. |
| 5,202,985 A | 4/1993 | Goyal |
| 5,222,216 A | 6/1993 | Parish et al. |
| 5,222,237 A | 6/1993 | Hillis |
| 5,257,365 A | 10/1993 | Powers et al. |
| 5,278,966 A | 1/1994 | Parks et al. |
| 5,280,474 A | 1/1994 | Nickolls et al. |
| 5,293,615 A | 3/1994 | Amada |
| 5,297,265 A | 3/1994 | Frank et al. |
| 5,297,280 A * | 3/1994 | Potts et al. ............. 707/999.005 |
| 5,299,321 A | 3/1994 | Lizuka |
| 5,307,484 A | 4/1994 | Baker et al. |
| 5,359,724 A | 10/1994 | Earle |
| 5,361,385 A | 11/1994 | Bakalash |
| 5,379,419 A | 1/1995 | Heffernan et al. |
| 5,381,518 A | 1/1995 | Drebin et al. |
| 5,386,556 A | 1/1995 | Hedin et al. |
| 5,404,506 A | 4/1995 | Fujisawa et al. |
| 5,410,693 A | 4/1995 | Yu et al. |
| 5,519,859 A | 5/1996 | Grace |
| 5,553,226 A | 9/1996 | Kiuchi et al. |
| 5,555,408 A | 9/1996 | Fujisawa et al. |
| 5,696,916 A | 12/1997 | Yamazaki et al. |
| 5,706,495 A | 1/1998 | Chadha et al. |
| 5,706,503 A | 1/1998 | Poppen et al. |
| 5,721,910 A | 2/1998 | Unger et al. |
| 5,742,806 A | 4/1998 | Reiner et al. |
| 5,745,764 A * | 4/1998 | Leach et al. ................. 719/316 |
| 5,751,928 A | 5/1998 | Bakalash |
| 5,761,652 A | 6/1998 | Wu et al. |
| 5,765,028 A | 6/1998 | Gladden |
| 5,767,854 A | 6/1998 | Anwar |
| 5,781,896 A * | 7/1998 | Dalal ..................... 707/999.001 |
| 5,794,228 A | 8/1998 | French et al. |
| 5,794,229 A | 8/1998 | French et al. |
| 5,794,246 A | 8/1998 | Sankaran et al. |
| 5,799,300 A | 8/1998 | Agrawal et al. |
| 5,805,885 A * | 9/1998 | Leach et al. ................. 719/316 |
| 5,822,751 A * | 10/1998 | Gray et al. ............................. 1/1 |
| 5,832,475 A | 11/1998 | Agrawal et al. |
| 5,848,424 A * | 12/1998 | Scheinkman et al. ........ 715/210 |
| 5,850,547 A | 12/1998 | Waddington et al. |
| 5,852,819 A | 12/1998 | Beller |
| 5,852,821 A | 12/1998 | Chen et al. |
| 5,857,184 A * | 1/1999 | Lynch .................... 707/999.001 |
| 5,864,857 A | 1/1999 | Ohata et al. |
| 5,867,501 A | 2/1999 | Horst et al. |
| 5,884,299 A | 3/1999 | Ramesh et al. |
| 5,890,151 A | 3/1999 | Agrawal et al. |
| 5,890,154 A | 3/1999 | Hsiao et al. |
| 5,901,287 A | 5/1999 | Bull et al. |
| 5,905,985 A * | 5/1999 | Malloy et al. ........................ 1/1 |
| 5,915,257 A | 6/1999 | Gartung et al. |
| 5,918,225 A | 6/1999 | White et al. |
| 5,918,232 A * | 6/1999 | Pouschine et al. .................... 1/1 |
| 5,926,818 A * | 7/1999 | Malloy ................... 1/1 |
| 5,926,820 A | 7/1999 | Agrawal et al. |
| 5,937,410 A | 8/1999 | Shen |
| 5,940,818 A * | 8/1999 | Malloy et al. ........................ 1/1 |
| 5,940,822 A | 8/1999 | Haderle et al. |
| 5,943,668 A * | 8/1999 | Malloy et al. ........................ 1/1 |
| 5,943,677 A | 8/1999 | Hicks |
| 5,946,692 A | 8/1999 | Faloutsos et al. |
| 5,946,711 A | 8/1999 | Donnelly |
| 5,963,212 A | 10/1999 | Bakalash |
| 5,963,936 A | 10/1999 | Cochrane et al. |
| 5,974,416 A | 10/1999 | Anand et al. |
| 5,978,788 A | 11/1999 | Castelli et al. |
| 5,978,796 A * | 11/1999 | Malloy et al. ........................ 1/1 |
| 5,987,467 A | 11/1999 | Ross et al. |
| 5,990,892 A | 11/1999 | Urbain |
| 5,991,754 A | 11/1999 | Raitto et al. |
| 5,999,192 A | 12/1999 | Selfridge et al. |
| 6,003,024 A | 12/1999 | Bair et al. |
| 6,003,029 A | 12/1999 | Agrawal et al. |
| 6,003,036 A | 12/1999 | Martin |
| 6,006,216 A | 12/1999 | Griffin et al. |
| 6,009,432 A | 12/1999 | Tarin |
| 6,014,670 A | 1/2000 | Zamanian et al. |
| 6,023,695 A | 2/2000 | Osborn et al. |
| 6,034,697 A | 3/2000 | Becker |
| 6,041,103 A | 3/2000 | LePorta et al. |
| 6,047,323 A | 4/2000 | Krause |
| 6,064,999 A | 5/2000 | Dalal |
| 6,073,140 A | 6/2000 | Morgan et al. |
| 6,078,918 A | 6/2000 | Allen et al. |
| 6,078,924 A | 6/2000 | Ainsbury et al. |
| 6,078,994 A | 6/2000 | Carey |
| 6,094,651 A | 7/2000 | Agrawal et al. |
| 6,108,647 A | 8/2000 | Poosala et al. |
| 6,115,705 A | 9/2000 | Larson |
| 6,115,714 A | 9/2000 | Gallagher et al. |
| 6,122,628 A | 9/2000 | Castelli et al. |
| 6,122,636 A | 9/2000 | Malloy et al. |
| 6,125,624 A | 10/2000 | Prociw |
| 6,134,541 A | 10/2000 | Castelli et al. |
| 6,141,655 A | 10/2000 | Johnson et al. |
| 6,151,584 A | 11/2000 | Papierniak et al. |
| 6,151,601 A | 11/2000 | Papierniak et al. |
| 6,154,766 A | 11/2000 | Yost et al. |
| 6,161,103 A | 12/2000 | Rauer et al. |
| 6,163,774 A | 12/2000 | Lore et al. |
| 6,167,396 A | 12/2000 | Lokken |
| 6,173,310 B1 | 1/2001 | Yost et al. |
| 6,182,060 B1 | 1/2001 | Hedgcock et al. |
| 6,182,061 B1 | 1/2001 | Matsuzawa et al. |
| 6,182,062 B1 | 1/2001 | Fujisawa et al. |
| 6,189,004 B1 | 2/2001 | Rasen et al. |
| 6,199,063 B1 | 3/2001 | Colby et al. |
| 6,205,447 B1 | 3/2001 | Malloy |
| 6,208,975 B1 | 3/2001 | Bull et al. |
| 6,209,036 B1 | 3/2001 | Aldred et al. |
| 6,212,515 B1 | 4/2001 | Rogers |
| 6,212,524 B1 | 4/2001 | Weissman et al. |
| 6,212,617 B1 | 4/2001 | Hardwick |
| 6,219,654 B1 | 4/2001 | Ruffin |
| 6,223,573 B1 | 5/2001 | Grewal et al. |
| 6,226,647 B1 | 5/2001 | Venkatasu-bramanian et al. |
| 6,249,791 B1 | 6/2001 | Osborn et al. |
| 6,256,676 B1 | 7/2001 | Taylor et al. |
| 6,260,050 B1 | 7/2001 | Yost et al. |
| 6,269,393 B1 | 7/2001 | Yost et al. |
| 6,275,818 B1 | 8/2001 | Subramanian et al. |
| 6,282,544 B1 | 8/2001 | Tse et al. |
| 6,282,546 B1 | 8/2001 | Gleichauf et al. |
| 6,285,994 B1 | 9/2001 | Bui et al. |
| 6,289,334 B1 | 9/2001 | Reiner et al. |
| 6,289,352 B1 | 9/2001 | Proctor |
| 6,301,579 B1 | 10/2001 | Becker |
| 6,317,750 B1 | 11/2001 | Tortolani et al. |
| 6,321,206 B1 | 11/2001 | Honarvar |
| 6,321,241 B1 | 11/2001 | Gartung et al. |
| 6,324,533 B1 | 11/2001 | Agrawal et al. |
| 6,324,623 B1 | 11/2001 | Carey |
| 6,330,564 B1 | 12/2001 | Hellerstein et al. |
| 6,332,130 B1 | 12/2001 | Notani et al. |
| 6,339,775 B1 | 1/2002 | Zamanian et al. |
| 6,356,900 B1 | 3/2002 | Egilsson et al. |
| 6,363,353 B1 | 3/2002 | Chen |
| 6,363,393 B1 | 3/2002 | Ribitzky |
| 6,366,905 B1 | 4/2002 | Netz |
| 6,366,922 B1 | 4/2002 | Althoff |
| 6,374,234 B1 | 4/2002 | Netz |
| 6,374,263 B1 | 4/2002 | Bunger et al. |
| 6,377,934 B1 | 4/2002 | Chen et al. |
| 6,381,605 B1 | 4/2002 | Kothuri et al. |

| Patent No. | Date | Inventor | Ref |
|---|---|---|---|
| 6,385,301 B1 | 5/2002 | Nolting et al. | |
| 6,385,604 B1 * | 5/2002 | Bakalash et al. | 707/999.003 |
| 6,397,195 B1 | 5/2002 | Pinard et al. | |
| 6,401,117 B1 | 6/2002 | Narad et al. | |
| 6,405,173 B1 | 6/2002 | Honarvar et al. | |
| 6,405,207 B1 | 6/2002 | Petculescu et al. | |
| 6,405,208 B1 | 6/2002 | Raghavan et al. | |
| 6,408,292 B1 * | 6/2002 | Bakalash et al. | 707/999.002 |
| 6,411,313 B1 | 6/2002 | Conlon et al. | |
| 6,411,681 B1 | 6/2002 | Nolting et al. | |
| 6,411,961 B1 | 6/2002 | Chen et al. | |
| 6,418,427 B1 | 7/2002 | Egilsson et al. | |
| 6,418,450 B2 | 7/2002 | Daudenarde | |
| 6,421,730 B1 | 7/2002 | Narad et al. | |
| 6,424,972 B1 | 7/2002 | Berger et al. | |
| 6,424,979 B1 | 7/2002 | Livingston et al. | |
| 6,430,545 B1 | 8/2002 | Honarvar et al. | |
| 6,430,547 B1 | 8/2002 | Busche et al. | |
| 6,434,544 B1 * | 8/2002 | Bakalash et al. | 707/999.002 |
| 6,434,557 B1 | 8/2002 | Egilsson et al. | |
| 6,438,537 B1 | 8/2002 | Netz et al. | |
| 6,441,834 B1 * | 8/2002 | Agassi et al. | 715/764 |
| 6,442,269 B1 | 8/2002 | Ehrlich et al. | |
| 6,442,560 B1 | 8/2002 | Berger et al. | |
| 6,446,059 B1 | 9/2002 | Berger et al. | |
| 6,446,061 B1 | 9/2002 | Doerre et al. | |
| 6,453,322 B1 | 9/2002 | DeKimpe et al. | |
| 6,456,999 B1 | 9/2002 | Netz | |
| 6,460,026 B1 | 10/2002 | Pasumansky | |
| 6,460,031 B1 | 10/2002 | Wilson et al. | |
| 6,470,344 B1 | 10/2002 | Kothuri et al. | |
| 6,473,750 B1 | 10/2002 | Petculescu et al. | |
| 6,473,764 B1 | 10/2002 | Petculescu et al. | |
| 6,477,536 B1 | 11/2002 | Pasumansky et al. | |
| 6,480,842 B1 * | 11/2002 | Agassi et al. | 707/999.004 |
| 6,480,848 B1 | 11/2002 | DeKimpe et al. | |
| 6,480,850 B1 | 11/2002 | Veldhuisen | |
| 6,484,179 B1 * | 11/2002 | Roccaforte | 707/737 |
| 6,487,547 B1 | 11/2002 | Ellison et al. | |
| 6,493,718 B1 | 12/2002 | Petculescu et al. | |
| 6,493,723 B1 | 12/2002 | Busche | |
| 6,493,728 B1 | 12/2002 | Berger | |
| 6,510,457 B1 | 1/2003 | Ayukawa et al. | |
| 6,513,019 B2 | 1/2003 | Lewis | |
| 6,532,458 B1 | 3/2003 | Chaudhuri et al. | |
| 6,532,459 B1 | 3/2003 | Chaudhuri et al. | |
| 6,535,866 B1 | 3/2003 | Iwadate | |
| 6,535,868 B1 | 3/2003 | Galeazzi et al. | |
| 6,535,872 B1 | 3/2003 | Castelli et al. | |
| 6,542,886 B1 | 4/2003 | Chaudhuri et al. | |
| 6,542,895 B1 | 4/2003 | DeKimpe et al. | |
| 6,545,589 B1 | 4/2003 | Fuller et al. | |
| 6,546,395 B1 | 4/2003 | DeKimpe et al. | |
| 6,546,545 B1 | 4/2003 | Honarvar et al. | |
| 6,549,907 B1 | 4/2003 | Fayyad et al. | |
| 6,557,008 B1 | 4/2003 | Temple et al. | |
| 6,560,594 B2 | 5/2003 | Cochrane et al. | |
| 6,567,796 B1 | 5/2003 | Yost et al. | |
| 6,567,814 B1 | 5/2003 | Bankier et al. | |
| 6,581,054 B1 | 6/2003 | Bogrett | |
| 6,581,068 B1 | 6/2003 | Bensoussan et al. | |
| 6,587,547 B1 | 7/2003 | Zirngibl et al. | |
| 6,587,857 B1 | 7/2003 | Carothers et al. | |
| 6,594,672 B1 * | 7/2003 | Lampson et al. | 1/1 |
| 6,601,034 B1 | 7/2003 | Honarvar et al. | |
| 6,601,062 B1 | 7/2003 | Deshpande | |
| 6,604,135 B1 | 8/2003 | Rogers et al. | |
| 6,606,638 B1 | 8/2003 | Tarin | |
| 6,609,120 B1 | 8/2003 | Honarvar et al. | |
| 6,615,096 B1 | 9/2003 | Durrant et al. | |
| 6,628,312 B1 | 9/2003 | Rao et al. | |
| 6,629,094 B1 | 9/2003 | Colby | |
| 6,633,875 B2 | 10/2003 | Brady | |
| 6,636,870 B2 * | 10/2003 | Roccaforte | 707/999.002 |
| 6,643,608 B1 | 11/2003 | Hershey et al. | |
| 6,643,661 B2 | 11/2003 | Polizzi et al. | |
| 6,662,174 B2 | 12/2003 | Shah et al. | |
| 6,665,682 B1 | 12/2003 | DeKimpe et al. | |
| 6,671,715 B1 | 12/2003 | Langseth et al. | |
| 6,677,963 B1 | 1/2004 | Mani et al. | |
| 6,678,674 B1 | 1/2004 | Saeki | |
| 6,691,118 B1 | 2/2004 | Gongwer et al. | |
| 6,691,140 B1 | 2/2004 | Bogrett | |
| 6,694,316 B1 | 2/2004 | Langseth et al. | |
| 6,707,454 B1 | 3/2004 | Barg et al. | |
| 6,708,155 B1 | 3/2004 | Honarvar et al. | |
| 6,732,115 B2 | 5/2004 | Shah et al. | |
| 6,738,975 B1 | 5/2004 | Yee et al. | |
| 6,748,394 B2 | 6/2004 | Shah et al. | |
| 6,763,357 B1 | 7/2004 | Deshpande et al. | |
| 6,766,325 B1 | 7/2004 | Pasumansky et al. | |
| 6,775,674 B1 * | 8/2004 | Agassi et al. | 707/999.001 |
| 6,778,996 B2 * | 8/2004 | Roccaforte | 707/600 |
| 6,801,908 B1 | 10/2004 | Fuloria et al. | |
| 6,816,854 B2 | 11/2004 | Reiner et al. | |
| 6,826,593 B1 | 11/2004 | Acharya et al. | |
| 6,832,263 B2 | 12/2004 | Polizzi et al. | |
| 6,836,894 B1 | 12/2004 | Hellerstein et al. | |
| 6,842,758 B1 | 1/2005 | Bogrett | |
| 6,867,788 B1 | 3/2005 | Takeda | |
| 6,898,603 B1 | 5/2005 | Petculescu et al. | |
| 6,934,687 B1 | 8/2005 | Papierniak et al. | |
| 6,947,934 B1 | 9/2005 | Chen et al. | |
| 7,096,219 B1 | 8/2006 | Karch | |
| 7,315,849 B2 * | 1/2008 | Bakalash et al. | 707/999.002 |
| 7,333,982 B2 * | 2/2008 | Bakalash et al. | 707/600 |
| 7,392,248 B2 * | 6/2008 | Bakalash et al. | 707/999.005 |
| 7,529,730 B2 | 5/2009 | Potter et al. | |
| 7,778,899 B2 | 8/2010 | Scumniotales et al. | |
| 7,853,508 B2 | 12/2010 | Scumniotales et al. | |
| 8,041,670 B2 | 10/2011 | Bakalash et al. | |
| 8,170,984 B2 | 5/2012 | Bakalash et al. | |
| 8,195,602 B2 | 6/2012 | Bakalash et al. | |
| 2001/0013030 A1 * | 8/2001 | Colby et al. | 707/1 |
| 2001/0018684 A1 * | 8/2001 | Mild et al. | 707/1 |
| 2001/0047355 A1 * | 11/2001 | Anwar | 707/5 |
| 2002/0016924 A1 | 2/2002 | Shah et al. | |
| 2002/0023122 A1 | 2/2002 | Polizzi et al. | |
| 2002/0029207 A1 * | 3/2002 | Bakalash et al. | 707/1 |
| 2002/0038229 A1 | 3/2002 | Shah et al. | |
| 2002/0038297 A1 | 3/2002 | Shah et al. | |
| 2002/0077997 A1 * | 6/2002 | Colby et al. | 707/1 |
| 2002/0091707 A1 * | 7/2002 | Keller | 707/104.1 |
| 2002/0099692 A1 | 7/2002 | Shah et al. | |
| 2002/0129003 A1 * | 9/2002 | Bakalash et al. | 707/1 |
| 2002/0129032 A1 * | 9/2002 | Bakalash et al. | 707/101 |
| 2002/0143783 A1 * | 10/2002 | Bakalash et al. | 707/100 |
| 2002/0184187 A1 * | 12/2002 | Bakalash et al. | 707/1 |
| 2002/0194167 A1 * | 12/2002 | Bakalash et al. | 707/3 |
| 2003/0018642 A1 * | 1/2003 | Bakalash et al. | 707/10 |
| 2003/0055832 A1 * | 3/2003 | Roccaforte | 707/100 |
| 2003/0200221 A1 * | 10/2003 | Bakalash et al. | 707/100 |
| 2003/0208503 A1 * | 11/2003 | Roccaforte | 707/101 |
| 2003/0217079 A1 * | 11/2003 | Bakalash et al. | 707/200 |
| 2003/0225736 A1 * | 12/2003 | Bakalash et al. | 707/1 |
| 2003/0225752 A1 * | 12/2003 | Bakalash et al. | 707/3 |
| 2003/0229652 A1 * | 12/2003 | Bakalash et al. | 707/200 |
| 2004/0073566 A1 | 4/2004 | Trivedi | |
| 2004/0236655 A1 | 11/2004 | Scumniotales et al. | |
| 2004/0243607 A1 * | 12/2004 | Tummalapalli | 707/100 |
| 2004/0247105 A1 | 12/2004 | Mullis et al. | |
| 2005/0038799 A1 | 2/2005 | Jordan et al. | |
| 2005/0055329 A1 * | 3/2005 | Bakalash et al. | 707/1 |
| 2005/0060325 A1 * | 3/2005 | Bakalash et al. | 707/100 |
| 2005/0060326 A1 * | 3/2005 | Bakalash et al. | 707/100 |
| 2005/0065940 A1 * | 3/2005 | Bakalash et al. | 707/100 |
| 2005/0076067 A1 * | 4/2005 | Bakalash et al. | 707/200 |
| 2005/0091237 A1 * | 4/2005 | Bakalash et al. | 707/100 |
| 2005/0114243 A1 | 5/2005 | Scumniotales et al. | |
| 2005/0149491 A1 * | 7/2005 | Bakalash et al. | 707/2 |
| 2007/0192295 A1 | 8/2007 | Bakalash et al. | |
| 2007/0233644 A1 * | 10/2007 | Bakalash et al. | 707/2 |
| 2008/0016043 A1 * | 1/2008 | Bakalash et al. | 707/3 |
| 2008/0016057 A1 * | 1/2008 | Bakalash et al. | 707/5 |
| 2008/0021864 A1 * | 1/2008 | Bakalash et al. | 707/1 |
| 2008/0021893 A1 * | 1/2008 | Bakalash et al. | 707/4 |
| 2008/0021915 A1 * | 1/2008 | Bakalash et al. | 707/101 |
| 2008/0059415 A1 * | 3/2008 | Bakalash et al. | 707/2 |

| | | | |
|---|---|---|---|
| 2008/0211817 | A1* | 9/2008 | Bakalash et al. ............... 345/505 |
| 2009/0076983 | A1 | 3/2009 | Scumniotales et al. |
| 2009/0077107 | A1 | 3/2009 | Scumniotales et al. |
| 2009/0271379 | A1 | 10/2009 | Bakalash et al. |
| 2009/0271384 | A1 | 10/2009 | Bakalash et al. |
| 2009/0276410 | A1 | 11/2009 | Bakalash et al. |
| 2010/0042645 | A1 | 2/2010 | Bakalash et al. |
| 2010/0063958 | A1 | 3/2010 | Bakalash et al. |
| 2010/0100558 | A1 | 4/2010 | Bakalash et al. |
| 2010/0185581 | A1 | 7/2010 | Bakalash et al. |
| 2012/0089563 | A1 | 4/2012 | Bakalash et al. |
| 2012/0089564 | A1 | 4/2012 | Bakalash et al. |

FOREIGN PATENT DOCUMENTS

| | | |
|---|---|---|
| EP | 0 743 609 | 11/1996 |
| EP | 0336 584 | 2/1997 |
| EP | 0 869 444 | 10/1998 |
| EP | 1 266 308 | 12/2002 |
| JP | 9-265479 | 10/1997 |
| JP | 2001-565050 | 2/2001 |
| WO | WO 91/19269 | 12/1991 |
| WO | WO 94/004991 | 3/1994 |
| WO | WO 95/08794 | 3/1995 |
| WO | WO 98/22908 | 5/1998 |
| WO | WO 9822908 A1 * | 5/1998 |
| WO | WO 98/40829 | 9/1998 |
| WO | WO 98/49636 | 11/1998 |
| WO | WO 99/09492 | 2/1999 |
| WO | WO 01/11497 | 2/2001 |
| WO | WO 01/67303 | 9/2001 |

OTHER PUBLICATIONS

Mumick, I.S., D. Quass and B.S. Mumick "Maintenance of Data Cubes and Summary Tables in a Data Warehouse", ACM SIGMOD Record, vol. 26, No. 2, Jun. 1997, pp. 100-111.*
Kotidis, Y. and N. Roussopoulos "DynaMat: A Dynamic View Management System for Data Warehouses", Proceedings of ACM SIGMOD International Conference on Management of Data, Jun. 1-3, 1999.*
Comp.databases' website re Access DBMS? Not RDBMS? Jun. 1994.
Rana, et al., A Distributed Framework for Parallel Data Mining Using HP Java, BT technol J vol. 17 No. 3 Jul. 1999.
Rana, et al., A Distributed Framework for Parallel Data Mining Using HP Java, BT technol J vol. 17 No. 3 Jul. 1999. pp. 146-154.
Schumacher, Robin. BrioOuery Enterprise 4.0; Brio Technology's desktop OLAP tool, lexis.com; DBMS Magazine, vol. 9, No. 10, Sep. 1996.
Michael, J., et al. DM Review's website re Charles Schwab Plans for Continued Prosperity with Seagate Holos Oct. 1998.
Craig, Robert. Checking out OLAP Architectures; Technology Information.lexis, vol. 2, No. 12, Aug. 20, 1997.
Craig, Robert: "Checking Out OLAP Architectures: Technology Information", a Boucher Communications, Inc. publication, Section No. 12, nol. 2; 1997; p. 40, ISSN: 1085-2395.
Spitzer, Tom. Component architectures; component-based software development; technology information, Lexis, DBMS Magazine, vol. 10, No. 10, Sep. 1997.
Winter, R., Intelligent Enterprise's website re Databases: Back in the OLAP Game, vol. 1, No. 4, Dec. 15, 1998.
Kurz, Andreas, A Min Tjoa, Data Warehousing within Intranet: Prototype of a Web-based Executive Information System, Abstract, 1997.
Kurz, Andreas, A Min Tjoa, Data Warehousing within Intranet: Prototype of a Web-based Executive Information System, Abstract, 1997. pp. 627-632.
Elkins, S.B.. Islands of OLAP, DBMS Magazine, Apr. 1998.
Mckie, S., dbmsmag's website re What's New in 4.0, DBMS Magazine, Jul. 1996.
Bontempo et al., The IBM Data Warehouse Architecture, Communications of the ACM (vol. 41 No. 9), Sep. 1998.
Bontempo et al., The IBM Data Warehouse Architecture, Communications of the ACM (vol. 41 No. 9), Sep. 1998. pp. 38-48.

Davis, Judith. IBM's DB2 Spatial Extender: Managing Geo-Spatial Information Within the DBMS, IBM corporation, May 1998.
Information Builders Intros "Fusion" MODS Warehouse; Post Newsweek Business Information Inc. Lexis, May 16, 1996.
Chen et al., OLAP-Based Scalable Profiling of Customer Behavior, Abstract, 1999.
Chen et al., OLAP-Based Scalable Profiling of Customer Behavior, Abstract, DaWak '99 LNCS 1676 pp. 55-64 1999.
Pendse, N., The OLAP Report's website OLAP Architectures, 2005.
Pendse, N., The OLAP Report's website OLAP Architectures, Feb. 11, 2005.
Greenberg, Ilan. OLAP or ROLAP, InfoWorld, Jun. 10, 1996.
Pendse N. The OLAP Report's website re Database Explosion, 1998.
Pendse, N. The OLAP Report's website re Database Explosion, Oct. 18, 1998.
Comp.databases' website re OLAP Storage Algorithms, 1997.
Comp.databases' website re OLAP Storage Algorithms, Comp. databases.olap newsgroup thread Apr. 1, 1997.
Biggs, Maggie. Pilot lands Impressive OLAP Suite, Product Reviews, Infoworld, vol. 20, No. 36, Sep. 7, 1998.
Codd et al., Providing OLAP to User-Analysts: An IT Mandate. Hyperion Solutions Corporation 1993.
Harrington, et al.: "Relational Database Design Clearly Explained", 1998, p. v-xiii, 1-62, Morgan Kaufman.
Blgate.c1's website re Seagate Holos Roadmap 1997.
Yoshizawa et al., Sal Based Association Rule Mining Using Commercial RDBMS (IBM DB2 UDB EEE) Abstract, 2000.
Yoshizawa et al., SQL Based Association Rule Mining Using Commericial RDBMS (IBM DB2 UDB EEE) Da Wak 2000 LNCS 1874 pp. 301-306 2000.
Spinner, Karen. Unlocking the Data Warehouse with OLAP, Wall Street & Technology, vol. 15, No. 1, Jan. 1, 1997, p. PD18.
Taylor, The Warehouse Meets the Web, The Data Administration Newsletter (Mar. 21, 2005).
Nadeau et al., Achieving Scalability in OLAP Materialized View Selection (Extended Version), (2002).
Nadeau et al., Achieving Scaboloty in OLAP Materialized View Selection (Extended Version, (2002) Proceedings of DOLAP '02 Nov. 8, 2002.
Whitney, R. Windows IT Pro Website p. re: SOL Server Analysis Services 8.0, May 2000.
Radsen, Boost Warehouse Performance Technology Tutorial Part II (2002).
Rowe et al., Data Abstration, Views and Updates in Rigel (1979).
Rowe, et al., "Data Abstraction, Views and Updates in Rigel", Proceedings of the 1979 ACM SIGMOD International Conference on Management of Data, pp. 71-81, 1979.
Graefe, DataCube: An Integrated Data and Compute Server Based on a Hypercube—Connected Dataflow Database Machine, Oregon Graduate Center (Jul. 1988).
Berson, et al, Data Warehousing, Data Mining, and OLAP, McGraw-Hill Companies, 1997, pp. 104-107.
Berson and Smith, Data Warehousing, Data Mining, and OLAP, McGraw-Hill Companies, 1997, pp. 98-100.
Watterson, K. Windows IT Pro Website p. re: DB2 OLAP Server 1.0, Sep. 1998.
Kalman, D. et al., DBMS Online's website re Sybase Inco's Dennis McEvoy—System 11 Strategy, Oct. 1995.
Mohan, DWMS: Data Warehousing Management System, Software AG of Far East, Inc., Proceedings of the 22nd VLDB Conference, 1996, pp. 588.
Sbt's website re Data Management—A Bedtime Story for Database Managers 1990.
Data Sheet—Designed and Optimized for Business—Critical Data Warehousing, Informix Red Brick Warehouse 1999.
Website re Introduction to OLE DB for OLAP, 2005.
Microsoft website re Introduction to OLE DB for OLAP 2005.
Lau., Microsoft SQL Server 7.0 Performance Tuning Guide, SQL7 performance tuning.doc, Oct. 1998.
Lyco's website re prices on Microsoft SQL Server 7.0 for PC Sep. 11, 2005.
Gimarc and Spellman., Modeling Microsoft SQL Server 7.0, Abstract—SES Proceedings of CMG '98, 6-11, Dec. 1998.

Andrews, D. byte's website re Jeff Stamen, senior vice president of Oracle's OLAP division, discusses the convergence of multidimensional and relational OLAP databases, Aug. 1996.

Margaritis et al., Netcube: A Scalable Tool for Fast Data Mining and Compression, Abstract—Carnegie Mellon University, Proceedings of the 27th VLDB Conference 2001.

Pfeiff, B., Windowsitpro's website re OLAP: Resistance, is Futile!, Apr. 1999.

Database olap's website re OLAP with Regression Analysis, Built for Analysts? Jun. 1990.

Brain, J. comp.databases.olap's newsgroup thread databases.olapss website re OLAP with Regression Analysis, Built for Analysts? Jun. 17, 1996.

Elkins., Open OLAP, DBMS, Apr. 1998.

Elkins., Open OLAP, DBMS, Apr. 1998, http://www.dbmsmag.com/9804d14.html, pp. 1-7.

Endress., Oracle 9i OLAP Release 2: A Relational-Multidimensional Database for Business Intelligence, Oracle Apr. 2001.

Oracle Express Relational Access Manager, A Source—Transparent Decision Support Solution 1998.

Oracle Express Server, Enhanced Corporate Performance 1998.

White Paper—Delivering OLAP to the Enterprise. Oracle Jan. 1997.

Databases.olap's website re Oracle for reporting?, Nov. 2002.

Comp.databases.olap newsgroup thread databases.olap's website re Oracle for reporting? Nov. 7, 2002. PartitiemAggregatiorms7.txt. PartitionAggregationss7.txt May 11, 2005.

Lexis—Red Brick Accrue to embed Red Brick Warehouse RDMS in online user response analysis system, M2 Presswire Dec. 11, 1996.

Colby, et al.: "Red Brick Vista™: Aggregate Computation and Management", Data Engineering, 1998. Proceedings, 14th International Conference on Orlando, FL, USA Feb. 23-27, 1998, Los Alamitos, CA USA, IEEE Comput. Soc, US, Feb. 23, 1998, pp. 174-177.

DBMS online's website re Red Brick Warehouse 5.1, Relational data warehousing and data mining are reaching new heights, Jun. 1998.

Rennhackkamp, J, DBMS online's website re Red Brick Warehouse 5.1, Relational data warehousing and data mining are reaching new heights Jun. 1998.

White Paper—Extending the Scale, Reach, and Range of Your Data Warehouse, Next-Generation Data Warehousing, Sybase Interactive Warehouse 1997.

DBMSmag's website re A Black Eye Heals as Sybase System 11 Recovers from Performance and Quality Problems in System 10, Nov. 1996.

DBMSmag's website re A Black Eye Heals as Sybase System 11 Recovers from Performance and Quality Problems in System 10, DMBS Magazine Nov. 1996.

Rennhackkamp, M. DBMSmag's website re A Black Eye Heals as Sybase 11Recovers from Performance and Quality Problems in System Nov. 10, 1996.

DBMS online's website re An Interactive Warehousing Architecture Can Extend the Scale of Your Information, Aug. 1997.

DBMS online's website re An Interactive Warehousing Architecture Can Extend the Scale of Your Information, DMBS Magazine, Aug. 1997.

Rennhackkamp, M. DBMS online's website re An Interactive Warehousing Architecture Can Extend the Scale of Your Information Aug. 1997.

Lexis—The Informix Enterprise Strategy, Information Access Company, DBMS Magazine, vol. 9, No. 7, p. 42, Jun. 1996.

Lexis—The Informix Enterprise Strategy, Information Access Company, a Thomson Corporation.

McKie, S.—The Informix Enterprise Strategy, Information Access Company, DBMS Magazine vol. 9 No. 7 p. 42 Jun. 1996.

McKie, S.—The Informix Enterprise Strategy, Information Access Company, A Thomson Corporation, DBMS Magazine vol. 9 No. 7 p. 42 Jun. 1996.

Campbell, The New locking, logging, and Recover Architecture of Microsoft SQL Server 7.0, Microsoft Corporation, Proceeding of the 25th VLDB Conference, 1999.

Campbell, The New locking, Logging, and Recover Architecture of Microsoft SQL Server 7.0, Microsoft Corporation, Proceeding of the 25th VLDB Conference, 1999 p. 249.

Rigney, T., DBMS online's website re The Sybase Enterprise, May 1996.

Raden, Worlds in Collision, Merging Business and IT Architecture Perspectives to Evaluate Query and Analysis Tools Successfully, DBMS Magazine, Aug. 1997.

Nadeau & Teorey, Achieving Scalability in OLAP Materialized View Selection, DOLAP 02.

Nadeau & Teorey, Achieving Scalability in OLAP Materialized View Selection, DOLAP 02 Nov. 8, 2002.

Buzydlowski et al., A Framework for Object-Oriented On-Line Analytic Processing, Abstract—DOLAP Proceedings of DOLAP '98, 1998.

Buzydlowski et al., A Framework for Object-Oriented On-Line Analytic Processing, Abstract—DOLAP Proceedings of DOLAP '98, Nov. 7, 1998, pp. 10-15.

Buzydlowski et al., A Framework for Object-Oriented On-Line Analytic Processing, Abstract—DOLAP, 1998.

Liu and Ursu, A Framework for Global Optimization of Aggregate Queries, Abstract—CIKM, 1997.

Liu and Ursu, A Framework for Global Optimization of Aggregate Queries, Abstract—CIKM Proceedings of CIKM '97, 1997, 1997.

Liu and Ursu, A Framework for Global Optimization of Aggregate Queries, Abstract—CIKM Proceedings of CIKM '97, pp. 262-269.

Mangisengi., A Multidimensional Modeling Approach for OLAP within the Framework of the Relational Model Based on Quotient Relations, Abstract—DOLAP, 1998.

Mangisengi., A Multidimensional Modeling Approach for OLAP within the Framework of the Relational Model Based on Quotient Relations, Abstract—DOLAP Proceedings of DOLAP '98, 1998.

Mangisengi., A Multidimensional Modeling Approach for OLAP within the Framework of the Relational Model Based on Quotient Relations, Abstract—DOLAP Proceedings of DOLAP '98, pp. 40-46.

Trujillo et al., An Object Oriented Approach to Multidimensional Database Conceptual Modeling (OOMD), Abstract—DOLAP, 1999.

Trujillo et al, An Object Oriented Approach to Multidimensional Database Conceptual Modeling (OOMD), Abstract—DOLAP Proceedings of DOLAP '98 1999.

Trujillo et al, An Object Oriented Approach to Multidimensional Database Conceptual Modeling (OOMD), Abstract—DOLAP Proceedings of DOLAP '98, pp. 16-21.

Bose and Sugumaran., Application of Intelligent Agent Technology for Managerial Data Analysis and Mining, Abstract—Data Base, The Data Base for Advances in Information Systems, vol. 30, No. 1, Winter 1999.

Bose and Sugumaran., Application of Intelligent Agent Technology for Managerial Data Analysis and Mining, Abstract—Data Base, The Data Base for Advances in Information Systems, vol. 30, No. 1, Winter 1999 pp. 77-94.

Damiani and Bottarelli, A Terminological Approach to Business Domain Modeling, Abstract—EEC Proceedings of the International Conference on Database and Expert Systems 1990.

Damiani and Bottarelli, A Terminological Approach to Business Domain Modeling, Abstract—EEC Proceedings of the International Conference on Database and Expert Systems 1990 pp. 340-345.

DeWitt et al., Client-Server Paradise, Abstract, Proceedings of the 20th VLDB Conference 1994.

DeWitt et al., Client-Server Paradise, Abstract, Proceedings of the 20th VLDB Conference 1994 pp. 558-569.

McFadden., Data Warehouse for EIS: Some Issues and Impacts, Abstract—IEEE 1996 pp. 120-129.

McFadden., Data Warehouse for EIS: Some Issues and Impacts, Abstract—IEEE 1996 Proceedings of the 29th Hawaii Conference on Systems Sciences.

Cheung et al., DROLAP—A Dense-Region Based Approach to On-Line Analytical Processing, Abstract DEXA '99.

Cheung et al., DROLAP—A Dense-Region Based Approach to On-Line Analytical Processing, Abstract DEXA '99, LNCS 1677 pp. 761-770 1999.

Kotidis, Y. and N. Roussopoulos "DynaMat: A Dynamic View of Management System for Data Warehouses", Proceedings of ACM SIGMOD International Conference on Management of Data, Jun. 1-3, 1999.

Sun and Grosky., Dynamic Maintenance of Multidimensional Range Data Partitioning for Parallel Data Processing, Abstract—DOLAP '98.

Sun and Grosky., Dynamic Maintenance of Multidimensional Range Data Partitioning for Parallel Data Processing, Abstract—DOLAP '98 pp. 72-79.

Peneva and Angelova., End-User Interface to Improve Microcomputer DBMS Efficiency, Abstract Proceedings of the International Conference on Database and Expert System Applications 1991.

Rundensteiner and Sic., Evaluating Aggregates in Possibilistic Relational Databases, Abstract, Jan. 1991.

Hsiao et al., The Federated Databases and System: A New Generation of Advanced Database System, Abstract Proceeding of DEXA '90.

Hsiao et al., The Federated Databases and System: A New Generation of Advanced Database System, Abstract Proceeding of DEXA '90 1990 pp. 186-190.

Eder., General Transitive Closures and Aggregate Functions, Abstract, 1991.

Eder., General Transitive Closures and Aggregate Functions, Abstract Proceedings of DEXA '91., 1991.

Eder., General Transitive Closures and Aggregate Functions, Abstract Proceedings of DEXA '91., 1991 pp. 54-59.

Goil and Choudhary, High Performance Data Mining Using Data Cubes on Parallel Computers, Abstract—IEEE 1998.

Goil and Choudhary, High Performance Data Mining Using Data Cubes on Parallel Computers, Abstract—IEEE 1998 pp. 548-555.

Goil and Choudhary, High Performance Multidimensional Analysis of Large Datasets, Abstract—DOLAP '98.

Goil and Choudhary, High Performance Multidimensional Analysis of Large Datasets, Abstract—DOLAP '98 1998 pp. 34-39.

Muto and Kitsuregawa, Improving Main Utilization for Array-Based Datacube Computation, Abstract—DOLAP '98.

Muto and Kitsuregawa, Improving Main Utilization for Array-Based Datacube Computation, Abstract—DOLAP '98 1998 pp. 28-33.

Nestorov and Tsur, Integrating Data Mining with Relational DBMS: A Tightly-Coupled Approach, Abstract—NGITS, 1999.

Nestorov and Tsur, Integrating Data Mining with Relational DBMS: A Tightly-Coupled Approach, Abstract—NGITS 99, L.Nes 1649 pp. 295-311 1999.

Fernandez-Baizan et al., Integrating KDD Algorithms and RDBMS Code, Abstract Proceedings of RSCTC '98.

Fernandez-Baizan et al., Integrating KDD Algorithms and RDBMS Code, Abstract Proceedings of RSCTC '98 pp. 210-213 1998.

Andlinger et al., Making C++ Object Persistent by Using a Standard Relational Database System Proceedings of DEXA '91.

Andlinger et al., Making C++ Object Persistent by Using a Standard Relational Database System Proceedings of DEXA '91 1991 pp. 374-379.

Rafanelli and Ricci, Mefisto: A Functional Model for Statistical Entities, IEEE, 1993.

Rafanelli and Ricci, Mefisto: A Functional Model for Statistical Entities, IEEE Jul. 16, 1992 pp. 670-681.

Gunzel et al., Modeling of Census Data in a Multidimensional Environment, Springer, Sep. 1998.

Gunzel et al., Modeling of Census Data in a Multidimensional Environmental. Sorinzer Procccdinus of ADBIS '98 Sep. 7-10, 1998.

Gunzel et al., Modeling of Census Data in a Multidimensional Environmental. Sorinzer Procccdinus of ADBIS '98 Sep. 7-10, 1998 pp. 363-368.

SAP Multi-Dimensional Modeling with BW, ASAP for BW Accelerator—A background to the techniques used to create SAP BW InfoCubes Document Version 2.0 2000.

Gingras and Lakshmanan, nD-SQL: A Multi-Dimensional language for Interoperability and OLAP, Abstract, 1998.

Gingras and Lakshmanan, nD-SQL: A Multi-Dimensional Language for Interoperability and OLAP, Abstract Proceedings of the 24th VLDB Conference 1998.

Shatdal, Order Based Analysis Functions in NCR Teradata Parallel RDBMS, Abstract Proceeding ofEDBT 2000.

Shatdal, Order Based Analysis Functions in NCR Teradata Parallel RDBMS, Abstract Proceeding of EDBT 2000 pp. 219-223.

Albrecht et al., An Architecture for Distributed OLAP, Abstract, 1998.

Albrecht et al., An Architecture for Distributed OLAP, Abstract Proceedings ofPDPTA '98.

Albrecht et al., An Architecture for Distributed OLAP, Abstract Proceedings of PDPTA '98 Jul. 13-16 pp. 1482-1488.

Charczuk, Physical Structure Design for Relational Databases, Abstract Proceedings of ADBIS '98.

Charczuk, Physical Structure Design for Relational Databases, Abstract Proceedings of ADBIS '98 1998 pp. 357-362.

Charczuk, Physical Structure Design for Relational Databases, Abstract, 1998.

Lenz and Shoshani, Summarizability in OLAP and Statistical Data Bases, Abstract—IEEE 1997 pp. 22-27.

Lenz and Shoshani, "Summarizability in OLAP and Statistical Data Bases", Procecddings of the 9th International Conference on Scientifice and Statistical Database Management, 11-13, Aug. 1997, pp. 132-143.

Lehner, et al. "Normal Forms for Miltidimensional Databases", Proceedings of the 10th International Conference on Scientific and Statistical Database Management, Jul. 1-3, 1998, pp. 63-72.

Hwang, Summary Data Representations in Application Developments, Abstract, Sep. 1993.

Hwang, Summary Data Representations in Application Developments, Abstract DEXA 93 pp. 643-654.

Hwang, Summary Data Representations in Application Developments, Abstract Proceedings ofDEXA '93 Sep. 1993.

Dinter et al., The OLAP Market: State of the Art and Research Issues, Abstract—DOLAP '98.

Dinter et al., The OLAP Market: State of the Art and Research Issues, Abstract—DOLAP '98 pp. 22-27.

Wieczerzycki, Transaction Management in Databases Supporting Collaborative Applications, Abstract Proceedings of ADBIS '98 1998.

Wieczerzycki, Transaction Management in Databases Supporting Collaborative Applications, Abstract Proceedings of ADBIS '98 pp. 107-118.

Bellahsene, View Adaption in Data Warehousing Systems, Abstract, 1998.

Bellahsene, View Adaption in Data Warehousing Systems, Abstract Proceedings of DEXA '98 Aug. 1998.

Bellahsene, View Adaption in Data Warehousing Systems, Abstract Proceedings of DEXA '98 pp. 300-309.

Batini et al, A Comparative Analysis of Methodologies for Database Schema Integration,ACM Computing Surveys, vol. 18, No. 2 Dec. 1996.

Batini et al, A Comparative Analysis of Methodologies for Data Schema Integration,ACM Computing Surveys, vol. 18, No. 2, Dec. 1986.

Batini et al, A Comparative Analysis of Methodologies for Data Schema Integration,ACM Computing Surveys, vol. 18, No. 2 1987 pp. 323-364.

Gyssens and Lakshmanan., A Foundation for Multi-Dimensional Databases, 1997.

Gyssens and Lakshmanan., A Foundation for Multi-Dimensional Databases Proceedings of the 23'd VLDB Conference 1997.

Gyssens and Lakshmanan., A Foundation for Multi-Dimensional Databases Proceedings of the 23'd VLDB Conference 1997 pp. 106-115.

Gupta et al., Aggregate-Query Processing in Data Warehousing Environments, 1995.

Gupta et al., Aggregate-Query Processing in Data Warehousing Environments Proceedings of the 21 st VLDB Conference 1995.

Devlin and Murphy., An Architecture for a Business and Information System, IBM Systems Journal, vol. 27, No. I 1998.

Devlin and Murphy., An Architecture for a Business and Information System, IBM Systems Journal, vol. 27, No. 1 1988 pp. 60-80.

Codd., A Relational Model of Data for Large Shared Data Banks,Communications of the ACM, vol. 13, No. 6, Jun. 1970.

Codd., A Relational Model of Data for Large Shared Data Banks,Communications of the ACM, vol. 13, No. 6, Jun. 1990 pp. 377-387.

Vassiliadis and Sellis., A Survey of Logical Models for OLAP Database, SIGMOD Record, vol. 28, No. 4, Dec. 1999.

Vassiliadis and Sellis., A Survey of Logical Models for OLAP Database, SIGMOD Record, vol. 28, No. 4, Dec. 1999 pp. 64-69.
Attunity's website page re Home page with Headlines 2005.
Chaudhuri and Narasayya., AutoAdmin "What-if" Index Analysis Utility, '98.
Chaudhuri and Narasayya. AutoAdmin "What-if" Index Analysis Utility Proceedings of SIGMOD '98.
Chaudhuri and Narasayya. AutoAdmin "What-if" Index Analysis Utility Proceedings of SIGMOD '98 pp. 367-378.
Lu and Tan., Buffer and Load Balancing in Locally Distributed Database Systems, 1990.
Lu and Tan., Buffer and Load Balancing in Locally Distributed Database Systems, 1990 pp. 545-552.
Shanmugasundararn., Compressed Data Cubes for OLAP Aggregate Query Approximation on Continuous Dimensions Proceedings ofthe KDD '99 Conference.
Shanmugasundararn., Compressed Data Cubes for OLAP Aggregate Query Approximation on Continuous Dimensions KDD 99 1999 pp. 223-232.
Barghoorn., N-dimensional Data Analysis with Sparse Cubes, Crosstab, OLAP, and APL APL98 Jul. 1998 pp. 110-113.
Barghoorn., N-dimensional Data Analysis with Sparse Cubes, Crosstab, OLAP, and APL Proceedings of the APL '98 Conference.
Gray et al, Data Cube: A Relational Aggregation Operator Generalizing Group-By, Cross-Tab, and Sub-Totals, 1996.
Gray et al, Data Cube: A Relational Aggregation Operator Generalizing Group-By, Cross-Tab, and Sub-Totals, 1996 pp. 152-159.
Chaudhuri and Dayal., Data Warehousing and OLAP for Decision Support Proceedings of SIGMOD '97.
Chaudhuri and Dayal., Data Warehousing and OLAP for Decision Support Proceedings of SIGMOD '97 1997 pp. 507-508.
Trujillo et al., Detecting Patters and OLAP Operations in the GOLD Model, DOLAP, '99.
Trujillo et al., Detecting Patters and OLAP Operations in the GOLD Model, DOLAP, '99 1999 pp. 48.53.
Yan & Larson., Eager Aggregation and lazy Aggregation, Proceedings of the 21st VLDB Conference Zurich, Swizerland, 1995.
Johnson and Chatziantoniou., Extending Complex Ad-Hoc OLAP, 1999.
Johnson and Chatziantoniou., Extending Complex Ad-Hoc OLAP Proceedings ofCIKM '99.
Johnson and Chatziantoniou., Extending Complex Ad-Hoc OLAP pp. 170-179 CIKM 99 Nov. 1999.
Pedersen et al., Extending OLAP Querying to Object Databases, VLDB 2000 Submission.
Pedersen et al., Extending Practical Pre-Aggregation in On-Line Analytical Processing, 1999.
Pedersen et al., Extending Practical Pre-Aggregation in On-Line Analytical Processing Proceedings of the 25th VLDB Conference 1999.
Codd, Extending the Database Relational Model to Capture More Meaning, ACM Transactions on Database Systems, vol. 4, No. 4, 1979.
Codd, Extending the Database Relational Model to Capture More Meaning, ACM Transactions on Database Systems, vol. 4, No. 4, 1979 pp. 397-434.
Sheth and Larson, Federated Database Systems for Managing Distributed, Heterogeneous, and Autonomous Databases, ACM Computing Surveys, vol. 22, No. 3, Sep. 1990.
Sheth and Larson, Federated Database Systems for Managing Distributed, Heterogeneous, and Autonomous Databases, ACM Computing Surveys, vol. 22, No. 3. pp. 183-236 Sep. 1990.
Szykier, Fractal Compression of Data Structures, Electro International 1994 Hynes Convention Center, pp. 609-616.
Szykier, Fractal Compression of Data Structures, Electro International 1994 Hynes Convention Center, May 1994.
Graefe et al., Hash joins and hash teams in Microsoft SQL Server, 1998, pp. 86-97.
Graefe et al., Hash joins and hash teams in Microsoft SQL Server Proceedings of the 24th VLDB Conference 1998, pp. 86-97.
Chandra and Harel, Horn Clauses and the Fixpoint Query Hierarchy 1982.

A White Paper by Speedware Corporation, Hybrid OLAP—The Best of Both Worlds 1997.
Markl et al., Improving OLAP Performance by Multidimensional Hierarchical Clustering, 1999.
Mark! et al., Improving OLAP Performance by Multidimensional Hierarchical Clustering Proceedings of IDEAS '99 1999.
Chaudhuri and Shim, Including Group-By in Query Optimization, 1994.
Chaudhuri and Shim, Including Group-By in Query Optimization Proceedings of the 20th VLDB Conference, 1994.
Mumick et al., Maintenance of Data Cubes and Summary Tables in a Warehouse, 1997.
Mumick, I. S., D. Quass and B. S. Mumick "Maintenance of Data Cubes and Summary Tables in a Warehouse", ACM SIGMOD Record, vol. 26, No. 2, Jun. 1997, pp. 100-111.
Murnick et al., Maintenance of Data Cubes and Summary Tables in a Warehouse Proceedings of SIGMOD '97 1997.
Vigeant, J. DM Review's website page re Media / MR Ensures Consistency for IBM Consultancy Jan. 1998.
McCarthy, Metadata Management for large Statistical Databases, 1982, pp. 234-243.
McCarthy, Metadata Management for Large Statistical Databases Proceedings of the 8th VLDB Conference 1982. pp. 234-243.
Ferguson, Microeconomic Algorithms for Load Balancing in Distributed Computer Systems, 1988.
Ferguson, Microeconomic Algorithms for Load Balancing in Distributed Computer Systems, 1988 pp. 491-499.
Chen and McNamee, On the Data Model and Access Method of Summary Data Management, IEEE Transactions on Knowledge and Data Engineering, vol. 1, No. 4, 1989.
Sellis and Ghosh, Concise Papers on the Multiple-Query Optimization Problem, IEEE Transactions on Knowledge and Data Engineering, vol. 2, No. 2 1990.
DBMS's website page re Oracle 7 Release 7.3 by Martin Rennhackkamp Nov. 1996 pp. 262-266.
DeWitt and Gray, Parallel Database Systems: The Future of High Performance Database Systems, Communications of the ACM, vol. 35, No. 6, Jun. 1992.
DeWitt and Gray, Parallel Database Systems: The Future of High Performance Database Systems, Communications of the ACM, vol. 35, No. 6, Jun. 1992 pp. 85-98.
Ho et al., Partial-Sum Queries in OLAP Data Cubes Using Covering Codes, 1997.
Ho et al., Partial-Sum Queries in OLAP Data Cubes Using Covering Codes Proceedings of PODS '97 1997.
Ho et al., Partial-Sum Queries in OLAP Data Cubes Using Covering Codes Proceedings of PODS '97 1997 pp. 228-237.
Pourabbas and Rafanelli, PGL: An Extended Pictorial Query Language for querying Geographical Databases using Positional and OLAP Operators, Nov. 1999.
Pourabbas and Rafanelli, PQL: An Extended Pictorial Query Language for querying Geographical Databases using Positional and OLAP Operators Proceedings of ACM GIS '99 Nov. 1999.
Pourabbas and Rafanelli, PQL: An Extended Pictorial Query Language for querying Geographical Databases using Positional and OLAP Operators Proceedings of ACM GIS '99 Nov. 1999 pp. 165-166.
Markl et al., Processing Operations with Restrictions in RDBMS without External Sorting: The Tetris Algorithm, 1999
Markl et al., Processing Operations with Restrictions in RDBMS without External Sorting: The Tetris Algorithm Proceedings of ICDE '99 1999.
Bansal, Real World Requirements for Decision Support—Implications for RDBMS, 1995.
Bansal, Real World Requirements for Decision Support—Implications for RDBMS Proceedings of SIGMOD '95 1995 p. 448.
Tabor Communications' website page re SAP Customers Eastman Kodak and Halliburton Among 750 Customers Worldwide to Implement the SAP Business Information Warehouse Solution, 1999.
Graefe et al., *Sort* vs. *Hash Revisited*, IEEE Transactions on Knowledge and Data Engineering, vol. 6, No. 6., Dec. 1994.
Graefe et al., *Sort* vs. *Hash Revisited*, IEEE Transactions on Knowledge and Data Engineering, vol. 6, No. 6., Dec. 1994 pp. 934-944.

Red Brick Systems, Inc. Star Schema Processing for Complex Queries, 1997.
Shoshani and Wong., Statistical and Scientific Database Issues, IEEE Transactions on Software Engineering, vol. SE-11, No. 10., Oct. 1985.
Shoshani and Wong., Statistical and Scientific Database Issues, IEEE Transactions on Software Engineering, vol. SE-11, No. 10., Oct. 1985 pp. 1040-1047.
Ghosh, Statistical Relational Databases: Normal Forms, IEEE Transactions on Knowledge and Data Engineering, vol. 3, No. 1., 1991.
Ghosh, Statistical Relational Databases: Normal Forms, IEEE Transactions on Knowledge and Data Engineering, vol. 3, No. 1., 1991 pp. 55-64.
Stamen, Structuring Database for Analysis, IEEE Spectrum Oct. 1993 pp. 55-58.
The OLAP Report website page re Summary Review: Media (Speedware) Mar. 29, 1999.
Sybase Inc.'s website page re Certification Report No. 136 of Sybase Adaptive Server IQ Version 12.02 with Seagate Software Crystal Reports and Crystal Info Version 7.0v Jun. 1999.
Gyssens et al., Tables as a Paradigm for Querying and Restructuring, 1996.
Gyssens et al., Tables as a Paradigm for Querying and Restructuring Proceedings of PODS '96 1996.
Gyssens et al., Tables as a Paradigm for Querying and Restructuring Proceedings of PODS '96 1996., 1996 pp. 93-103.
Srivastava et al., TBSAM: An Access Method for Efficient Processing of Statistical Queries, IEEE Transactions of Knowledge and Data Engineering, vol. 1. No. 4, 1989.
Srivastava et al., TBSAM: An Access Method for Efficient Processing of Statistical Queries, IEEE Transactions of Knowledge and Data Engineering, vol. 1. No. 4 pp. 419-423 Dec. 1989.
LeFevre, J., LookSmart Find Articles' website page re There's a Whole Lot of HOLAP Goin' On-hybrid online analytical processing systems combine relational OLAP and multidimensional OLAP—Technology Information, 1998.
LeFevre, J., LookSmart Find Articles' website page re There's a Whole Lot of HOLAP Goin' On-hybrid online analytical processing systems combine relational OLAP and multidimensional OLAP—Technology Information, Feb. 18, 1998.
LeFevre, J.,There's a Whole Lot of HOLAP Goin' On-hybrid online analytical processing systems combine relational OLAP and multidimensional OLAP—Technology Information Feb. 18, 1998.
Bayer, UB-Trees and UB-Cache a new Processing Paradigm for Database Systems, Mar. 15, 1997.
Hurtado et al., Updating OLAP Dimensions, 1999, pp. 60-66.
Hurtado et al., Updating OLAP Dimensions Proceedings of DOLAP'99, 1999, pp. 60-66.
White Paper Abstract—Connecting Seagate Software products to the SAP Business Information Warehouse (BW), Enterprise Information Management, Feb. 5, 1999.
Healthcare Informatics.Online website page re Data Mining Goes Multidimensional by Mark Hettler, Mar. 1997
Healthcare Informatics.Online website page re Data Mining Goes Multidimensional by Mark Hettler, Mar. 1997.
Staudt et al., Incremental Maintenance of Externally Materialized Views, Abstract, 1996.
Staudt et al., Incremental Maintenance of Externally Materialized Views, Abstract Proceedings of the 22nd VLDB Conference 1996 pp. 75-86.
Aberdeen Group "Pilot Internet Publisher: A Foundation for Web-Enabled OLAP" Feb. 1997.
Srivastava et al., Answering Queries with Aggregation Using Views, Abstract, 1996.
Srivastava et al., Answering Queries with Aggregation Using Views, Abstract, Proceedings of the 22nd VLDB Conference 1996.
Srivastava et al., Answering Queries with Aggregation Using Views, Abstract, Proceedings of the 22nd VLDB Conference 1996 pp. 318-329.
Martin, J., DM Review's website re Cybercorp: Trends in Distributed Data Warehousing Jan. 1999.
Theodoratos et al, Data Warehouse Configuration, Abstract, 1997.
Theodoratos et al, Data Warehouse Configuration, Abstract Proceedings of the 23rd VLDB Conference 1997.
Malvestuto, F., The Derivation Problem for Summary Data, Abstract, 1988.
Malvestuto, F., The Derivation Problem for Summary Data, Abstract, ACM 1988 pp. 82-89.
Rahm, Erhard. Dynamic Load Balancing in Parallel Database System, Abstract, Aug. 1996.
Rahm, Erhard. Dynamic Load Balancing in Parallel Database System, Abstract Proceedings EURO-PAR 96 Conf. LNCS Aug. 1996.
Hsiao, David. Federated Databases and Systems: Part 1—A Tutorial on Their Data Sharing, Abstract, VLDB Journal, vol. 1, pp. 127-179, 1992.
Hsiao, David. Federated Databases and Systems: Part II—A Tutorial on Their Resource Consolidation, Abstract, VLDB Journal vol. 2, pp. 285-310, 1992.
Crystal Decisions. Holos Version 6. Holos Compound OLAP Architecture, 2002.
Sarawagi, Sunita. Indexing OIAP Data, Abstract, 1997.
Sarawagi, Sunita. Indexing OIAP Data, Abstract, Bulletin of the IEEE Computer Society Technical Committee on Data Engineering 1997.
Sarawagi, Sunita. Indexing OIAP Data, Abstract, Bulletin of the IEEE Computer Society Technical Committee on Data Engineering 1997 pp. 36-43.
Data Sheet—Informix MetaCube 4.2, Delivering the Most Flexible Business-Critical Decision Support Environments Jul. 1999.
Technical White Paper—Inside Alphablox Analytics: An In-Depth Technical View of Alphablox Analytics, 2004.
Ramsak et al., Integrating the UB-Tree into a Database System Kernel, Abstract Proceedings of the 26th VLDB Conference 2000.
Ramsak et al., Integrating the UB-Tree into a Database System Kernel, Abstract Proceedings of the 26th VLDB Conference 2000 pp. 263-272.
Roussopoulos, Nick. Materialized Views and Data Warehouses, Abstract, 1997.
Roussopoulos, Nick. Materialized Views and Data Warehouses, Abstract Proceedings of the 4th KRDB Workshop Aug. 30, 1997.
Bernstein et al., Meta-Data Support for Data Transformations Using Microsoft Repository, Abstract, 1999.
Bernstein et al., Meta-Data Support for Data Transformations Using Microsoft Repository, Abstract Bulletin of the IEEE Computer Society Committee on Date Engineering 1999.
Bernstein et al., Meta-Data Support for Data Transformations Using Microsoft Repository, Abstract Bulletin of the IEEE Computer Society Committee on Date Engineering 1999 pp. 9-14.
Microsoft SQL Server—Microsoft SQL Server 7.0 Decision Support Services: lowering the Cost of Business Intelligence, 1998.
Microsoft SQL Server—Microsoft SQL Server 7.0 Decision Support Services: lowering the Cost of Business Intelligence 098-80705 1998.
Gaede et al., Multidimensional Access Methods, ACM Computing Surveys, vol. 30, No. 2, Jun. 1996.
Gaede et al., Multidimensional Access Methods, ACM Computing Surveys, vol. 30, No. 2, Jun. 1996 pp. 170-231.
O'Neil et al., Multi-Table Joins Through Bitmapped Join Indices, SIGMOD Record, vol. 24, No. 3, Sep. 1995.
O'Neil et al., Multi-Table Joins Through Bitmapped Join Indices, SIGMOD Record, vol. 24, No. 3, Sep. 1995 pp. 8-11.
Pendse, N., OLAP Omnipresent, Byte Magazine, Feb. 1998.
Zhao et al., On the Performance of an Array-Based ADT for OLAP Workloads, Abstract, Aug. 29, 1996.
E-consultancy's website re Oracle Express 6.2 Delivers Unparalleled Integration, Ease of Use and Platform Support May 1998.
Yan et al., Performing Group-By before Join, Abstract.. Proceedings of the 10th IEEE Conference on Data Engineering 1994 pp. 89-100.
Wu, Ming-Chuan, Ouery Optimization for Selections using Bitmaps, Abstract, 1994, pp. 89-100.
Kamp et al., A Spatial Data Cube Concept to Support Data Analysis in Environmental Epidemiology, Abstract 1997.
Kamp et al., A Spatial Data Cube Concept to Support Data Analysis in Environmental Epidemiology, Abstract 1997 pp. 100-103.
SQL in Analysis Services, 2004.

Reinwald et al., SQL Open Heterogeneous Data Access, Abstract, 1998, pp. 506-507.
Reinwald et al., SQL Open Heterogeneous Data Access, Abstract Proceedings of SIGMOD 98 1998 pp. 506-507.
Moran, B., et al., SQL Server Savvy's website re How to Leverage the Capabilities of OLAP Services, Jul. 1999.
Radding, Alan. Support Decision Makers with a Data Warehouse, Datamation, Mar. 15, 1995.
Radding, Alan. Support Decision Makers with a Data Warehouse, Datamation, Mar. 15, 1995 pp. 53-56.
Chapman K. Article from itWorldCanada—BI/SUITE Plays Catch up to Competitors Feb. 26, 1999.
MacMillan, M. Article from itWorldCanada—Business Objects 5.0 Dresses Itself up with a Cleaner User Interface Sep. 10, 1999.
Plos Kine, B. Article—Hummingbird Dives Into Business Intelligence (Hummingbird BI Suite) (Product Announcement) Aug. 12, 1998.
Printout from Sybase Website Sybase Adaptive Server IQ 12.0.3 with Actuate Reporting System Version 3.2.1, Certification Date: Jul. 1999, Report.
Printout from Sybase Website Sybase Adaptive Server IQ 12.0.3 with Actuate Reporting System Version 3.2.1, Certification Date: Jul. 1999, Report 150.
Printout from Sybase Website "Sybase Adaptive Server IQ 12.03.1 with BusinessObjects Version 5.0, Certification Date: Jul. 1999, Report 148".
Printout from Sybase Website "Sybase Adaptive Server IQ Version 12.0, Sybase DirectConnect for MVS/DB2 11.7 and Sybase Adaptive Server Enterprise 11.9.1 with InfoMaker 7.0, Certification Date: Mar. 1999, Report 137".
Printout from Sybase Website "Sybase Adaptive Server IQ Version 12.0.2 with Hummingbird BI Suite Version 5.0, Certification Date: Mar. 1999, Report 133".
Printout from Sybase Website "Sybase Adaptive Server IQ Version 12.0.2 with Seagate Software Crystal Report and Crystal Info Version 7.0, Certification Date: Mar. 1999, Report 136".
Printout from Sybase Website "Sybase Adaptive Server IQ Version 12.4 with Microsoft Access 2000 Version 9.0, Certification Date: Oct. 1999, Report 155".
Kimball, R., et al., "Why Decision Support Fails and How to Fix it," Datamation, Jun. 1, 1994.
Kimball, R., et al., "Why Decision Support Fails and How to Fix it," Datamation, Jun. 1, 1994 pp. 40-43.
Article—"Why Decision Support Fails and How to Fix it," Datamation, Jun. 1, 1994.
"The Multimodel, Multilingual Approach to Interoperability of Multidatabase Systems," David K. Hsiao and Magdi N. Kamel, Departments of Computer and Administrative Sciences, Naval Postgraduate School 1991.
"The Multimodel, Multilingual Approach to Interoperability of Multidatabase Systems," David K. Hsiao and Magdi N. Kamel, Departments of Computer and Administrative Sciences, Naval Postgraduate School 1991 pp. 208-211.
"MDD Database Reaches the Next Dimension" Richard Finkelstein, Database Programming and Design, Apr. 1995, vol. 8.
"Materialized View and Index Selection Tool for Microsoft SOL Server 2000" Sanjay Agrawal, Surajit Chaudhuri and Vivek Narasayya Proceedings of SIGMOD 2001 May 21-24, 2001 p. 608.
"Managing Multidimensional Data: Harnessing the Power" Jay-Louise Weldon, Database Programming & Design, Aug. 1995, vol. 8.
"M(DM): An Open Framework for Interoperation of Multimodel Multidatabase Systems" Thierry Barsalou and Dipayan Gangopadhyay 1992.
"Help for Hierarchies" Ralph Kimball, Data Warehouse Architect, Sep. 1998.
"Beyond Decision Support" Edgar Codd, Sharon Codd and Clynch T. Salley, Computerworld, Jul. 26, 1993, p. 87.
"A Physical Storage model for Efficient Statistical Query Processing" Wee K. Ng and Chinya V. Ravishankar, Dept. of Electrical Engineering and Comptuer Science, University of Michigan 1994 pp. 97-106.

"A Physical Storage model for Efficient Statistical Query Processing" Wee K. Ng and Chinya V. Ravishankar, Dept. of Electrical Engineering and Comptuer Science, University of Michigan 1994.
"SQL is Our Language, Fix It Now" Datamation, Jun. 1, 1994.
"SQL is Our Language, Fix it Now" Datamation, Jun. 1, 1994 pp. 43-45.
Kimball, R. "SQL is Our Language, Fix it Now" Datamation, Jun. 1, 1994.
NetCube "Discussion of NetCube in the Context of IBM's DB2 OLAP Server" Jun. 7, 1997.
NetCube Health Care Client—Actual NetCube Model Design; Telecommunications—Business Model Design; Direct Marketing Client—Business Model Design Nov. 1, 2005.
Erik Thomsen, Dimensional Systems, Remarks from NetCube Product Review on Jan. 14, 1997.
Albrecht, J. et al.: "Aggregate-based Query Processing in a Parallel Data Warehouse Server", Proceedings of the Tenth International Workshop on Database and Expert Systems Applications, Sep. 1-3, 1999, pp. 40-44.
Albrecht, et al.: "Management of Multidimensional Aggregates for Efficient Online Analytical Processing", Database Engineering and Applications, 1999, Ideas '99. International Symposium Proceedings Montreal, Que., Canada Aug. 2-4, 1999, Los Alamitos, CA, USA, IEEE Comput. Soc, US, Aug. 2, 1999, pp. 156-164.
Albrecht, et al.: "Management of Multidimensional Aggregates for Efficient Online Analytical Processing", Database Engineering and Applications, 1999, Ideas '99. International Symposium Proceedings Montreal, Que., Canada.
Agarwal, S. et al.: "On the Computation of Multidimensional Aggregates", Proceedings of the 22nd VLDB Conference, Sep. 30, 1996, pp. 506-521.
Agarwal, S. et al.: "On the Computation of Multidimensional Aggregates", 22nd Int'l Cof. on Very Large Databases, 1996, pp. 1-16.
Agrawal et al.: "Modeling Multidimensional Databases", IBM Almaden Research Center, 1995, Presented at the 13th International Conference on Data Engineering, Apr. 1997, pp. 1-23.
Agrawal et al.: "Modeling Multidimensional Databases", IBM Almaden Research Center, 1995, Presented at the 13th International Conference on Data Engineering, pp. 1-23, available as Research Report 1995.
Anonymous: "Introduction to MDDBs", SAS Institute Inc., SAS/MDDB Server Administrators Guide Version 8, 1999, pp. 3-10.
The Art of Indexing by not indicated, Dynamic Information Systems Corporation, 1999, p. 3-30.
The Art of Indexing,: A White Paper by DISC, Oct. 1999, pp. 3-30, Dynamic Information Systems Corporation.
Carickhoff, Rich: "Internet Systems' website re A New Face for OLAP", Jan. 1997.
Carickhoff, Rich: "Internet Systems' website re A New Face for OLAP", Jan. 1997. DBMS Magazine.
Chaudhuri, et al.: "An Overview of Data Warehousing and OLAP Technology", Sigmod Record, Sigmod, New York, NY, US, vol. 26, No. 1, Mar. 1997, pp. 65-74.
Chaudhuri, S. et al., "An Overview of Data Warehousing and OLAP Technology", SIGMOD Record, New York, NY Mar. 1997, vol. 26, No. 1.
Cheung, et al.: "Towards the Building of a Dense-Region-Based OLAP System", Data and Knowledge Engineering, vol. 36, No. 1, 2001, http://www.elsevier.nl/gej-ng/10/16/74/62/24/24/abstract.html, pp. 1-27.
Colliat, George: "OLAP: Relational, and Multidimensional Database Systems", SIGMOD Record, vol. 25, No. 3, Sep. 1996, pp. 64-69.
Date, C. J., et al.: An Introduction to Database Systems, No. 7th, 2000, p. p. 250, 266, 289-326.
Date, C. J., et al.: An Introduction to Database Systems, No. 7th, 2000, p. p. 250, 266, 289-326. Addison-Wesley, Seventh Edition.
Date, et al., "An Introduction to Database Systems, vol. II", Reading: Addison-Wesley, pp. 62-64, 1983. QA76.9.D3D367. ISBN 0-201-14474-3.
Date, et al., "An Introduction to Database Systems, vol. II", Reading: Addison-Wesley, pp. 62-64, 1983.
Date, C.J., "An Introduction to Database Systems," 2000, pp. 250, 266, 289-326, Addison-Wesley, Wesley, Seventh Edition.

Duhl, et al', "A Performance of Object and Relational Databases Using the Sun Benchmark", Proceedings of the OOPSLA Conference, pp. 153-163, Sep. 25-30, 1988.

Duhl, et al., "A Performance Comparison of Object and Relational Databases Using the Sun Benchmark", Proceedings of the Conference on Object Oriented Programming Systems Languages and Applications, Sep. 25-30, 1988, pp. 153-163.

Elkins, S. B.: "Open OLAP", DBMS Apr. 1998, http://www.dbmsmag.com/9804d14.html, pp. 1-7.

Foley, J. TechWeb's website page re Microsoft Servers Up New SQL Server Beta Jan. 12, 1998.

Gupta, H.V., et al., "Index Selection for OLAP", Proceedings of the 13th Int'l Conference on Data Engineering, Apr. 7-11, 1997, pp. 208-219.

Harinarayan et al.: "Implementing Data Cubes Efficiently", Proceedings of the 1996 ACM SIGMOD International Conference on Mangement of Data, Jun. 4-6, pp. 205-216.

Harinarayan et al.: "Implementing Data Cubes Efficiently", Proceedings of the 1996 SIGMOD 1996, p. 1-25.

Hellerstein et al.: Online Aggregation, Presented at the ACM SIGMOD International Conference on Management of Data, May 11-15, 1997, http://www.acm.org/pubs/citations/proceedings/mod/253260/p171-hellerstein/, pp. 1-12.

Hellerstein, J.M., "Optimization Techniques for Queries with Expensive Methods", ACM Transactions on Database Systems (TODS), vol. 23, No. 2, pp. 113-157, 1998.

Ho, C.-T. et al.: Range Queries in OLAP Data Cubes, Presented at the ACM SIGMOD International Conference on Management of Data, May 11-15, 1997, http://www.acm.org/pubs/citations/proceedings/mod/253260/p73-ho/, pp. 1-16.

Introduction to Structured Query Language, http:/w3one.net/~jhoffmann/sqltut.htm, 2000, p. 1-33.

Introduction to Structured Query Language, http:/w3one.net/~jhoffmann/sqltut.htm, 2000, p. 1-33. http:/w3.one.net/~about.jhoffman/sqltut.htm.

Kimball, R., "Aggregate Navigation With (Almost) No MetaData", http://www.dbmsmag.com/9608d54.html, 1996, p. 1-8.

Kimball, R.: "The Aggregate Navigator; How to Optimize Your Data Warehouse Using Aggregates Without Driving Your End Users Crazy", DBMS (www.dbmsmag.com)—Nov. 1995.

Korn, F. et al.: "Efficiently Supporting Ad Hoc Queries in Large Datasets of Time Sequences", Presented at ACM SIGMOD International Conference on Management of Data, May 11-15, 1997, http://www.acm.org/pubs/citations/proceedings/mod/253260.p289-korn/, pp. 1-22.

Li, et al.: A Data Model for Supporting On-Line Analytical Processing, Presented at the International Conference on Information and Knowledge Management, 1996, pp. 81-88.

Li, C., et al.: "Optimizing Statistical Queries by Exploiting Orthogonality and Interval Properties of Grouping Relations", Presented at the 8th International Conference on Scientific & Statistical Database Management, Jun. 1996, pp. 1-10.

McKie, S.: "Essbase 4.0", DBMS, Jul. 1996, Web-based Product Review for Arbor Software Corporation, http://www.dbmsmag.com/9607d13.html, pp. 1-4.

Pedersen, T. B., "Aspects of Data Modeling and Query Processing for Complex Multidimensional Data", Chapter 4, entitled Extending Practical Pre-Aggregation in On-Line Analytical Processing, of the Ph.D. Dissertation, Danish Academy of Technical Sciences 2000, pp. 1-103.

Pedersen, T.B., Aspects of Data Modeling and Query Processing for Complex Multidimensional Data, 2000, pp. 1-180, Danish Academy of Technical Sciences.

Pedersen, T. B., Aspects of Data Modeling and Query Processing for Com., Dept. Computer Sci., Aalborg Univ., Denmark, 2000, p. 1, 77-103.

Pedersen, et al., Extending OLAP Querying to Object Databases, VLDB 2000 Submission.

Petersen, T. B., et al.: "Multidimensional Database Technology", IEEE, vol. 34, No. 12, Dec. 2001, pp. 40-46.

Pendse, Nigel: "The Origins of Today's OLAP Products", htt;://www.olapreport.com/origins.htm., Feb. 6, 2003, pp. 1-7.

"Performance Management—Product Information," ENT, Jul. 17, 1999, 2 pages.

Pourabbas, et al.: "Characterization of Hierarchies and Some Operators in OLAP Environment", Presented at the ACM 2nd International Workshop on Data Warehousing and OLAP, Nov. 2-6, 1999, pp. 1-17.

Pourabbas, et al.: "Characterization of Hierarchies and Some Operators in OLAP Environment", Presented at the ACM 2nd International Workshop on Data Warehousing and OLAP, 1999, p. 54-49.

Pourabbas et al.: "Hierarchies and Relative Operators in the OLAP Environment", SIGMOD Record, vol. 29, No. 1, Mar. 2000, http://dblp.unitrier.de/db/journals/sigmod/sigmod29.html, pp. 1-8.

Roche, T.: "Intermediate Client-server techniques", 1999.

Salem et al.: "How to Roll a Join: Asynchronous Incremental View Maintenance", Presented by ACM SIGMOD on Management of Data and Symposium on Principles of Database Systems, May 15-18, 2000, http://www.acm.org/pubs/citations/proceedings/mod/342009/p129-salem/#abstract, pp. 1-13.

SAS/MCCB®: Web-based product brochure entitled "See Data from All Angles with Multidimensional Database Software" by SAS/MCCB® Server, www.sas.com/products/mddb/index.html, 2001, 1 page.

Schumacher, Robin: Attunity Connect SQL—PowerPoint presentation undated 38 pages. BrioQuery Enterprise 4.0; Brio Technologys desktop OLAP tool, Lexis.com DBMX Magazine vol. 9 No. 10 Sep. 1996.

Shoshani, OLAP and Statistical Databases: Similarities and Differences, Abstract—PODS Proceedings of PODS '97 1997.

Shoshani, OLAP and Statistical Databases: Similarities and Differences, Abstract—PODS 97 pp. 185-196.

Vassiliadis, P.: "A Survey of Logical Models for OLAP Databases", Sigmod Record, vol. 28, No. 4, Dec. 1999.

Widman et al.: Efficient Execution of Operations in a DBMS for Multidimensional Arrays, presented at the ACM SIGMOD 1998, http://dblp.unitrier.de/db/conf/ssdbm/WidmannB98.html, pp. 1-11.

Zhao, Y et al. "Array-Based Evaluation of Multi-Dimensional Queries in Object-Relational Database Systems," Data Engineering, 1998 Proceedings, 14th International Conference in Orlando, FL, Feb. 23-27, 1998.

U. S. District Court Order, for the Northern District of California in the matter of Hyperion Solutions Corp. vs. HyperRoll, Inc., et al. (Case No. CV 05-05054-VRW), 35 pages, dated Aug. 28, 2006.

U.S. Office Action re U.S. Appl. No. 10/153,164 dated Nov. 25, 2003.

U.S. Office Action re U.S. Appl. No. 10/854,034 dated Nov. 6, 2006.

U.S. Office Action re U.S. Appl. No. 09/796,098 dated Oct. 24, 2003.

U. S. Office Action re U.S. Appl. No. 12/657,143 dated Sep. 15, 2010.

U. S. Office Action re U.S. Appl. No. 12/455,665 dated Jul. 30, 2010.

U. S. Office Action re U.S. Appl. No. 12/653,373 dated Aug. 30, 2010.

U. S. Office Action re U.S. Appl. No. 12/590,504 dated Aug. 30, 2010.

U. S. Office Action re U.S. Appl. No. 12/589,383 dated Oct. 26, 2010.

CA Office Action dated Jan. 24, 2011.

Rafanelli, M.: "Multidimensional Databases: Problems and Solutions", Idea Group Inc., 2003 3 pgs. (cover, forward). Exhibit A4 to Appeal Brief.

Colliat, G.: OLAP, Relational, and Multidimensional Database Systems, SIGMOD Record, vol. 25, No. 3, Sep. 1996. Exhibit A2 to Appeal Brief.

Japanese Office Action re JP 2001-565050, dated Feb. 15, 2011.

Developing Client/Server Systems Using Sybase SQL Server System 11, Sanjiv Purba, John Wiley & Sons, 1996. . See e.g., p. 1-81, 297-378, 417-508.

Preliminary Invalidity Contention (PIC) charts for U.S. Pat. Nos. 6,385,604 and 6,434,544 submitted by Hyperion to the district court in Civil Action No. CV 05-05054 VRW, date unknown.

Brady, C. et al.: comp.databases' website re Access DBMS? Not RDBMS? Comp.databases.Ms-access newsgroup thred Jun. 9, 1994.

Rana, et al., A Distributed Framework for Parallel Data Mining Using HP Java, BT technol J vol. 17 No. 3, Jul. 1999. pp. 146-154.

Internet Systems' website re A New Face for OLAP by Rich Carickhotf, Jan. 1997. DBMS Magazine.

Windows IT Pro's website re A New Kid on the OLAP Block by Karen Watterson, May 1, 1998.

Schumacher, Robin. BrioQuery Enterprise 4.0; Brio Technology's desktop OLAP tool, lexis.com. DBMS Magazine, vol. 9, No. 10, Sep. 1996.

NetCube Corporation manual. Number of Installed Sites. Characteristics of Typical System Implementations, date unknown.

Michael, J., et al. DM Review's website re Charles Schwab Plans for Continued Prosperity with Seagate Holos, Oct. 1998.

Craig, Robert. Checking out OLAP Architectures; Technology Information.Lexis, a Boucher Communications, Inc. publication, Section No. 12, vol. 2; 1997; p. 40, ISSN: 1085-2395.

Spitzer, Tom. Component architectures; component-based software development; technology information.Lexis, DBMS Magazine, vol. 10, No. 10, Sep. 1997.

Scholar.google website re Data Warehouse for Decision Support Systems, downloaded from http://www.cs.colorado.edu/-getrich/ Classes/csci5817rrerm Papers/pong/db.pdf., on Sep. 10, 2005.

Bearson et al., "Data Warehousing, Data Mining, and OLAP.", pp. 104-107. McGraw Hill 1997.

Kurz, Andreas, A Min Tjoa, Data Warehousing within Intranet: Prototype of a Web based Executive Information System, Abstract, 1997. pp. 627-632.

Dbmsmag's website re What's New in 4.0. Mckie, S., dbmsmag's website re What's New in 4.0, DBMS Magazine, Jul. 1996.

Reimers, How to Sort Through the OLAP Maze, Lexis, Software Magazine, vol. 17, No. 5, May 1997.

HyperRoll's website re HyperRoll for Hyperion Essbase, date unknown.

ClearConnect Installation and Reference Guide, Manual. 2 Introducing ClearConnect and DRDA ClearConnect Release 1.3 pp. 2-1 and 2-4. Jul. 31, 1997.

Groh et al., Managing Multidimensional Data marts with Visual Warehouse and DB2 OLAP Server, IBM Dec. 1998. See e.g., p. 19-193, 313-336.

Mattison, R.: A White Paper—Maximizing Database Performance with the OMNIDEX Query Accelerator 1998.

Maierhofer, Enrich. Present Limitations of Web-Enabled HOLAP: Empirical Experiments with Employment and Unemployment Statistics, Abstract pp. 883-887., date unknown.

Codd et al., Providing OLAP to User-Analysts: An IT Mandate. Hyperion Solutions Corporation, 1993.

Windows IT Pro Website Page re: SQL Server Analysis Services 8.0, May 2000.

Fernandez, Red Brick Warehouse: A Read-Mostly RDBMS for Open SMP Platforms . SIGMOD Conference 1994: 492.

Shahzad, Data Warehousing with Oracle, Oracular, Inc. 2011.

Aaaprod's website re Hybrid Database single slide of slide presentation, downloaded from http://aaaprod.gsfc.nasa.gov/teaslWaltM/ DWTEA/tsld048.htm, on Sep. 11, 2005.

Iwaysoftware's website re Accelerating Red Brick Integration, © iWay Software, 1996-2011.

Microsoft SQL Server 7.0—SQL Server Design Goals, Nov. 18, 2002.

Introducing Pilot Designer, Pilot Software, Inc. 1996. See e.g., p. 81-134.

Moorman., The Art of Designing HOIAP Database, SAS Institute Inc. [Paper 139], Proceedings of the Twenty-Fourth Annual SAS Users Group International Conference, Apr. 11-14, 1999.

Weinberger and Ender., The Power of Hybrid OLAP in a Multidimensional World, SAS Institute Inc. [Paper 133-25], Proceedings of the Twenty-Fifth Annual SAS Users Group International Conference, Apr. 9-12, 2000.

Shoshani and Rafanelli., A Model for Representing Statistical Objects, Abstract—lawrence Berkeley Lab, 3rd Int. Conf. on Information Systems and Management of Data (COMD). McGraw Hill, 1991.

Lehner, Modeling large Scale OLAP Scenarios, Advances in Database Technology—EDBT'98—Lecture Notes in Computer Science, 1998, vol. 1377/1998, 151-167, DOI: 10.1007/BFb0100983.

PartitionAggregationss7.txt, May 11, 2005.

Chaudhuri et al., Scalable Classification over SQL Databases, Abstract, ICDE Conference Proceedings, 1999.

Zhao et al., Simultaneous Optimization and Evaluation of Multiple Dimensional Queries, Abstract, SIGMOD '98 Seattle, WA, 1998 ACM.

Han, Towards On-Line Analytical Mining in Large Databases, Abstract, date unknown.

Arbor Essbase 5: Fundamentals,Arbor Software—Driving Business Performance. See e.g., p. 1-1-4-14, 6-1-9-23, 12-1-13-22, 19-1-33-16. Arbor Software Corporation copyright 1996, 1997, 1998.

Hyperion Essbase OLP Server Fundamentals (Training Manual)) ©1991-1999 Hyperion Solutions Corporation. See e.g., p. 1-1-1-9, 3-1-8-23, 13-1-13-45.

Datta et al., A Case for Parallelism in Data Warehousing and OLAP, In the 9th International Workshop on Database and Expert Systems Applications (DEXA98).

Datta and Thomas., A Conceptual Model and Algebra for On-Line Analytical Processing in Data Warehouses Elsevier, Decision Support Systems 27 (1999) 289-301.

Shatdal and Naughton., Adaptive Parallel Aggregation Algorithms, SIGMOD '95, San Jose, CA USA 1995 ACM.

Nadeau and Teorey., A Pareto Model for OLAP View Size Estimation, Information Systems Frontiers 2003—Kluwer Academic Publishers, Manufactured in The Netherlands.

Hired Brains' website page re Article called Data, Data Everywhere written by Neil Raden. Oct. 30, 1995, Information Week.

Agrawal et al., Database Mining: A Performance Perspective, IEEE Transactions on Knowledge and Data Engineering, 1993, vol. 5.

Stanford Technology Group, In. An Informix Company's website page re Designing the Data Warehouse on Relational Databases. Informix. Oct. 30, 1995, Information Week.

Garcia-Molina et al., Invited Talk: Distributed and Parallel Computing Issues in Data Warehousing p. 77. In Symposium on Principles of Distributed Computing 1998.

Hahn et al., Getting Started with DB2 OLAP Server for OS/390, IBM—International Technical Support Organization, Mar. 2000. See e.g., p. 1-18, 53-192.

Johnson and Shasha, Hierarchically Split Cube Forests for Decision Support: description and tuned design. New York University New York, NY ©1996.

Chandra and Harel, Horn Clauses and the Fixpoint Query Hierarchy ACM 1982 pp. 158-163.

Google's website page re Central Canada DB2 Users Group News Announced: IBM DB2 Universal Database Version 5.2, date unknown.

Salzberg and Reuter, Indexing for Aggregation. High Performance Transaction Systems (HPTS) Workshop 1995.

Media / MR The Hybrid OLAP Technology for the Enterprise, Speedware Corporation, Inc. , Nov. 1997.

IBM DB2 OLAP Server and Starter Kit—OLAP Setup and User's Guide Version 7. See e.g., p. 73-146. Copyright International Business Machines Corporation 1998, 2000, First Edition (Jun. 2000).

Albrecht and Lehner, On-Line Analytical Processing in Distributed Data Warehouses. IDEAS proceedings, IEEE Comput. Soc. (1998).

Quass and Widom, On-Line Warehouse View Maintenance for Batch Updates. ACM SIGMOD Conf. 1997.

Sarawagi, Research Report on Computing the Data Cube,IBM Research Division. Research Report 10026, IBM Almaden Research (1996).

Ramsak et al., Physical Data Modeling for Multidimensional Access Methods, 11th GI Workshop on Grundlagen von Datenbanken, Luisenthal. Germany, 1999.

Graefe, Query Evaluation Techniques for Large Databases, ACM Computing Surveys, vol. 25, No. 2, Jun. 1993.

Cabibbo and Torlone, Querying Multidimensional Databases. In Sixth Int. Workshop on Database Programming Languages, 1997.

Gupta, Selection of Views to Materialize in a Data Warehouse. Selection of Views to Materialize in a Data Warehouse, 1997.

Speedware's website page re Media c Features & Benefits, 2005 Activant Solutions Inc.

Bliujute et al., Systematic Change Management in Dimensional Data Warehousing . In Proceeedings of the Third International Baltic Workshop on DB and IS, 1998.

Markl et al., The Transbase Hypercue RDBMS: Multidimensional Indexing of Relational Tables. Proc. of 17th ICDE, Heidelberg, Germany, 2001.

Aho and Ullman, Universality of Data Retrieval Languages pp. 110-120. 1979 ACM.

Advanced Communication Technologies website page re CT's Vision & Strategy, date unknown.

Crystal Reports: A Beginner's Guide. Module 1 Getting Started, Dec. 2001.

Roussoopoulos et al., The Cubetree Storage Organization, Advanced Communication Technology, Inc. Proceedings fo the 24th VLDB Conference New York, USA, 1998.

Organizations Survival website page re New Version of Hyperion Essbase OlAP Server Raises Bar for Deploying Analytic Application Across . . . downloaded from www.organizationalsurvival.com. Sep. 20, 2005.

White Paper—Pilot Analysis Server, Multi-dimensional OLAP Engine Including Hybrid OLAP. 2003 Pilot Software Acquisition Corp.

Seagate Holos 7—Series 1, Supported Platforms, Operating Systems and Databases. 1999 Seagate Software, Inc.

Zaharioudakis et al., Answering Complex SQI Queries Using Automatic Summary Tables, Abstract, MOD 2000 Dallas, TX USA, © ACM 2000.

Zou et al., Back to the Future: Dynamic Hierarchical Clustering, Abstract, 1998 IEEE.

Patel et al., Building a Scalable Geo-Spatial DBMS: Technology, Implementation, and Evaluation, Abstract. SIGMOD '97 AZ, USA, 1997 ACM.

Data Flux Registration's website re Customer Data Integration: Creating One True View of the Customer. 2005 Dataflux Corporation.

Tam, Yin J., Datacube: Its Implementation and Application in OLAP Mining, Thesis. Simon Fraser University Sep. 1998.

Rolleigh et al, Data Integration: The Warehouse Foundation, date unknown.

Chen et al., A Distributed OLAP Infrastructure for E-Commerce, Abstract. (1999).

DSS Lab Comparative Evaluation of Microsoft OLAP Services 7.0 SP1 and Oracle Express 6.3.0, date unknown.

O'Neil et al., Improved Query Performance with Variant Indexes, Abstract. SIGMOD '97 AZ, USA, 1997 ACM.

Stonebraker et al., Mariposa: A Wide-Area Distributed Database System, Abstract. The VLDB Journal (1996) 5: 48-63.

Bonnet et al., My Mother Thinks I'm a DBA! Cross-Platform, Multi-Vendor, Distributed Relational Data Replication with IBM DB2 Data Propagator and IBM DataJoiner Made Easy!, IBM. See e.g., p. 1-138. IBM International Technical Support Organization, Jun. 1999.

Fiser et al., On-Line Analytical Processing on Large Databases Managed by Computational Grids*, Abstract. Proceedings of the 15th International Workshop on Database and Expert Systems Applications (DEXA '04).

Oracle. Oracle Express Server Database Administration Guide. Release 6.0. See e.g., p. 1-102, 123-2242, 1996, Oracle Corporation.

Oracle. Oracle Express Analyzer. Release 2.1 Getting Started. See e.g., p. 19-50, 1997 Oracle Corporation.

Cheung et al., Requirement-Based Data Cube Schema Design, Abstract, CIKM '99 Nov. 1999 Kansas City, MO, USA 1999 ACM.

DM Review's website re Analytics Portal: Scalability Stress Test: An Anaylsis of the Scalability of the MicroStrategy and Tandem DSS. 2005 DMReview and SourceMedica, Inc.

Microsoft's website re Microsoft TechNet. SQL Server 7.0 Resource Guide. Printed from Microsoft.com on Sep. 15, 2009.

Article—Hummingbird Acquires Data Transformation Company Leonard's Logic. Printed from taborcommunications.com on Nov. 1, 2005.

Article—Business Objects Delivers Next Version of Comprehensive Business Intelligence Suite. Printed from taborcommunications.com on Nov. 1, 2005.

Oracle Express Release 6.2, Express Language Programming Guide. See e.g., p. 19-186, 345-482. 1998.

Oracle Express Relational Access Manager, User's Guide Release 6.3. See e.g., p. 1-2-3-8, 5-2-B-6.

Printout from Sybase Website "Sybase DirectConnect for Oracle" Printed from Sybase.com on Nov. 1, 2005.

Printout from Sybase Website "Sybase IQ Version 11.0 Product Assessment". Mar. 1996.

Printout from Sybase Website "Understanding Open Server with Customer Success Stories". Copyright 2005, Sybase, Inc.

SQL Server 7.0 Workshop Codename Sphinx, Feb. 25-27, 1998. See e.g., p. 1-116.

TPD (Transaction Processing Performance Council) Interview with Jack Stevens, Francois Raab and Kim Shanley. 2004.

TPC Benchmark D (Decision Support) Standard Specification, Revision 2.1. See e.g., p. 9-114, 146-151. ©1993-1998 Transaction Processing Performance Council (TPC).

IEEE "Bulletin of the Technical Committee on Data Engineering" vol. 20, No. 1 Special Issue on Supporting OLAP Mar. 1997. See e.g., p. 1-48.

Application Programmer's Manual; MetaCube ROLAP Option for Informix Dynamic Server, Version 4.0, Jan. 1998. See e.g., p. 2-1-14-4.

NetCube Product Overview (Just-in-Time, not Just-in-Case Business Intelligence, Unleashing the Knowledge in Your Data) Version 1.7; NetCube, 1997 NetCube Corporation.

NetCube Corporation Milestone and Significant Events, date unknown.

NetCube Performance Overview, copyright 1997 NetCube Corporation.

NetCube ROLAPBuilder and CubeOptimizer Overview, copyright 1997 NetCube Corporation.

SAMS Teach Yourself Microsoft SQL Server 7.0 in 21 Days, Richard Waymire and Rick Sawtell; First Printing Dec. 1998, SAMS Publishing, 1999. See e.g., p. 1-742.

Materialized Views Techniques, Implementations, and Applications, Ashish Gupta and Inderpal Singh Mumick, Massachusetts Institute of Technology, 1999. . See e.g., p. 339-420.

The Developer'S Handbook to DB2 for Common Servers, Roger E. Sanders, 1997. . See e.g., p. 1-17, 83-158, 561-718.

Professional Data Warehousing With SQL Server 7.0 and OLAP Services, Sakhr Youness; Published by Wrox Press Ltd., 2000. . See e.g., p. 1-131, 327-394, 475-574.

Client/Server Computing With Sybase SQl Server, Joe Salemi, Zift-Davis Press, 1994. See e.g., p. 1-90, 143-190.

Sybase System XI Performance Tuning Strategies, Ronald A. Phillips, Bonnie K. O'Neil, and Marshall Brain, Prentice-Hall, 1996. . See e.g., p. 1-156.

Sybase Replication Server Primer by Charles B. Clifford, McGraW-Hili, 1995. . See e.g., p. 1-172.

Developing Client/Server Systems Using Sybase SQL Server System 11, Sanjiv Purba, John Wiley & Sons, 1996. See e.g., p. 1-81, 297-378, 417-508.

Special Edition Using Sybase System XI, Peter Hazlehurst, Que Corporation, 1996. . See e.g., p. 1-331, 491-704.

Sybase SQL Server on the World Wide Web, Ed Ashley and Beth Epperson, International Thomson Computer Press, 1996. . See e.g., p. 1-21, 235-269.

Data Warehousing With Informix: Best Practices, Angela Sanchez, Informix Press, Prentice Hall, 1998. . See e.g., p. 1-312.11-20.

Informix Guide to Designing Databases and Data Warehouses, Informix Press, Prentice Hall, 2000. See e.g., p. 1-3.

Proceedings of the International Conference on Parallel and Distributed Processing Techniques and Applications, vol. I, H.R. Arabnia, CSREA Press, 1998. See e.g., p. 415-468, 1127-1190.

Proceedings of the International Conference on Parallel and Distributed Processing Techniques and Applications, vol. II, H.R. Arabnia, CSREA Press, 1998. See e.g., p. 1127-1190.

Proceedings of the International Conference on Parallel and Distributed Processing Techniques and Applications, vol. III, H.R. Arabnia, See e.g., p. 415-468, 1127-1190.

Proceedings of the International Conference on Parallel and Distributed Processing Techniques and Applications, vol. IV, H.R. Arabnia, CSREA Press, 1998. See e.g., p. 415-468, 1127-1190.

Upgrading and Migrating to Sybase SQL Server 11, Mitchell Gurspan, International Thomson Computer Press, 1996. . See e.g., p. 189-218, 255-272.

The Computer Glossary, The Complete Illustrated Dictionary, Eighth Edition, Alan Freedman, The Computer Language Company, Inc., © 1998, 1995, 1993, 1991, 1989, 1983, 1981.
Optimizing Informix Applications, Robert D. Schneider, Informix Press, Prentice Hall, 1995. See e.g., p. 13-80.
A Practical Guide to Microsoft OLAP Server, John Shumate, Addison-Wesley, 2000. See e.g., p. 3-84, 125-204, 219-236, 263-282, 309-395.
Using Microsoft SQL Server 7.0, Brad McGehee, Rob Kraft and Matthew Shepker, Oue Corporation, 1999. See e.g., p. 11-66, 507-720.
Running Microsoft Excel, Second Edition, Douglas Cobb, Judy Mynhier, Craig Stinson and Chris Kinata, Microsoft Press, 1991. See e.g., p. 431-445.
Microsoft Windows Software Development Kit, Guide to Programming, Version 3.1, Microsoft Corp, 1992. See e.g., p. 333-366, 511-536.
Essbase Data Server Technical Reference Manual, Version 2.2, Arbor Software, 1992. 1-68, 259-272.
The Informix Handbook, Ron Flannery, Informix Press, Prentice-Hall, 2000. See e.g., p. 1-425, 1101-1340.
Lotusworks Guide, Release 1.1, Spinnnaker Software, 1991. See e.g., p. 3-1-3-44, 7-1-7-52, 16-1-16-42.
Software Engineering With ADA, Grady Booch, Benjamin Cummings Publishing Company, 1983. See e.g., p. 38-45, 119-128.
Software Engineering With ADA, Second Edition, Grady Booch, Benajmin Cummings Publishing Company, 1987. See e.g., p. 142-156.
Sybase Architecture and Administration, John Kirkwood, Ellis Horwood, 1993. See e.g., p. 75-122.
Sybase Performance Tuning, Shaibal Roy and Marc B. Sugiyama, Prentice Hall, 1996. See e.g., p. 49-68, 137-168, 301-366, 441-488, 531-612.
Sybase Database Administrator's Handbook, Brian Hitchcock, Prentice Hall, 1996. See e.g., p. 1-72, 143-510.
Essbase Technical Reference Manual,Version 3.0, Arbor Software, 1994. See e.g., p. 1-62.
Essbase Application Designer Guide, Version 3.0, Arbor Software, 1994. See e.g., p. 1-254, 449-502.
An Introduction to Operating Systems, Harvey M. Deitel, Addison-Wesley, 1984. See e.g., p. 153-246, 321-352.
Microsoft Windows Graphical Environment User'S Guide, Version 3.0, Microsoft Corp., 1990. See e.g., p. 433-491.
Running Microsoft Excel, Douglas Cobb and Judy Mynhier, Microsoft Press, 1988. See e.g., p. 431-488.
Advances in Database Technologies, Yahiko Kambayashi, Dik Lun Lee, Ee-Peng Lim, Mukesh Kumar Mohania and Yoshifumi Masunaga, Springer Press, 1998. See e.g., p. 1-180, 382-590.
The Essbase Ready Tools Guide, Arbor Software. See e.g., p. 1-572, © 1996 Arbor Software Corporation.
A Guide to Sybase and SQL Server, D. McGoveran and C.J. Date, Addison-Wesley, 1992. See e.g., p. 3-16, 23-34, 37-49, 55-222, 303-318, 341-432, 473-490.
Data Warehouse From Architecture to Implementation, Barry Devlin, Addison-Wesley, 1997.
Building, Using and Managing the Data Warehouse, Ramon Barquin and Herb Edelstein, Prentice Hall, 1997.
ORACLE8 A Beginner'S Guide, Michael Abbey and Micheal J. Corey, Oracle Press, McGraw-Hill, 1997.
ORACLE8 Object-Oriented Design, David Anstey, Coriolis, 1998.
ORACLE8 Tuning, Don Burleson, Coriolis, 1998.
Sybase and Client/Server Computing, Second Edition, Alex Berson and George Anderseon, McGraw-Hill, 1997. See e.g., p. 171-478, 741-842.
ORACLE8 Server Unleashed, Joe Greene, Sams Publishing, 1998. See e.g., p. 1-72, 169-414, 715-862.
Teach Yourself ORACLE8 in 21 Days, Edward Whalen and Steve Adrien DeLuca, SAMS Publishing, 1998. See e.g., p. 1-530.
ORACLE8 Design Using UML Object Modeling, Dr. Paul Dorsey and Joseph R. Hudicka, Oracle Press, McGraw-Hili, 1999. See e.g., p. 1-472.
ORACLE8 Design Tips, Dave Ensor and Ian Stevenson, O'Reilly & Associates, 1997. See e.g., p. 1-136.
ORACLE8 on Windows NT, Lilian Hobbs, Butterworth-Heinemann, 1998. See e.g., p. 1-168, 251-272.
ORACLE8 Architecture, Steve Bobrowski, Oracle Press, McGraw-Hill 1998. See e.g., p. 1-374.
ORACLE8 DBA Handbook, Kevin Loney, Oracle Press McGraw-Hill, 1998. See e.g., p. 3-474.
Oracle Tuning, Michael J. Corey, Michael Abbey, Daniel J. Dechichio and Ian Abramson, Oracle Press, McGraw-Hill, 1998. See e.g., p. 3-282.
Microsoft Excel User'S Guide 2, Microsoft Corp., 1992. See e.g., p. 1-152.
Microsoft Excel Function Reference, Microsoft Corp., 1992. See e.g., p. 1-580.
ORACLE8 How to, Edward Honour, Paul Dalberth, Ari Kaplan and Atul Mehta, Waite Group Press, 1998. See e.g., p. 1-3.
Seagate Crystal Reports 7 for Dummies, Douglas J. Wolf, IDG Books, 1999. See e.g., p. 1-398.
Data Warehousing, Strategies, Technologies and Techniques, Rob Mattison, McGraw Hill,1996. See e.g., p. 1-352, 425-478.
Data Warehousing, Concepts, Technologies Implementations and Management, Harry Singh, Prentice Hall, 1998. See e.g., p. 1-356.
Building a Better Data Warehouse, Don Meyer and Casey Cannon, Prentice Hall, 1998. See e.g., p. 1-239.
Decision Support in the Data Warehouse, Paul Gray and Hugh Watson, Prentice Hall, 1998. See e.g., p. 1-382.
Parallel Systems in the Data Warehouse, Stephen Morse and David Isaac, Prentice Hall, 1998. See e.g., p. 97-384.
Data Warehousing for Dummies, Alan Simon, IDG Books Worldwide, 1997. See e.g., p. 1-362.
Data Warehousing and Data Mining, Implementing Strategic Knowledge Management, Elliot King, PhotoDisc, Inc., 1998. See e.g., p. 1-188.
Managing the Data Warehouse, Practical Techniques for Monitoring Operations, Administering Data and Tools, Managing Change and Growth, W.H. Inmon, J.D. Welch and Katherine Glassey, Wiley Computer Publishing, John Wiley & Sons, 1997. See e.g., p. 1-394.
Planning and Designing the Data Warehouse, Ramon Barquin, Alan Paller, Herb Edelstein, Ellen Levin, Doug Neal, Carol Burleson, David Tabler, Pieter Mimno, Bob Rumsby, Glen Livingston, Neil Raden, Duane Hufford and Mark Poole, Prentice Hall, 1997. See e.g., p. 1-322.
Data Warehouse Practical Advice From the Experts, Joyce Bischoff and Ted Alexander, Prentice Hall, 1997. See e.g., p. 4-119, 174-401.
Data Mining, Data Warehousing & Client/Server Databases, Proceedings of the 8th International Database Workshop, Joseph Fong, Springer, 1997. See e.g., p. 1-348.
Data Warehousing, Data Mining and OLAP, Alex Berson and Stephen Smith, McGraw-Hill, 1997. See e.g., p. 1-46, 67-220, 247-265, 333-440.
On-Line Analytical Processing Systems for Business, Robert Thierauf, Quorum Books, 1997. See e.g., p. 1-342.
Data Warehousing in Action, Sen Kelly, John Wiley & Sons, 1997. See e.g., p. 1-329.
The Essential Guide to Data Warehousing, Lou Agosta, Prentice Hall, 2000. See e.g., p. 1-100, 117-132, 151-238, 313-454.
The Enterprise Data Warehouse, Planning, Building and Implementation, vol. 1, Eric Sperley, Hewlett-Packard, 1999. See e.g., p. 1-349.
Understanding Database Management Systems, Second Edition, Alex Berson, McGraw-Hill, 1998. See e.g., p. 1-90, 119-336, 397-524, 539-644.
The Data Warehouse Challenge, Taming Data Chaos, Michael Brackett, John Wiley & Sons, Inc., 1996. See e.g., p. 1-142, 185-468.
Strategic Data Warehousing Principles Using SAS Software, Peter Welbrock, SAS Institute, 1998. See e.g., p. 1-251.
Building the Operational Data Store, W.H. Inmon, Claudia Imhoff and Greg Battas, John Wiley & Sons, Inc., 1996. See e.g., p. 1-291.
Essbase Web Gateway Workshop, Arbor Software, 1996. See e.g., p. 1-186.
Wired for OLAP Designer & Administrator Version 3.0, Student Guide, Vision Enterprises, 1998. See e.g., p. 1-126.
Crystal Info 6.0 Administrator Workshop, FastPlanet Technologies, 1998. See e.g., p. 1-162.

Essbase Fundamentals, Workbook, Arbor Software, 1997. See e.g., p. 1-180.

Hyperion'S Spider-Man Web Application—Administrator, Hyperion Software Operations, Inc., 1998. See e.g., p. 1-390.

Hyperion's Spider-Man Web Application—Technical Training for is Professionals, Hyperion Software Operations, Inc., 1998. See e.g., p. 1-198.

Arbor Essbase 5, Partitioning Training, Arbor Software, 1997. See e.g., p. 1-225.

Step by Step Microsoft SQL Server 2000 Analysis Services, Reed Jacobsen, Microsoft Press, 2000. See e.g., p. 1-394.

ORACLE8 Data Warehousing, A Practical Guide to Successful Data Warehouse Analysis, Build and Roll Out, Michael Corey, Michael Abbey, Ian Abramson and Ben Taub, Oracle Press, Osborne/McGraw-Hill, 1998. See e.g., p. 1-42, 99-346, 429-664.

Temporal Databases, Theory, Design and Implementation, Tansel Clifford, Gadia Jajodia and Segev Snodgrass, Benjamin Cummings Publishing, 1993. See e.g., p. 1-270, 294-593.

The Data Warehouse Toolkit, Ralph Kimball, John Wiley & Sons, 1996. See e.g., p. 1-106, 143-152, 161-380.

Data Warehousing, Using the Wal-Mart Model, Paul Westerman, Academic Press, 2001. See e.g., p. 1-304.

Using the New DB2 IBM's Object-Relational Database System, Don Chamberlin, Morgan Kaufmann Publishers, 1996. See e.g., p. 1-224, 393-664.

Arbor Essbase Start Here, Version 1.0.1, IBM. See e.g., p. 1-43. ©1991-1998 Arbor Software Corporation.

Arbor Essbase Installation Notes, Version 1.0.1, IBM, Arbor Software, 1998. See e.g., p. 1-318.

Reflex in Business, 17 Practical Examples for Business Analysis Using Relfex, the Analytic Database, Teddi Converse, Wade Ellis, Sr., Wade Ellis, Jr., and Ed Lodi, McGraw-Hill,1985. See e.g., p. 1-270.

Combinatorial Optimization, Algorithms and Complexity, Christos Papadimitriou, and Kenneth Steiglitz, Prentice-Hall, 1982. See e.g., p. 1-25.

ORACLE8i Data Warehousing, Lilian Hobbs and Susan Hillson, Digital Press, 2000. See e.g., p. 1-392.

Using SAP R/3, ASAP World Consultancy, Oue Corporation, 1996. See e.g., p. 1-148, 173-188.

Seagate Info, Report Design Guide, Version 7, Seagate Software, © 1998 Seagate Software Inc. See e.g., p. 1-79, 158-197, 462-595.

Seagate Crystal Reports User'S Guide, Version 6.0, Seagate Software, 1997. See e.g., p. 192-215, 472-491, 516-643.

Business Objects User'S Guide, BETA 1, Version 5.0 Windows, Business Objects, 1998. See e.g., p. 9-134.

Brioquery 5.0 Handbook, for Microsoft Windows, Apple Mcintosh and Motif Systems, Brio Technology, 1997. Brioquery 5.0 Handbook. See e.g., p. 1-2-9-11.

Brioquery Designer and Brioquery Explorer, Version 6.1, Reference Guide, Brio Technology, 2000. See e.g., p. 1-344.

Brio Technology User'S Guide, Version 6.0, Brio Technology, 1999. See e.g., p. 1-188.

Crystal Reports 8 for Dummies, Douglas Wolf, IDG Books Worldwide, 2000. See e.g., p. 1-353.

Getting Started With Data Warehouse and Business Intelligence, Maria Sueli Almeida, Missao Ishikawa, Joerg Reinschmidt and Torsten Roeber, IBM 1999. See e.g., p. 1-260.

Using TIVOLI Decision Support Guides, Vasfi Gucer, Janet Surasathain, Thomas Gehrke and Frank-Michael Nees, IBM, 1999. See e.g., p. 1-10, 45-132, 371-414.

Data Modeling Techniques for Data Warehousing, Chuck Ballard, Dirk Herreman, Don Schau, Rhonda Bell, Eunsaeng Kim and Ann Valencic, IBM, 1998. See e.g., p. 1-215.

Seagate Crystal Reports 6 Introductory Report Design Training Guide, Seagate Software, 1997. See e.g., p. 1-244.

Essbase API Reference, Arbor Software, 1996. See e.g., p. 1-364.

Essbase Technical Reference 4.0, Arbor Software. See e.g., p. 1-362, © 1991-1994 by Arbor Software Corporation.

The Data Webhouse Toolkit: Building the Web-Enabled Data Warehouse, Ralph Kimball and Richard Merz, Wiley Computer Publishing, John Wiley and Sons, 2000. See e.g., p. 1-40, 129-354.

Oracle 8 Backup & Recovery Handbook: Expert Methods From the Leading Authorities, Rama Velpuri and Anand Adkoli, Oracle Press, Osborne McGraw-Hill, 1998. See e.g., p. 1-226, 371-614.

Informix Dynamic Server With Universal Data Option : Best Practices, Angela Sanchez, Prentice Hall, 1999. See e.g., p. 1-94, 119-388.

Ouattro Pro Version 2.0 User'S Guide, Borland International, Inc., 1987. See e.g., p. 49-80.

Programming Language Concepts, Carlo Ghezzi and Mehdi Jazayeri, John Wiley & Sons, 1982. See e.g., p. 1-341.

Fullwrite Professional Learning Guide, Ashton Tate. See e.g., p. 1-299. Ashton-Tate Corporation 1988.

The Sybase SQL Server Survival Guide, Jim Panttaja, Mary Panttaja and Judy Bowman, Wiley Computer Publishing, John Wiley & Sons, 1996. See e.g., p. 1-374.

Microsoft Data Warehousing: Building Distributed Decision Support Systems, Robert S. Craig, Joseph A. Vivona and David Bercovitch, Wiley Computer Publishing, John Wiley & Sons, 1999. See e.g., p. 1-379.

ORACLE8 Data Warehousing: A Hands-On Guide to Designing, Building, and Managing Oracle Data Warehouses, Gary Dodge and Tim Gorman, Wiley Computer Publishing, John Wiley & Sons, 1998. See e.g., p. 1-638.

Oracle 8 Administration and Management, Michael Ault, Wiley Computer Publishing, John Wiley & Sons, 1998. See e.g., p. 1-110, 135-798.

Building a Data Warehouse for Decision Support, Vidette Poe, Prentice Hall, 1996. See e.g., p. 1-219.

Object-Oriented Data Warehouse Design: Building a Star Schema, William G Giovinazzo, Prentice Hall, 2000. See e.g., p. 1-361.

Informix Universal Data Option, Paul Allen and Joe Bambera, McGraw-Hill, 1999. See e.g., p. 1-230, 313-468, 555-838.

Sybase and Client/Server Computing, Alex Berson and George Anderson, McGraw-Hill, 1995.

Client/Server Database Design With Sybase: A High-Performance and Finetuning Guide, George W. Anderson, McGraw-Hill, 1997. See e.g., p. 1-146, 309452, 477-570.

Borland Ouattro Pro for Windows, Version 5.0, Borland International, 1993. See e.g., p. 1-10, 353-498.

An Array-Based Algorithm for Simultaneous Multidimensional Aggregates, Yihoug Zhao, Prassad M. Deshpande, Jeffrey F. Naughton, Computer Sciences Department, University of Wisconsin-Madison, SIGMOD '97 AZ, USA, 1997 ACM 0-89791-911.

Microsoft SQL Server 7.0 Databse Implementation Training Kit, Microsoft Press, 1999. See e.g., p. 1-157, 231-328, 381-412.

Microsoft SQL Server 7.0 Data Warehousing Training Kit, Microsoft Press, 2000. See e.g., p. 1-752.

Optimizing SQL Server 7: Planning and Building a High-Performance Database, Second Edition, Robert D. Schneider and Jeffrey R. Garbus, Prentice Hall, 1999. See e.g., p. 1-202, 333-525.

Sybase Developer'S Guide, Daniel J. Worden, SAMS Publishing, 1994. See e.g., p. 1-393.

Microsoft SQL Sever OLAP Developer'S Guide, William C. Amo, IDG Books Worldwide, 2000. See e.g., p. 1-380.

Data Warehousing, Building the Corporate Knowledgebase, Tom Hammergren, International Thomson Computer Press, 1996. See e.g., p. 1-106, 205-456.

Informix Unleashed, The Comprehensive Solutions Package, John McNally, Glenn Miller, Jim Prajesh and Jose Fortuny, SAMS Publishing, 1997. See e.g., p. 1-718.

Hyperion Essbase 5: Training Fundamentals, Hyperion Solutions Corp. See e.g., p. 1-390.

Hyperion Essbase 5: Training Partitioning, Hyperion Solutions Corp. See e.g., p. 1-292, 441-662.

ORACLE8 Bible, Carol McCullough-Dieter, IDG Books Worldwide, Inc.~ 1998. See e.g., p. 1-292, 441-1090.

Personal Oracle 8: A Voyage Into ORACLE8'S Newest Frontier, Richard Fieldhouse, International Thomson Publishing, 1998. See e.g., p. 31-204, 279-342, 401-554.

ORACLE8 Database Administration on Windows NT, Lynnwood Brown, Prentice Hall, 1999. See e.g., p. 1-298.

Sybase Client/Server Explorer, James Bean, Coriolis Group books, 1996. See e.g., p. 67-136, 159-392.

Data Warehouse Management Handbook, Richard Kachur, Prentice Hall, 2000. See e.g., p. 1-346.
ORACLE8 PL/SQL Programming: The Essential Guide for Every Oracle Programmer, Scott Urman, Oracle Press, Osborne McGraw-Hill, 1997. See e.g., p. 1202, 463-502, 549-960.
ORACLE8 &Unix Performance Tuning, Ahmed, Prentice Hall, 1999. See e.g., p. 1-345.
ORACLE8 &Windows NT Black Book, Mike Curtis and Jacqueline King, Coriolis Group, 1998. See e.g., p. 1-30, 273-798.
Database Performance Tuning Handbook, Jeff Dunham, McGraw-Hill, 1998. See e.g., p. 137-314, 363-462, 537-558, 585-762.
Datawarehousing: Architecture and Implementation, Mark Humphries, Michael W. Hawkins and Michelle C. Dy, Harris Kern's Enterprise Computing Institute, Prentice Hall, 1999. See e.g., p. 1-372.
Official Sybase Data Warehousing on the Internet: Accessing the Corporate Knowledge Base, Tom Hammergren, International Thomson. See e.g., p. 1-208, 363-592, Copyright 1998 International Thomson Publishing Company.
SQL Server Developer'S Guide to OLAP With Analysis Services, Mike Gunderloy and Tim Sneath, Sybex Inc., 2001. See e.g., p. 1-468.
Arbor Essbase 5: Release Training, Arbor Software, 1997. See e.g., p. 1-316.
Hyperion End User Training: Essbase Spreadsheet Ad-In for Excel, Hyperion Solutions, 1998. See e.g., p. 1-278.
Data Mining a Hands-on Approach for Business Professionals, Robert Groth, Prentice Hall, 1998. See e.g., p. 1-295.
Microsoft SQL Server 7 for Dummies, Anthony Mann, Hungry Minds, 1998. See e.g., p. 1-388.
Microsoft OLAP Unleashed, Second Edition, Tim Peterson and Jim Pinkelman, SAMS Publishing, 2000. See e.g., p. 1-890.
Data Warehousing With Microsoft SOL Server 7.0 Technical Reference, Jake Sturm, Microsoft Press, 2000. See e.g., p. 1-240, 264-430.
Official Sybase Internals: Designing and Troubleshooting for High Performance, John Kirkwood, International Thomson Publishing, 1998. See e.g., p. 1-54, 111-186, 329-406.
SQL Server 7 Data Warehousing, Michael Corey, Michael Abbey, Ian Abramson, Larry Barnes, Benajmin Taub and Rajan Venkitachalam. See e.g., p. 1-32, 77-448, Copyright © 1999 by The McGraw-Hill Companies.
Official Sybase SQL Anywhere: A Developer'S Guide, Ian Richmond, Steve Clayton and Derek Ball, International Thomson Publishing, 1997. See e.g., p. 1-108, 191374.
Business Intelligence: The IBM Solution, Datawarehousing and OLAP, Mark Whitehorn and Mary Whitehorn, Springer, 1999. See e.g., p. 1-304.
Sybase SQL Server: Performance and Tuning Guide, Karen Paulsell, Sybase Inc., 1996. See e.g., p. 13-56, 163-334.
Mastering Sybase SQL Server 11, Charles B. Clifford, McGraw-Hill, 1997. See e.g., p. 1-242, 329-532.
ORACLE8 for Dummies, Carol McCullough, IDG Books, 1997. See e.g., p. 1-388.
Sybase SQL Server 11 Unleashed, Ray Rankins, Jeffrey R. Garbus, David Solomon and Bennet W. McEwan, SAMS Publishing, 1996. See e.g., p. 1-226.
ORACLE8 Advanced Tuning & Administration, Eyal Aronoff, Kevin Loney and Noorali Sonawalla, Oracle Press, McGraw-Hill, 1998. See e.g., p. 1-540.
Sybase DBA Companion, Brian Hitchcock, Prentice Hall, 1997. See e.g., p. 1-80, 201-326.
Microsoft OLAP Solutions, Erik Thomsen, George Spofford and Dick Chase, Wiley Computer Publishing, John Wiley & Sons, 1999. See e.g., p. 1-356.
Teach Yourself ORACLE8 Database Development in 21 Days, David Lockman, SAMS Publishing, 1997. See e.g., p. 1-404.
The Data Warehouse Method, Neilson Thomas Debevoise, Prentice Hall, 1999. See e.g., p. 1-208, 261-426.
ORACLE8 Black Book, Michael R. Ault, Coriolis Group Books, 1998. See e.g., p. 1-66, 143-572.
Sybase SQL Server 11 DBA Survival Guide, Second Edition, Jeffrey Garbus, David Solomon, Brian Tretter and Ray Rankins, SAMS Publishing, 1996. See e.g., p. 1-12, 91-362.
Sybase SQL Server 11: An Administrator'S Guide, John Kirkwood, International Thomson Computer Press, 1996. See e.g., p. 149-196, 231-540.
Data Warehousing, Sean Kelly, John Wiley & Sons, 1996. See e.g., p. 1-213.
Unlocking OLAP With Microsoft SQL Server and Excel 2000, Wayne S. Freeze, IDG Books, 2000. See e.g., p. 1-462.
Developing Sybase Applications, Daniel J. Worden, Sams Publishing, 1995. See e.g., p. 1-113, 216-440.
Physical Database Design for Sybase SQL Server, Rob Gillette, Dean Muench and Jean Tabaka, Prentice-Hall, 1995. See e.g., p. 1-242.
Discrete Mathematical Structures With Applications to Computer Science, J.P. Tremblay and R. Mahohar, McGraw-Hill, 1975. See e.g., p. 1-103.
Developing Client/Server Systems Using Sybase SQL Server System 10, Sanjiv Purba, John Wiley & Sons, 1994. See e.g., p. 1-399.
Sybase DBA Survival Guide, Jeff Garbus, David Solomon and Brian Tretter, Sams Publishing, 1995. See e.g., p. 1-130, 177-246, 411-490.
ORACLE8 the Complete Reference, George Koch and Kevin Loney, Oracle Press, McGraw-Hill, 1997. See e.g., p. 1-540.
The OLAP Report's website re there is no single, ideal way of storing or processing multidimensional data. 2005.
CA Office Action, re Canadian Application. No. CA 2 401 348, dated Jan. 13, 2010.
EPO Examination Report and Notice of Oral Hearing re EP 1 266 308 dated Apr., 23, 2009.
EPO Examination Report re EP 1 266 308 dated Nov. 21, 2006.
EPO Examination Report re EP 1 266 308 dated Oct. 20, 2004.
EPO Supplemental Search Report re EP 1 266 308 dated Jul. 16, 2004.
EPO Decision to Refuse a European Patent re EP 1 266 308 dated Feb. 2, 2010.
PCT International Search Report re PCT/IB2000/01100, dated Jan. 2, 2001.
PCT International Search Report re PCT/US2001/06316 dated May 14, 2001.
PCT International Examination Report re PCT/US2001/06316 dated Dec. 28, 2001.
CA Office Action, re Canadian Application No. CA 2 401 348, dated Jan. 24, 2011.
Stonebraker, M., et al.: "The Postgres Next-Generation Database Management System", Communications of the ACM, Oct. 1991, vol. 34, No. 10, pp. 78-72. Exhibit A5 to Appeal Brief.
Rafanelli, M.: "Multidimensional Databases: Problems and Solutions", Idea Group Inc.,2003 3 pgs. (cover, forward). Exhibit A4 to Appeal Brief.
Thomsen, E.: "OLAP Solutions—Building Multidinemsional Information Systems", 1997 in 5 pages. Exhibit A3 to Appeal Brief.
Colliat, G.: OLAP, Relational, and Multidimensional Database Systems, SIGMOD Record, vol. 25, No. 3, Sep. 1996, pp. 64-69. Exhibit A2 to Appeal Brief.
Vassiliadis, P.: Modeling Multidimensional Databases, Cubes and Cube Operations, National Technical University of Athens. Exhibit A1 to Appeal Brief.
Japanese Office, Action re JP 2001-565050, dated Feb. 15, 2011.
Chaudhuri, et al.: "An Overview of Data Warehousing and OLAP Technology", ACM SIGMOD, vol. 26, Issue 1, Mar. 1997.
Japanese Office Action re JP 2001-565050, dated Jan. 24, 2012.
U. S. Final Office Action re U.S. Appl. No. 12/653,373 dated Feb. 22, 2011.
U. S. Advisory Action re U.S. Appl. No. 12/653,373 dated May 2, 2011.
U. S. Office Action re U.S. Appl. No. 12/653,373 dated Mar. 5, 2012.
U. S. Notice of Allowance re U.S. Appl. No. 12/653,373 dated Jul. 3, 2012.
U. S. Office Action re U.S. Appl. No. 12/455,665 dated Dec. 30, 2010.
U. S. Office Action re U.S. Appl. No. 12/455,665 dated Jun. 2, 2011.
U. S. Final Office Action re U.S. Appl. No. 12/455,665 dated Nov. 16, 2011.
U. S. Office Action re U.S. Appl. No. 12/590,504 dated Aug. 12, 2010.
U. S. Office Action re U.S. Appl. No. 12/590,504 dated Feb. 2, 2011.

U. S. Advisory Action re U.S. Appl. No. 12/590,504 dated Apr. 7, 2011.
U. S. Final Office Action re U.S. Appl. No. 12/590,504 dated May 6, 2011.
U. S. Advisory Action re U.S. Appl. No. 12/590,504 dated Aug. 2, 2011.
U. S. Office Action re U.S. Appl. No. 12/590,504 dated Nov. 18, 2011.
U. S. Office Action re U.S. Appl. No. 12/590,504 dated Apr. 27, 2012.
U.S. Office Action re U.S. Appl. No. 13/275,242 dated Apr. 2, 2012.
U.S. Office Action re U.S. Appl. No. 13/289,954 dated May 25, 2012.
U. S. Final Office Action re U.S. Appl. No. 12/657,143 dated Feb. 22, 2011.
U. S. Notice of Allowance re U.S. Appl. No. 12/657,143 dated May 2, 2011.
U. S. Office Action re U.S. Appl. No. 12/455,664 dated Jun. 21, 2010.
U. S. Office Action re U.S. Appl. No. 12/455,664 dated Mar. 15, 2011.

* cited by examiner

CELLAR

| Wine | Year | Bottles |
|---|---|---|
| Chardonnay | 1996 | 4 |
| Fume Blanc | 1996 | 2 |
| Pinot Noir | 1993 | 3 |
| Zinfandel | 1994 | 9 |

FIG. 3A (PRIOR ART)

Restrict operator:

SELECT WINE, YEAR, BOTTLES
FROM CELLAR
WHERE YEAR > 1995 ;

Result:

| Wine | Year | Bottles |
|---|---|---|
| Chardonnay | 1996 | 4 |
| Fume Blanc | 1996 | 2 |

FIG. 3B (PRIOR ART)

Project operator:

SELECT WINE, BOTTLES
FROM CELLAR;

Result:

| Wine | Bottles |
|---|---|
| Chardonnay | 4 |
| Fume Blanc | 2 |
| Pinot Noir | 3 |
| Zinfandel | 9 |

FIG. 3C (PRIOR ART)

SP
Fact table

| S# | P# | TP# | QTY |
|---|---|---|---|
| S1 | P1 | TP3 | 300 |
| S1 | P1 | TP5 | 100 |
| S1 | P2 | TP1 | 200 |
| S1 | P3 | TP2 | 400 |
| S1 | P4 | TP1 | 200 |
| S1 | P5 | TP5 | 100 |
| S1 | P6 | TP4 | 200 |
| S2 | P1 | TP3 | 300 |
| S2 | P2 | TP4 | 400 |
| S3 | P2 | TP1 | 300 |
| S3 | P2 | TP3 | 200 |

TP
Time period
Dimension table

| TP# | FROM | TO |
|---|---|---|
| TP1 | ta | tb |
| TP2 | tc | td |
| TP3 | te | tf |
| TP4 | tg | th |
| TP5 | ti | tj |

FIG. 4B  (PRIOR ART)

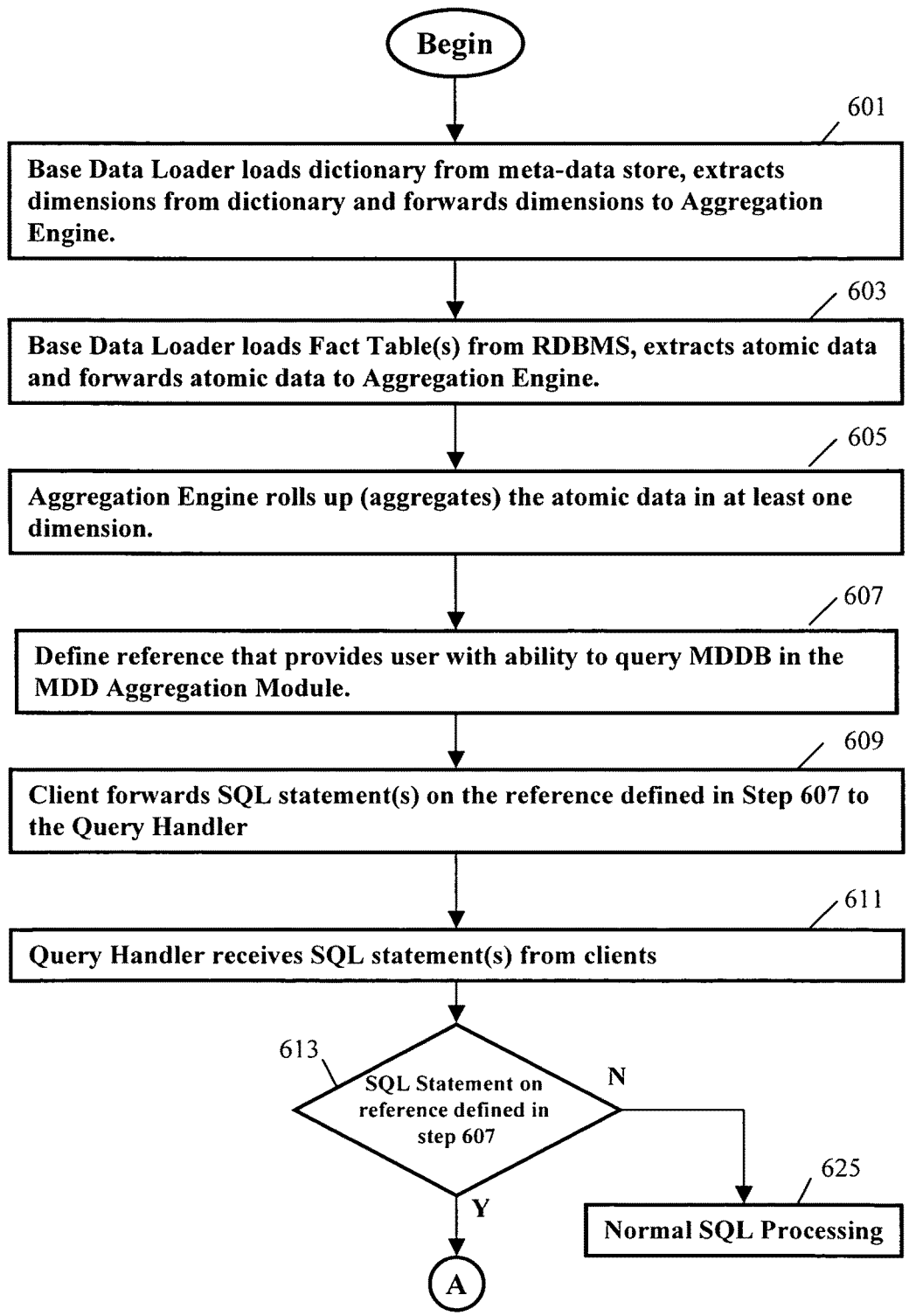
FIG. 6C1

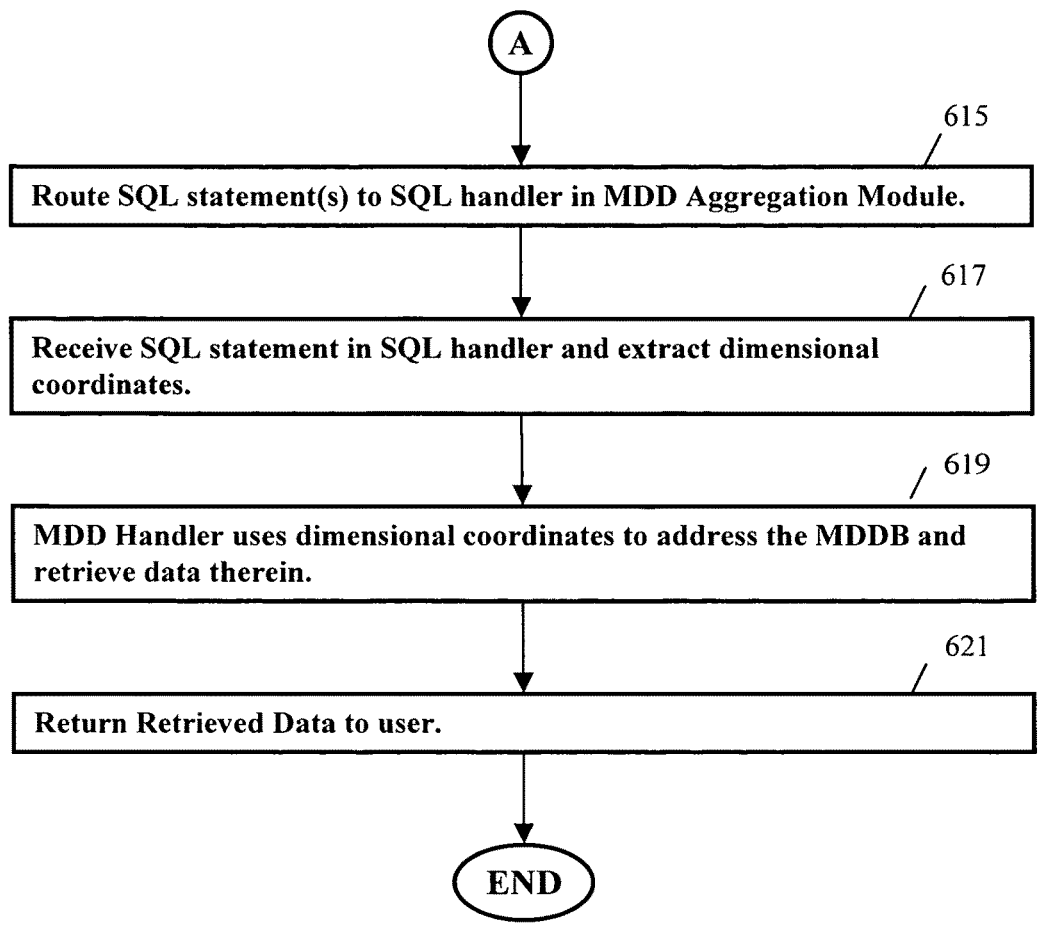
FIG 6C2

|    | Nbr. of Dim. | Nbr. of atomic data values | Leaf node density % | Number of values in cube after roll-up | Oracle EXPRESS v. 6.2 | Implementation of current invention |
|----|---|---|---|---|---|---|
| D1 | 6 | 302 M | 9 | 427 M | 16 h | 15 m |
| D2 | 4 | 414 M | 1.27 | 969 M | 50 m | 5 m |
| D3 | 5 | 14,499 M | 0.03 | 63,954 M | 31 h | 1h 23m |
| D4 | 6 | 623,494 M | $8*10^{-4}$ | 7,930 M | Exceeds 48 h | 2h 20m |
| D5 | 6 | 243,000 G | $10^{-8}$ | 1,160,000 G | 22 h | 4 m |
| D6 | 4 | 7 M | defined as 100 | 19 M | 15 m | 1 m |

FIG. 8A

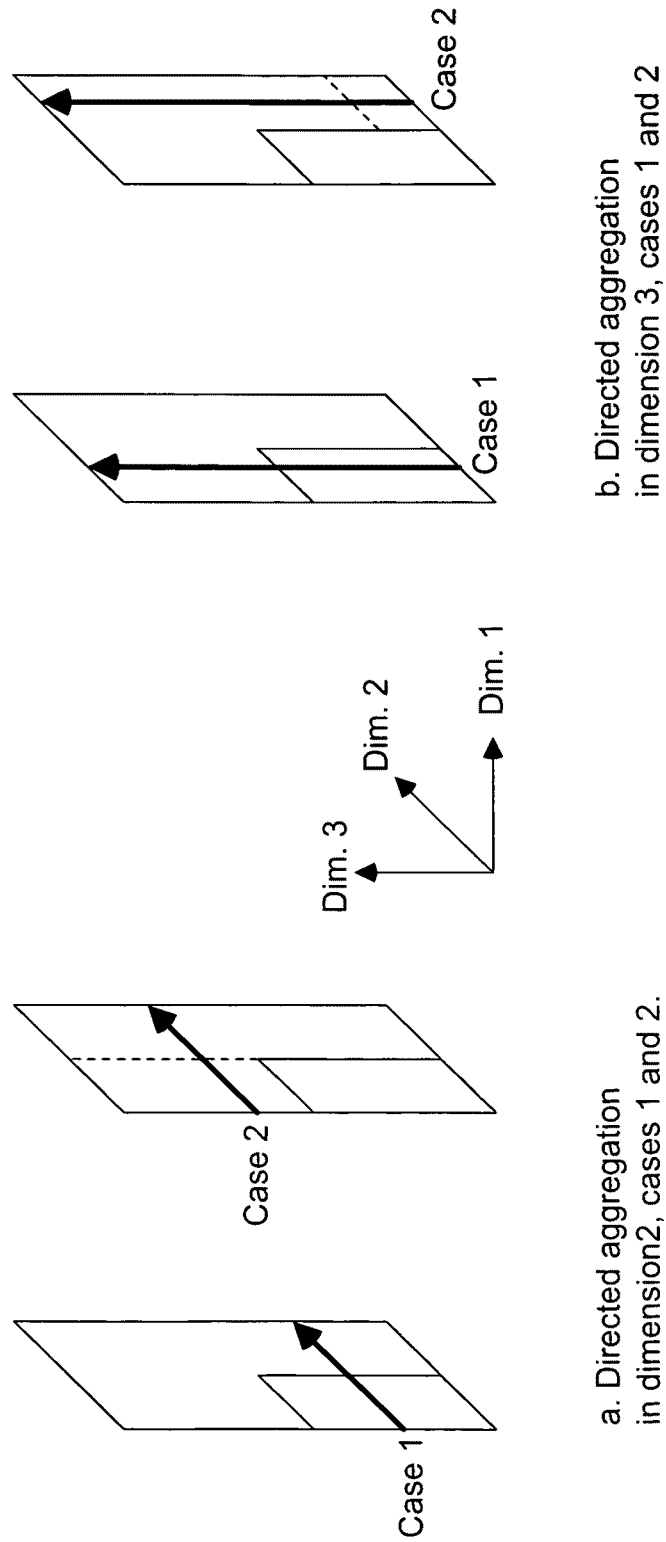
FIG. 9C2
b. Directed aggregation in dimension 3, cases 1 and 2
FIG. 9C1
a. Directed aggregation in dimension 2, cases 1 and 2.

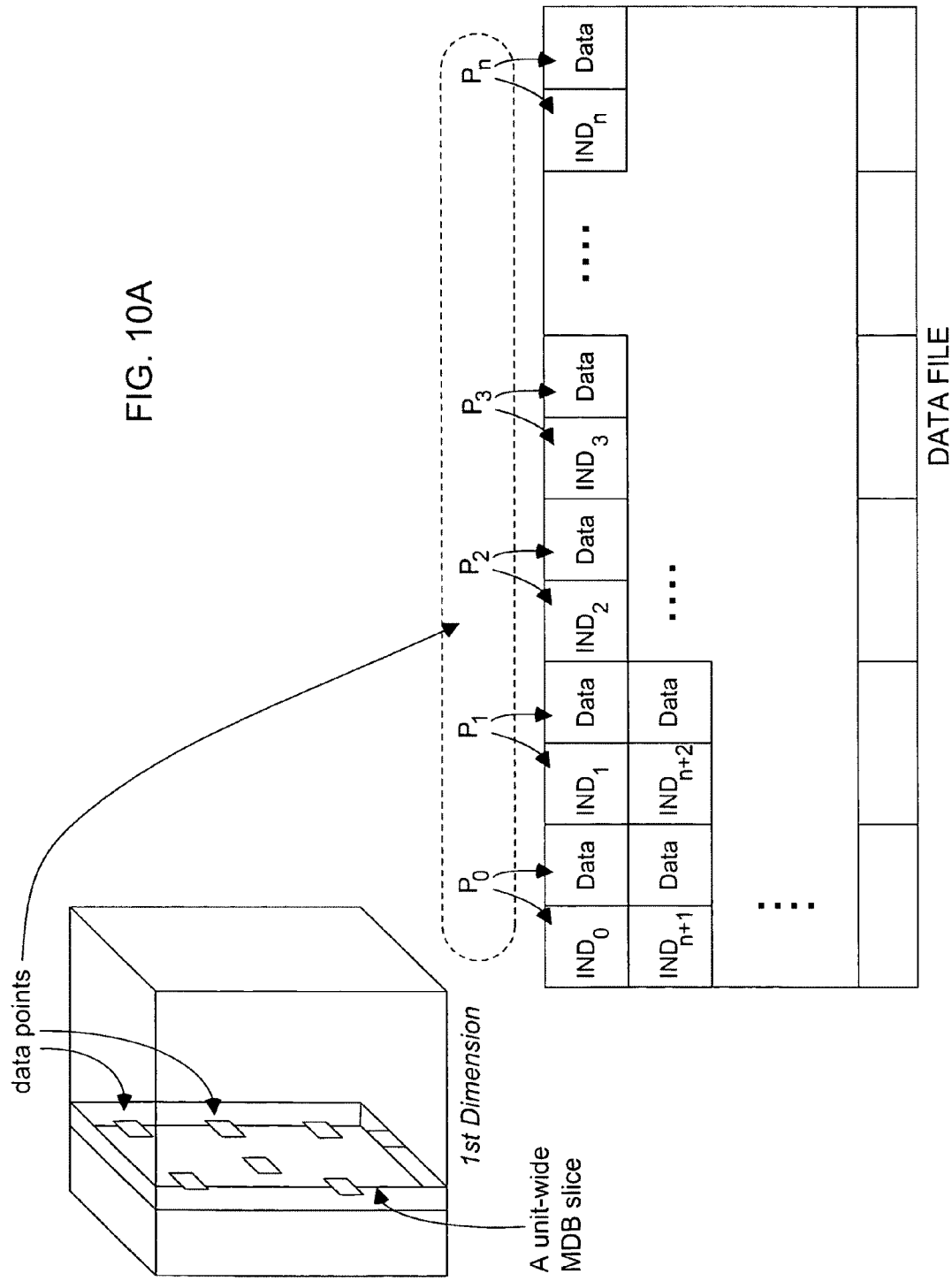

RELATIONAL DATABASE MANAGEMENT SYSTEM HAVING INTEGRATED NON-RELATIONAL MULTI-DIMENSIONAL DATA STORE OF AGGREGATED DATA ELEMENTS

RELATED CASES

This is a Continuation of application Ser. No. 11/473,299 filed Jun. 22, 2006 now abandoned; which is a Continuation of application Ser. No. 10/314,868 filed Dec. 9, 2002, now U.S. Pat. No. 7,392,248; which is a Continuation of application Ser. No. 10/136,937 filed May 1, 2002, now abandoned; which is a Continuation of application Ser. No. 09/634,748 filed Aug. 9, 2000, now U.S. Pat. No. 6,385,604; which is a Continuation-in-part of: application Ser. No. 09/514,611 filed Feb. 28, 2000, now U.S. Pat. No. 6,434,544, and application Ser. No. 09/368,241 filed Aug. 4, 1999, now U.S. Pat. No. 6,408,292; each said Application being commonly owned by HyperRoll Israel, Limited, and herein incorporated by reference in their entirety.

BACKGROUND OF THE INVENTION

1. Field of Invention

The present invention relates generally to multi-dimensional relational databases and, more specifically to mechanisms for aggregating data elements in a multi-dimensional relational database system and for processing queries on such aggregated data elements, and also to informational database systems that utilize multi-dimensional relational databases and such aggregation/query mechanisms.

2. Brief Description of the State of the Art

Information technology (IT) enables an enterprise to manage and optimize its internal business practices through the analysis and sharing of data internally within the enterprise. In addition, IT enables an enterprise to manage and optimize its external business practices through the sharing of data with external parties such as suppliers, customers and investors, and through on-line transactions between the enterprise and external parties. Informational database systems (systems that store data, support query processing on the stored data, and possibly support analysis of the stored data) play a central role in many different parts of today's IT systems.

FIG. 1 illustrates exemplary domains where informational database systems are used. As shown, an operational environment 10 generates data which is stored in a data store 22 in the informational database system 20. These domains include data analysis systems (spread-sheet modeling programs, snap-shots, extraction, denormalization), data warehousing, data marts, OLAP systems, data mining systems, electronic commerce-enabled web servers, and business-to-business exchanges. Modern informational database systems typically use a relational database management system (RDBMS) as a repository for storing the data and querying the data.

FIG. 2 illustrates a data warehouse-OLAP domain that utilizes the prior art approaches described above. The data warehouse is an enterprise-wide data store. It is becoming an integral part of many information delivery systems because it provides a single, central location where a reconciled version of data extracted from a wide variety of operational systems is stored. Details on methods of data integration and constructing data warehouses can be found in the white paper entitled "Data Integration: The Warehouse Foundation" by Louis Rolleigh and Joe Thomas. Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. Such OLAP systems are commonly classified as Relation OLAP systems or Multi-Dimensional OLAP systems.

The Relational OLAP (ROLAP) system accesses data stored in a Data Warehouse to provide OLAP analyses. The premise of ROLAP is that OLAP capabilities are best provided directly against the relational database, i.e. the Data Warehouse. The ROLAP architecture was invented to enable direct access of data from Data Warehouses, and therefore support optimization techniques to meet batch window requirements and provide fast response times. Typically, these optimization techniques include application-level table partitioning, pre-aggregate inferencing, denormalization support, and the joining of multiple fact tables.

A typical ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses. After the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transforms the requests into SQL execution plans. The SQL execution plans are submitted to the relational database for processing, the relational query results are cross-tabulated, and a multidimensional result data set is returned to the end user. ROLAP is a fully dynamic architecture capable of utilizing pre-calculated results when they are available, or dynamically generating results from the raw information when necessary.

The Multidimensional OLAP (MOLAP) systems utilize a MDD or "cube" to provide OLAP analyses. The main premise of this architecture is that data must be stored multi-dimensionally to be accessed and viewed multidimensionally. Such non-relational MDD data structures typically can be queried by users to enable the users to "slice and dice" the aggregated data. As shown in FIG. 2, such MOLAP systems have an Aggregation module which is responsible for all data storage, access, and retrieval processes, including data aggregation (i.e. pre-aggregation) in the MDDB, and an analytical processing and GUI module responsible for interfacing with a user to provide analytical analysis, query input, and reporting of query results to the user.

A more detailed description of the data warehouse and OLAP environment may be found in copending U.S. patent application Ser. No. 09/514,611 to R. Bakalash, G. Shaked, and J. Caspi, commonly assigned to HyperRoll Israel, Limited, incorporated by reference above in its entirety.

In a RDBMS, users view data stored in tables. By contrast, users of a non-relation database system can view other data structures, either instead of or in addition to the tables of the RDBMS system. FIG. 3A illustrates an exemplary table in an RDBMS; and FIGS. 3B and 3C illustrate operators (queries) on the table of FIG. 3A, and the result of such queries, respectively. The operators illustrated in FIGS. 3B and 3C are expressed as Structured Query Language (SQL) statements as is conventional in the art.

The choice of using a RDBMS as the data repository in information database systems naturally stems from the realities of SQL standardization, the wealth of RDBMS-related tools, and readily available expertise in RDBMS systems. However, the querying component of RDBMS technology suffers from performance and optimization problems stemming from the very nature of the relational data model. More specifically, during query processing, the relational data model requires a mechanism that locates the raw data elements that match the query. Moreover, to support queries that involve aggregation operations, such aggregation operations must be performed over the raw data elements that match the query. For large multi-dimensional databases, a naive implementation of these operations involves computational intensive table scans that leads to unacceptable query response times.

In order to better understand how the prior art has approached this problem, it will be helpful to briefly describe the relational database model. According to the relational database model, a relational database is represented by a logical schema and tables that implement the schema. The logical schema is represented by a set of templates that define one or more dimensions (entities) and attributes associated with a given dimension. The attributes associated with a given dimension includes one or more attributes that distinguish it from every other dimension in the database (a dimension identifier). Relationships amongst dimensions are formed by joining attributes. The data structure that represents the set of templates and relations of the logical schema is typically referred to as a catalog or dictionary. Note that the logical schema represents the relational organization of the database, but does not hold any fact data per se. This fact data is stored in tables that implement the logical schema.

Star schemas are frequently used to represent the logical structure of a relational database. The basic premise of star schemas is that information can be classified into two groups: facts and dimensions. Facts are the core data elements being analyzed. For example, units of individual item sold are facts, while dimensions are attributes about the facts. For example, dimensions are the product types purchased and the data purchase. Business questions against this schema are asked looking up specific facts (UNITS) through a set of dimensions (MARKETS, PRODUCTS, PERIOD). The central fact table is typically much larger than any of its dimension tables.

An exemplary star schema is illustrated in FIG. 4A for suppliers (the "Supplier" dimension) and parts (the "Parts" dimension) over time periods (the "Time-Period" dimension). It includes a central fact table "Supplied-Parts" that relates to multiple dimensions—the "Supplier", "Parts" and "Time-Period" dimensions. FIG. 4B illustrates the tables used to implement the star schema of FIG. 4A. More specifically, these tables include a central fact table and a dimension table for each dimension in the logical schema of FIG. 4A. A given dimension table stores rows (instances) of the dimension defined in the logical schema. For the sake of description, FIG. 4B illustrates the dimension table for the "Time-Period" dimension only. Similar dimension tables for the "Supplier" and "Part" dimensions (not shown) are also included in such an implementation. Each row within the central fact table includes a multi-part key associated with a set of facts (in this example, a number representing a quantity). The multi-part key of a given row (values stored in the S#, P#, TP# fields as shown) points to rows (instances) stored in the dimension tables described above. A more detailed description of star schemas and the tables used to implement star schemas may be found in C. J. Date, "An Introduction to Database Systems," Seventh Edition, Addison-Wesley, 2000, pp. 711-715, herein incorporated by reference in its entirety.

When processing a query, the tables that implement the schema are accessed to retrieve the facts that match the query. For example, in a star schema implementation as described above, the facts are retrieved from the central fact table and/or the dimension tables. Locating the facts that match a given query involves one or more join operations. Moreover, to support queries that involve aggregation operations, such aggregation operations must be performed over the facts that match the query. For large multi-dimensional databases, a naive implementation of these operations involves computational intensive table scans that typically leads to unacceptable query response times. Moreover, since the fact tables are pre-summarized and aggregated along business dimensions, these tables tend to be very large. This point becomes an important consideration of the performance issues associated with star schemas. A more detailed discussion of the performance issues (and proposed approaches that address such issues) related to joining and aggregation of star schema is now set forth.

The first performance issue arises from computationally intensive table scans that are performed by a naive implementation of data joining. Indexing schemes may be used to bypass these scans when performing joining operations. Such schemes include B-tree indexing, inverted list indexing and aggregate indexing. A more detailed description of such indexing schemes can be found in "The Art of Indexing", Dynamic Information Systems Corporation, October 1999. All of these indexing schemes replaces table scan operations (involved in locating the data elements that match a query) with one or more index lookup operation. Inverted list indexing associates an index with a group of data elements, and stores (at a location identified by the index) a group of pointers to the associated data elements. During query processing, in the event that the query matches the index, the pointers stored in the index are used to retrieve the corresponding data elements pointed therefrom. Aggregation indexing integrates an aggregation index with an inverted list index to provide pointers to raw data elements that require aggregation, thereby providing for dynamic summarization of the raw data elements that match the user-submitted query.

These indexing schemes are intended to improve join operations by replacing table scan operations with one or more index lookup operation in order to locate the data elements that match a query. However, these indexing schemes suffer from various performance issues as follows:

Since the tables in the star schema design typically contain the entire hierarchy of attributes (e.g. in a PERIOD dimension, this hierarchy could be day>week>month>quarter>year), a multipart key of day, week, month, quarter, year has to be created; thus, multiple meta-data definitions are required (one of each key component) to define a single relationship; this adds to the design complexity, and sluggishness in performance.

Addition or deletion of levels in the hierarchy will require physical modification of the fact table, which is time consuming process that limits flexibility.

Carrying all the segments of the compound dimensional key in the fact table increases the size of the index, thus impacting both performance and scalability.

Another performance issue arises from dimension tables that contain multiple hierarchies. In such cases, the dimensional table often includes a level of hierarchy indicator for every record. Every retrieval from fact table that stores details and aggregates must use the indicator to obtain the correct result, which impacts performance. The best alternative to using the level indicator is the snowflake schema. In this schema aggregate tables are created separately from the detail tables. In addition to the main fact tables, snowflake schema contains separate fact tables for each level of aggregation. Notably, the snowflake schema is even more complicated than a star schema, and often requires multiple SQL statements to get the results that are required.

Another performance issue arises from the pairwise join problem. Traditional RDBMS engines are not design for the rich set of complex queries that are issued against a star schema. The need to retrieve related information from several tables in a single query—"join processing"—is severely limited. Many RDBMSs can join only two tables at a time. If a complex join involves more than two tables, the RDBMS needs to break the query into a series of pairwise joins. Selecting the order of these joins has a dramatic performance impact. There are optimizers that spend a lot of CPU cycles to find the best order in which to execute those joins. Unfortunately, because the number of combinations to be evaluated grows exponentially with the number of tables being joined, the problem of selecting the best order of pairwise joins rarely can be solved in a reasonable amount of time.

Moreover, because the number of combinations is often too large, optimizers limit the selection on the basis of a criterion of directly related tables. In a star schema, the fact table is the only table directly related to most other tables, meaning that the fact table is a natural candidate for the first pairwise join. Unfortunately, the fact table is the very largest table in the query, so this strategy leads to selecting a pairwise join order that generates a very large intermediate result set, severely affecting query performance.

This is an optimization strategy, typically referred to as Cartesian Joins, that lessens the performance impact of the pairwise join problem by allowing joining of unrelated tables. The join to the fact table, which is the largest one, is deferred until the very end, thus reducing the size of intermediate result sets. In a join of two unrelated tables every combination of the two tables' rows is produced, a Cartesian product. Such a Cartesian product improves query performance. However, this strategy is viable only if the Cartesian product of dimension rows selected is much smaller than the number of rows in the fact table. The multiplicative nature of the Cartesian join makes the optimization helpful only for relatively small databases.

In addition, systems that exploit hardware and software parallelism have been developed that lessens the performance issues set forth above. Parallelism can help reduce the execution time of a single query (speed-up), or handle additional work without degrading execution time (scale-up). For example, Red Brick™ has developed STARjoin™ technology that provides high speed, parallelizable multi-table joins in a single pass, thus allowing more than two tables can be joined in a single operation. The core technology is an innovative approach to indexing that accelerates multiple joins. Unfortunately, parallelism can only reduce, not eliminate, the performance degradation issues related to the star schema.

One of the most fundamental principles of the multidimensional database is the idea of aggregation. The most common aggregation is called a roll-up aggregation. This type is relatively easy to compute: e.g. taking daily sales totals and rolling them up into a monthly sales table. The more difficult are analytical calculations, the aggregation of Boolean and comparative operators. However these are also considered as a subset of aggregation.

In a star schema, the results of aggregation are summary tables. Typically, summary tables are generated by database administrators who attempt to anticipate the data aggregations that the users will request, and then pre-build such tables. In such systems, when processing a user-generated query that involves aggregation operations, the pre-built aggregated data that matches the query is retrieved from the summary tables (if such data exists). FIGS. 5A and 5B illustrate a multi-dimensional relational database using a star schema and summary tables. In this example, the summary tables are generated over the "time" dimension storing aggregated data for "month", "quarter" and "year" time periods as shown in FIG. 5B. Summary tables are in essence additional fact tables, of higher levels. They are attached to the basic fact table creating a snowflake extension of the star schema. There are hierarchies among summary tables because users at different levels of management require different levels of summarization. Choosing the level of aggregation is accomplished via the "drill-down" feature.

Summary tables containing pre-aggregated results typically provide for improved query response time with respect to on-the-fly aggregation. However, summary tables suffer from some disadvantages:

summary tables require that database administrators anticipate the data aggregation operations that users will require; this is a difficult task in large multi-dimensional databases (for example, in data warehouses and data mining systems), where users always need to query in new ways looking for new information and patterns.

summary tables do not provide a mechanism that allows efficient drill down to view the raw data that makes up the summary table—typically a table scan of one or more large tables is required.

querying is delayed until pre-aggregation is completed.

there is a heavy time overhead because the vast majority of the generated information remains unvisited.

there is a need to synchronize the summary tables before the use.

the degree of viable parallelism is limited because the subsequent levels of summary tables must be performed in pipeline, due to their hierarchies.

for very large databases, this option is not valid because of time and storage space.

Note that it is common to utilize both pre-aggregated results and on-the-fly aggregation in support aggregation. In these system, partial pre-aggregation of the facts results in a small set of summary tables. On-the-fly aggregation is used in the case the required aggregated data does not exist in the summary tables.

Note that in the event that the aggregated data does not exist in the summary tables, table join operations and aggregation operations are performed over the raw facts in order to generate such aggregated data. This is typically referred to as on-the-fly aggregation. In such instances, aggregation indexing is used to mitigate the performance of multiple data joins associated with dynamic aggregation of the raw data. Thus, in large multi-dimensional databases, such dynamic aggregation may lead to unacceptable query response times.

In view of the problems associated with joining and aggregation within RDBMS, prior art ROLAP systems have suffered from essentially the same shortcomings and drawbacks of their underlying RDBMS.

While prior art MOLAP systems provide for improved access time to aggregated data within their underlying MDD structures, and have performance advantages when carrying out joining and aggregations operations, prior art MOLAP architectures have suffered from a number of shortcomings and drawbacks which Applicants have detailed in their copending U.S. application Ser. Nos. 09/368,241 and 09/514,611 incorporated herein by reference.

In summary, such shortcomings and drawbacks stem from the fact that there is unidirectional data flow from the RDBMS to the MOLAP system. More specifically, atomic (raw) data is moved, in a single transfer, to the MOLAP system for aggregation, analysis and querying. Importantly, the aggregation results are external to the RDBMS. Thus, users of the RDBMS cannot directly view these results. Such results are accessible only from the MOLAP system. Because the MDD query processing logic in prior art MOLAP systems is separate from that of the RDBMS, users must procure rights to access to the MOLAP system and be instructed (and be careful to conform to such instructions) to access the MDD (or the RDBMS) under certain conditions. Such requirements can present security issues, highly undesirable for system administration. Satisfying such requirements is a costly and logistically cumbersome process. As a result, the widespread applicability of MOLAP systems has been limited.

Thus, there is a great need in the art for an improved mechanism for joining and aggregating data elements within a relational database management system, and for integrating the improved relational database management system into informational database systems (including the data warehouse and OLAP domains), while avoiding the shortcomings and drawbacks of prior art systems and methodologies.

SUMMARY AND OBJECTS OF PRESENT INVENTION

Accordingly, it is an object of the present invention to provide an improved method of and system for joining and aggregating data elements integrated within a relational database management system (RDBMS) using a non-relational multi-dimensional data structure (MDD), achieving a significant increase in system performance (e.g. decreased access/search time), user flexibility and ease of use.

Another object of the present invention is to provide such an RDBMS wherein its integrated data aggregation module supports high-performance aggregation (i.e. data roll-up) processes to maximize query performance of large data volumes.

Another object of the present invention is to provide such an RDBMS system, wherein its integrated data aggregation (i.e. roll-up) module speeds up the aggregation process by orders of magnitude, enabling larger database analysis by lowering the aggregation times.

Another object of the present invention is to provide such a novel RDBMS system for use in OLAP operations.

Another object of the present invention is to provide a novel RDBMS system having an integrated aggregation module that carries out an novel rollup (i.e. down-up) and spread down (i.e. top-down) aggregation algorithms.

Another object of the present invention is to provide a novel RDBMS system having an integrated aggregation module that carries out full pre-aggregation and/or "on-the-fly" aggregation processes.

Another object of the present invention is to provide a novel RDBMS system having an integrated aggregation module which is capable of supporting a MDD having a multi-hierarchy dimensionality.

These and other object of the present invention will become apparent hereinafter and in the Claims to Invention set forth herein.

BRIEF DESCRIPTION OF THE DRAWINGS

In order to more fully appreciate the objects of the present invention, the following Detailed Description of the Illustrative Embodiments should be read in conjunction with the accompanying Drawings, wherein:

FIGS. 3A-3C are schematic representations of exemplary tables employed in a prior art Relational Database Management System (RDBMS); FIGS. 3B and 3C illustrate operators (queries) on the table of FIG. 3A, and the result of such queries, respectively.

FIG. 4B is a schematic representation of tables used to implement the schema shown in FIG. 4A.

FIGS. 6C1 and 6C2, taken together, set forth a flow chart representation of the primary operations carried out within the RDBMS of the present invention when performing data aggregation and related support operations, including the servicing of user-submitted (e.g. natural language) queries made on such aggregated database of the present invention.

FIG. 8A is a data table setting forth information representative of performance benchmarks obtained by the shared-platform type implementation of the MDD Aggregation Module of the illustrative embodiment serving the conventional OLAP server (i.e. Oracle EXPRESS Server, wherein the common hardware/software platform is realized using a Pentium II 450 Mhz, 1 GB RAM, 18 GB Disk, running the Microsoft NT operating system (OS);

FIG. 9C1 is a schematic representation of the Query Directed Roll-up (QDR) aggregation method/procedure of the present invention, showing data aggregation starting from existing basic data or previously aggregated data in the first dimension (D1), and such aggregated data being utilized as a basis for QDR aggregation along the second dimension (D2).

FIG. 9C2 is a schematic representation of the Query Directed Roll-up (QDR) aggregation method/procedure of the present invention, showing initial data aggregation starting from existing previously aggregated data in the second third (D3), and continuing along the third dimension (D3), and thereafter continuing aggregation along the second dimension (D2).

FIG. 10A is a schematic representation of the "slice-storage" method of storing sparse data in the disk storage devices of the MDDB of FIG. 6B in accordance with the principles of the present invention, based on an ascending-ordered index along aggregation direction, enabling fast retrieval of data.

DETAILED DESCRIPTION OF THE PREFERRED EMBODIMENTS OF THE PRESENT INVENTION

Referring now to FIG. 6A through FIG. 13, the preferred embodiments of the method and system of the present invention will be now described in great detail herein below.

Through this document, the term "aggregation" and "pre-aggregation" shall be understood to mean the process of summation of numbers, as well as other mathematical operations, such as multiplication, subtraction, division etc. It shall be understood that pre-aggregation operations occur asynchronously with respect to the traditional query processing operations. Moreover, the term "atomic data" shall be understood to refer to the lowest level of data granularity required for effective decision making. In the case of a retail merchandising manager, atomic data may refer to information by store, by day, and by item. For a banker, atomic data may be information by account, by transaction, and by branch.

In general, the improved RDBMS system of the present invention excels in performing two distinct functions, namely: the aggregation of data; and the handling of the resulting data for "on demand" client use. Moreover, because of improved data aggregation capabilities, the RDBMS of the present invention can be employed in a wide range of applications, including Data Warehouses supporting OLAP systems and the like. For purposes of illustration, initial focus will be accorded to the RDMS of the present invention.

Figure 6A:
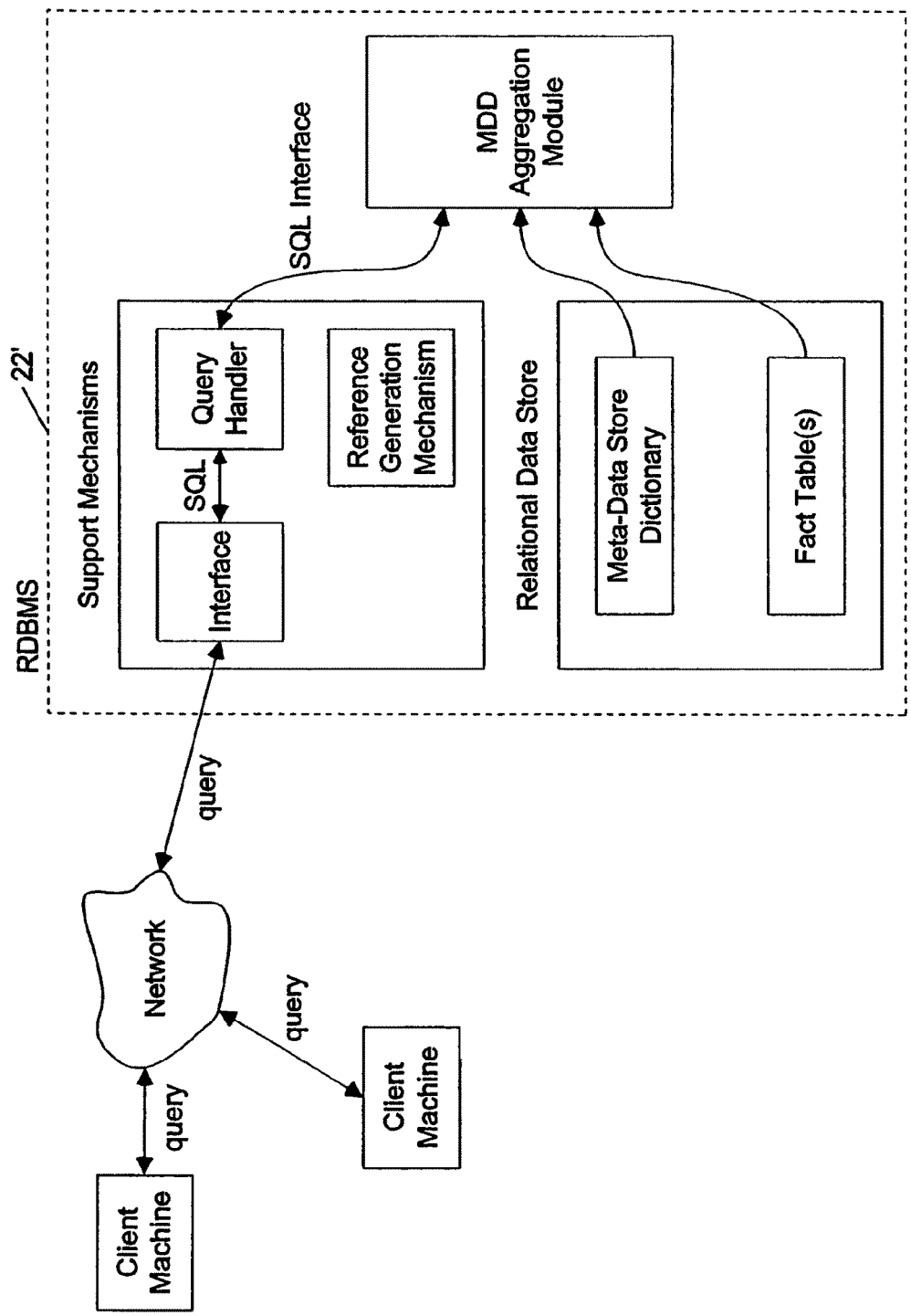
FIG. 6A is a schematic representation of a generalized embodiment of an RDBMS of the present invention comprising a relational database having an integrated multidimensional (MDD) aggregation module supporting queries from a plurality of clients, wherein the aggregation engine performs aggregation functions (e.g. summation of numbers, as well as other mathematical operations, such as multiplication, subtraction, division etc.) and non-relational multi-dimensional data storage functions.

FIG. 6A illustrates the primary components of an illustrative embodiment of the RDBMS of the present invention, namely: support mechanisms including a query interface and query handler, a relational data store including one or more fact tables and a meta-data store for storing a dictionary (catalogue), and an MDD Aggregation Module that stores atomic data and aggregated data in a non-relational MDD. It should be noted that the RDBMS typically includes additional components (not shown) that are not relevant to the present invention. The query interface and query handler service user-submitted queries (in the preferred embodiment, SQL query statements) forwarded, for example, from a client machine over a network as shown. The query handler, fact table and meta-data store communicate to the MDD Aggregation Module. Importantly, the query handler and integrated MDD Aggregation Module operates to provide for dramatically improved query response times for data aggregation operations and drill-downs. Moreover, it is an object of the present invention to make user-querying of the non-relational MDDB no different than querying a relational table of the RDBMS, in a manner that minimizes the delays associated with queries that involve aggregation or drill down operations. This object is enabled by providing the novel RDBMS system and integrated aggregation mechanism of the present invention.

Figure 6B:
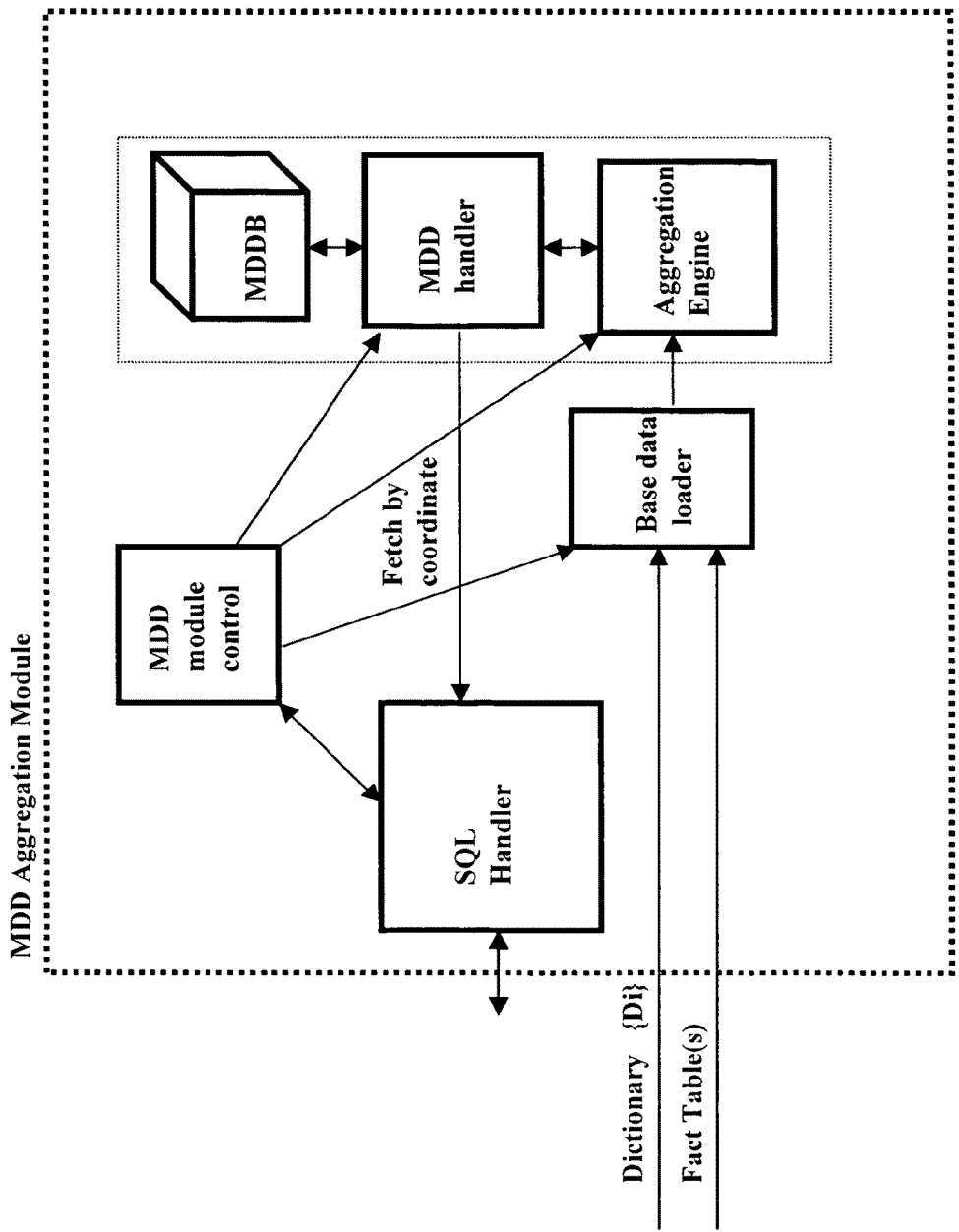
FIG. 6B is a schematic block diagram of the MDD aggregation module of the illustrative embodiment of the present invention shown in FIG. 6A.

FIG. 6B shows the primary components of an illustrative embodiment of the MDD Aggregation Module of FIG. 6A, namely: a base data loader for loading the directory and fact table(s) of the RDBMS; an aggregation engine for receiving dimension data and fact data from the base loader, a multi-dimensional database (MDDB); a MDDB handler, an SQL handler that operates cooperatively with the query handler of the RDBMS to provide users with query access to the MDD Aggregation Module, and a control module for managing the operation of the components of the MDD aggregation module. The base data loader may load the directory and fact tables over a standard interface (such as OLDB, OLE-DB, ODBC, SQL, API, JDBC, etc.). In this case, the RDBMS and base data loader include components that provide communication of such data over these standard interfaces. Such interface components are well known in the art. For example, such interface components are readily available from Attunity Corporation.

During operation, the base data originates from the fact table(s) of the RDBMS. The core data aggregation operations are performed by the Aggregation Engine; a Multidimensional Data Handler; and a Multidimensional Data Storage. The results of data aggregation are efficiently stored in a multidimensional data storage (MDDB), by the Data Handler. The SQL handler of the MDD Aggregation module services user-submitted queries (in the preferred embodiment, SQL query statements) forwarded from the query handler of the RDBMS. The SQL handler of the MDD Aggregation module may communicate with the query handler of the RDBMS over a standard interface (such as OLDB, OLE-DB, ODBC, SQL, API, JDBC, etc.). In this case, the support mechanisms of the RDBMS and SQL handler include components that provide communication of such data over these standard interfaces. Such interface components are well known in the art. Aggregation (or drill down results) are retrieved on demand and returned to the user.

Typically, a user interacts with a client machine (for example, using a web-enabled browser) to generate a natural language query, that is communicated to the query interface of the RDBMS, for example over a network as shown. The query interface disintegrates the query, via parsing, into a series of requests (in the preferred embodiment, SQL statements) that are communicated to the query handler of the RDBMS. It should be noted that the functions of the query interface may be implemented in a module that is not part of the RDBMS (for example, in the client machine). The query handler of the RDBMS forwards requests that involve data stored in the MDD of the MDD Aggregation module to the SQL hander of the MDD Aggregation module for servicing. Each request specifies a set of n-dimensions. The SQL handler of the MDD Aggregation Module extracts this set of dimensions and operates cooperatively with the MDD handler to address the MDDB using the set of dimensions, retrieve the addressed data from the MDDB, and return the results to the user via the query handler of the RDBMS.

Figure 1:
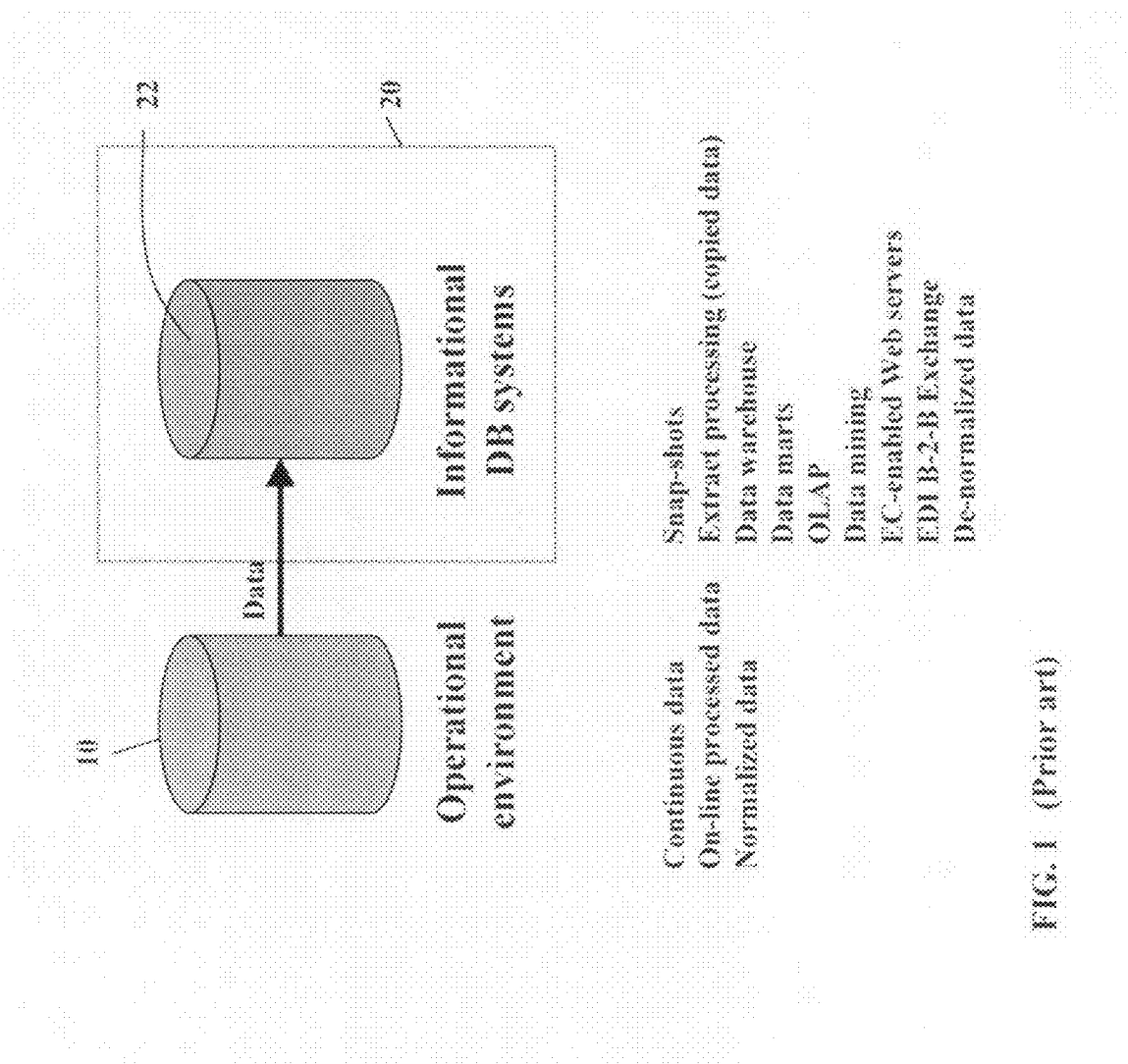
FIG. 1 is a schematic representation of a prior art information database system, wherein the present invention may be embodied.
Figure 2:
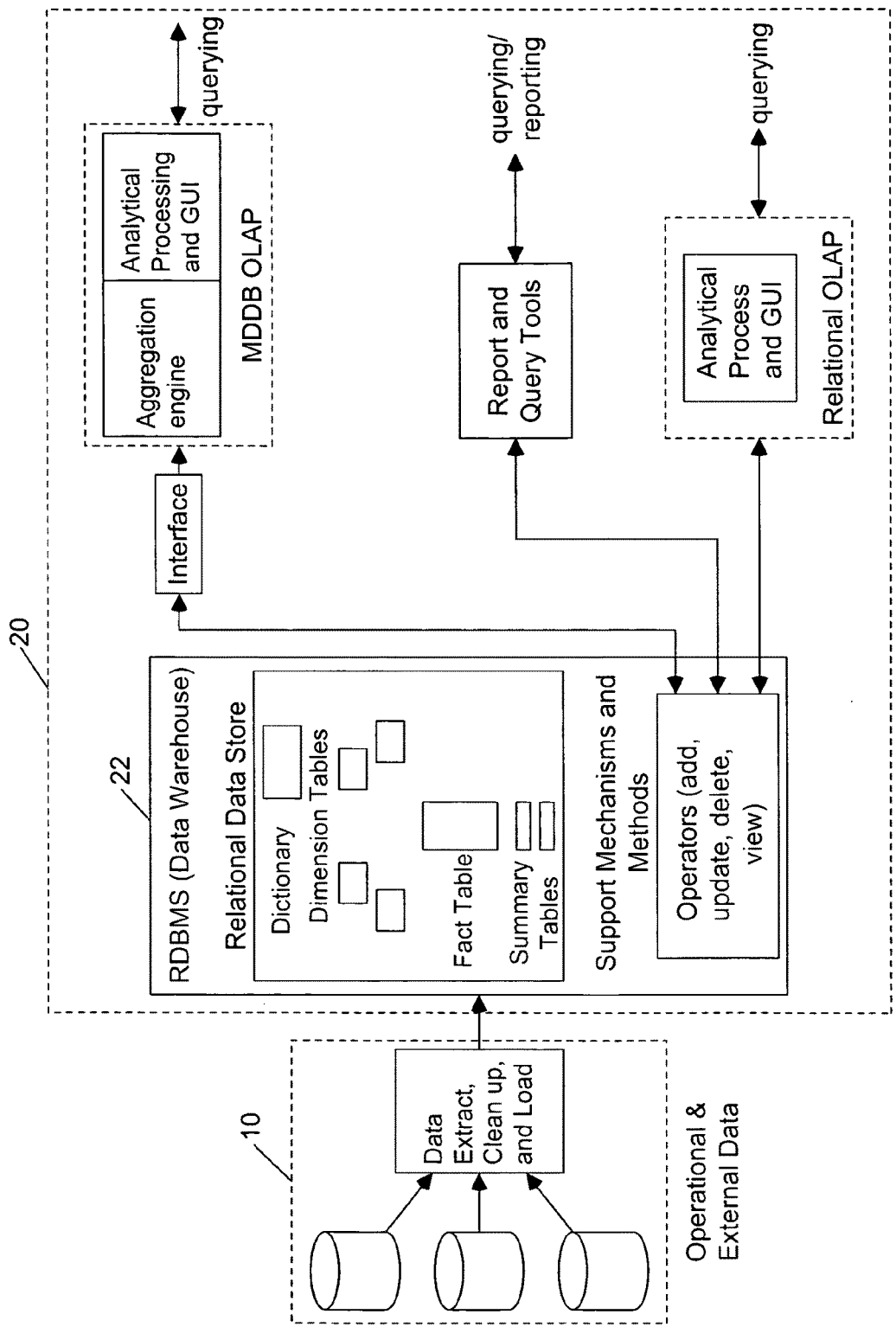
FIG. 2 is a schematic representation of the prior art data warehouse and OLAP system, wherein the present invention may be embodied.
Figure 4A:
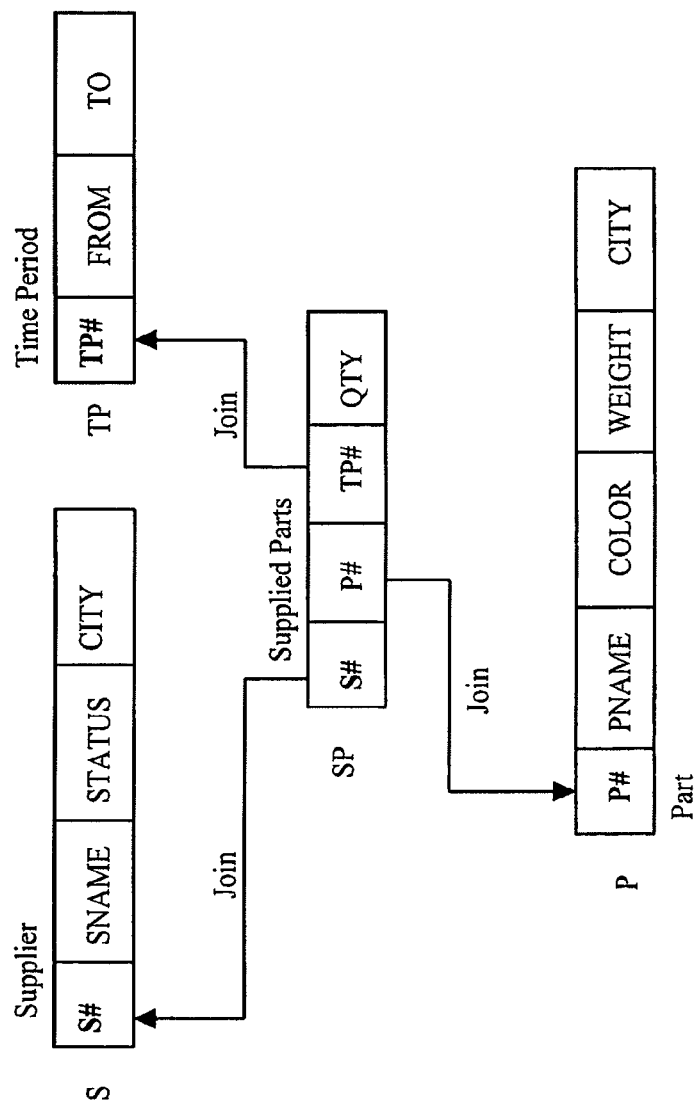
FIG. 4A is a schematic representation of an exemplary dimensional schema (star schema) of a relational database.
Figure 5A:
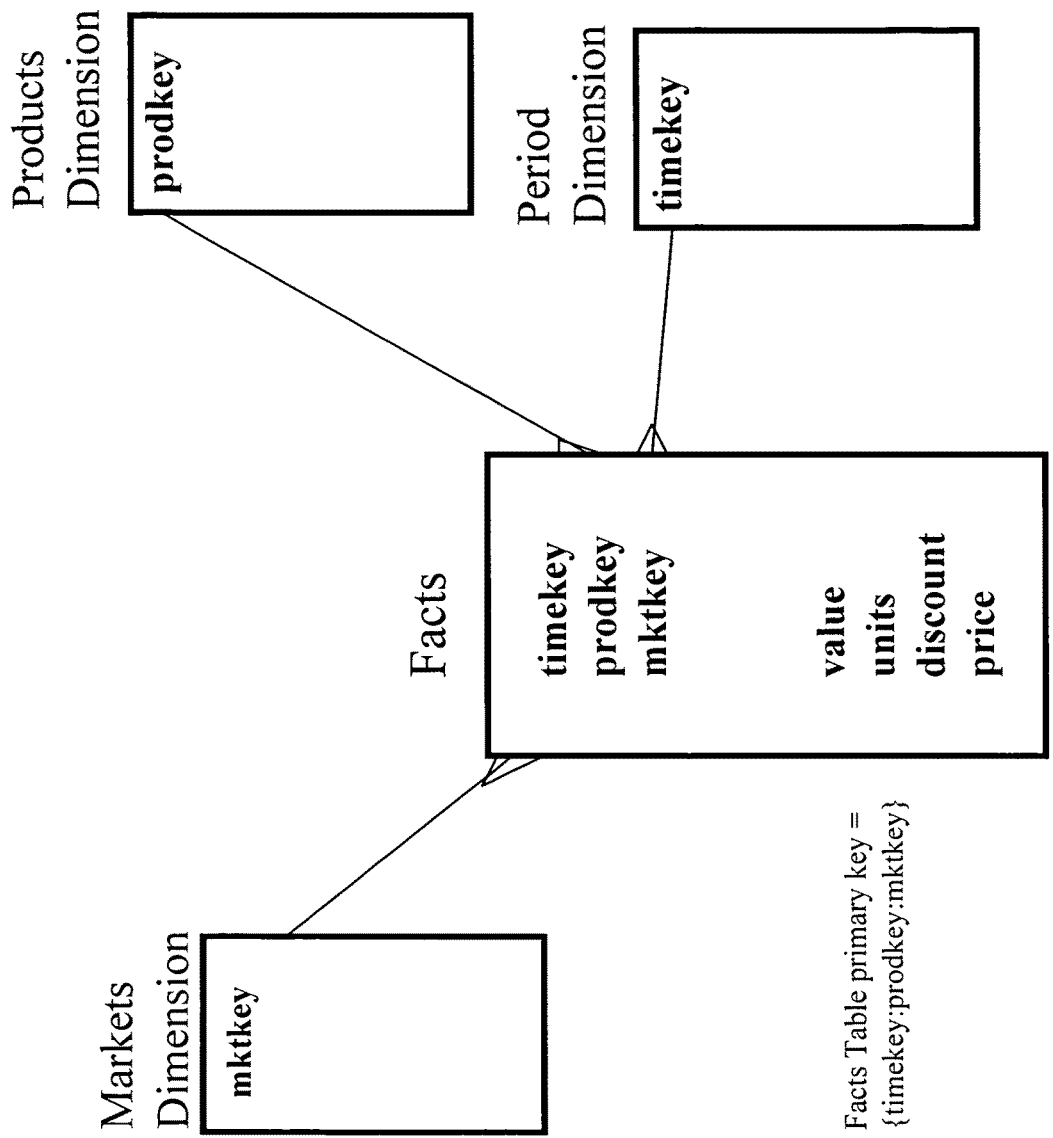
FIG. 5A is a schematic representation of an exemplary multidimensional schema (star schema).
Figure 5B:
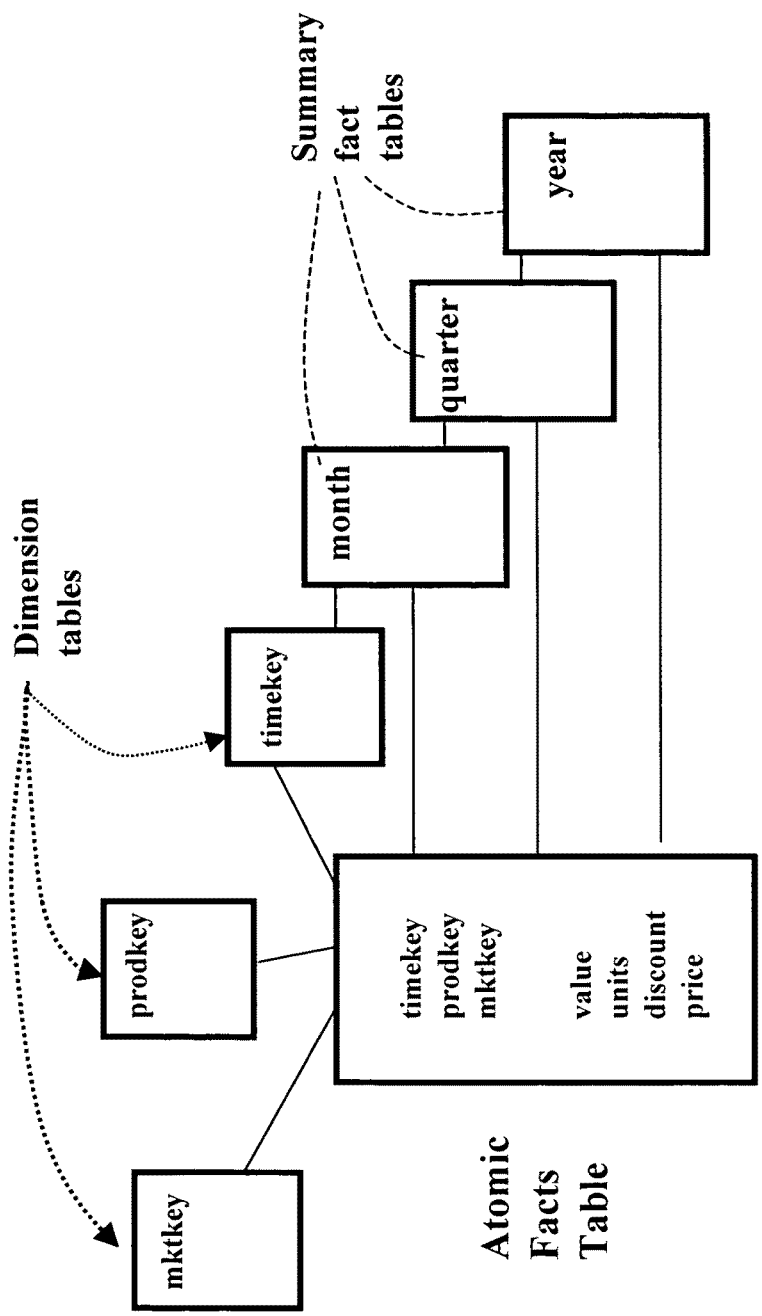
FIG. 5B is a schematic representation of tables used to implement the schema of FIG. 5A, including summary tables storing results of aggregation operations performed on the facts of the central fact table along the time-period dimension, in accordance with conventional teachings.

FIGS. 6C1 and 6C2 set forth a flow chart illustrating the operations of an illustrative RDBMS of the present invention. In step 601, the base data loader of the MDD Aggregation Module loads the dictionary (or catalog) from the meta-data store in the RDBMS. In performing this function, the base data loader may utilize an adapter (interface) that maps the data types of the dictionary of the RDBMS (or that maps a standard data type used to represent the dictionary of the RDBMS) into the data types used in the MDD aggregation module. In addition, the base data loader extracts the dimensions from the dictionary and forwards the dimensions to the aggregation engine of the MDD Aggregation Module.

In step 603, the base data loader loads the fact table(s) from the RDBMS. In performing this function, the base data loader may utilize an adapter (interface) that maps the data types of the fact table(s) of the RDBMS (or that maps a standard data type used to represent the fact table(s) of the RDBMS) into the data types used in the MDD Aggregation Module. In addition, the base data loader extracts the atomic data from the fact table, and forwards the atomic data to the aggregation engine.

In step 605, the aggregation engine rolls-up (aggregates) the atomic data (provided by the base data loader in step 603) along at least one of the dimensions and operates cooperatively with the MDD handler to store the resultant aggregated data in the MDD database. A more detailed description of exemplary aggregation operations according to a preferred embodiment of the present invention is set forth below with respect to the QDR process of FIGS. 9A-9C.

In step 607, a reference is defined that provides users with the ability to query the data generated by the MDD Aggregation Module and/or stored in the MDDB of the MDD Aggregation Module. This reference is preferably defined using the Create View SQL statement, which allows the user to: i) define a table name (TN) associated with the MDD database stored in the MDD Aggregation Module, and ii) define a link used to route SQL statements on the table TN to the MDD Aggregation Module. In this embodiment, the view mechanism of the RDBMS enables reference and linking to the data stored in the MDDB of the MDD Aggregation Engine as illustrated in FIG. 6E. A more detailed description of the view mechanism and the Create View SQL statement may be found in C. J. Date, "An Introduction to Database Systems," Addison-Wesley, Seventh Edition, 2000, pp. 289-326, herein incorporated by reference in its entirety. Thus, the view mechanism enables the query handler of the RDBMS system to forward any SQL query on table TN to the MDD aggregation module via the associated link. In an alternative embodiment, a direct mechanism (e.g., NA trigger mechanism) may be used to enable the RDBMS system to reference and link to the data generated by the MDD Aggregation Module and/or stored in the MDDB of the MDD Aggregation Engine as illustrated in FIG. 6F. A more detailed description of trigger mechanisms and methods may be found in C. J. Date, "An Introduction to Database Systems," Addison-Wesley, Seventh Edition, 2000, pp. 250, 266, herein incorporated by reference in its entirety.

In step 609, a user interacts with a client machine to generate a query, and the query is communicated to the query interface. The query interface generate one or more SQL statements on the reference defined in step 607 (this reference refers to the data stored in the MDDB of the MDD Aggregation Module), and forwards the SQL statement(s) to the query handler of the RDBMS.

In step 611, the query handler receives the SQL statement(s); and optionally transforms such SQL statement(s) to optimize the SQL statement (s) for more efficient query handling. Such transformations are well known in the art. For example, see Kimball, Aggregation Navigation With (Almost) No MetaData", DBMS Data Warehouse Supplement, August 1996.

In step 613: the query handler determines whether the received SQL statement(s) [or transformed SQL statement(s)] is on the reference generated in step 607. If so, operation continues to step 615; otherwise normal query handling operations continue is step 625

In step 615, the received SQL statement(s) [or transformed SQL statement(s)] is routed to the MDD aggregation engine for processing in step 617 using the link for the reference as described above with respect to step 607.

In step 617, the SQL statement(s) is received by the SQL handler of the MDD Aggregation Module, wherein a set of one or more N-dimensional coordinates are extracted from the SQL statement. In performing this function, SQL handler may utilize an adapter (interface) that maps the data types of the SQL statement issued by query handler of the RDBMS (or that maps a standard data type used to represent the SQL statement issued by query handler of the RDBMS) into the data types used in the MDD aggregation module.

In step 619, the set of N-dimensional coordinates extracted in step 617 are used by the MDD handler to address the MDDB and retrieve the corresponding data from the MDDB.

Finally, in step 621, the retrieved data is returned to the user via the RDBMS (for example, by forwarding the retrieved data to the SQL handler, which returns the retrieved data to the query handler of the RDBMS system, which returns the results of the user-submitted query to the user via the client machine), and the operation ends.

It should be noted that the facts (base data), as it arrives from RDBMS, may be analyzed and reordered to optimize hierarchy handling, according to the unique method of the present invention, as described later with reference to FIGS. 11A and 11B.

Figure 9A:
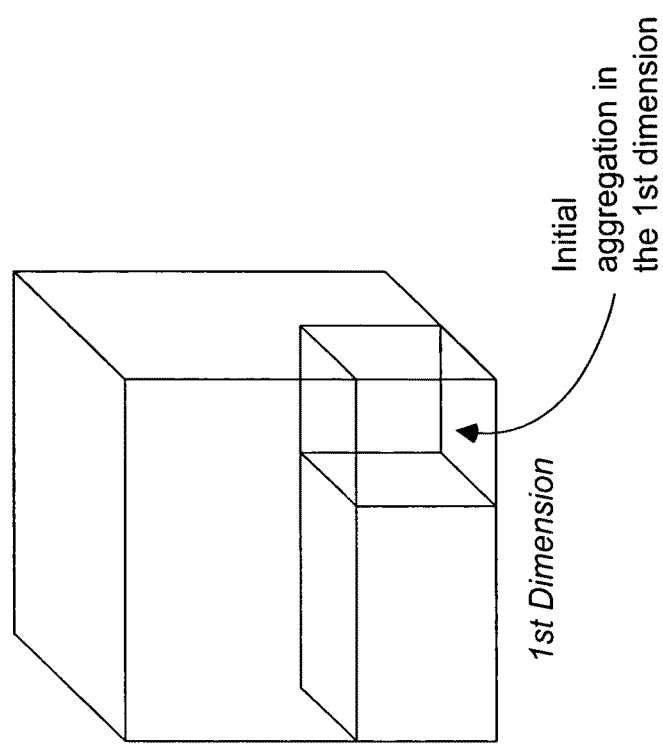
FIG. 9A is a schematic representation of the first stage in the method of segmented aggregation according to the principles of the present invention, showing initial aggregation along the 1st dimension.
Figure 9B:
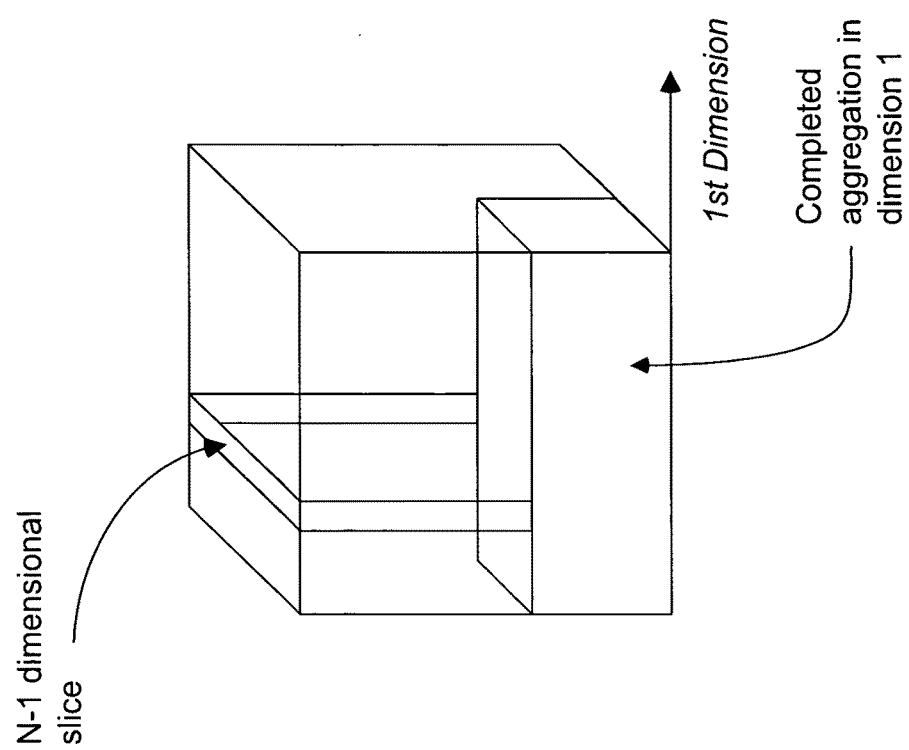
FIG. 9B is a schematic representation of the next stage in the method of segmented aggregation according to the principles of the present invention, showing that any segment along dimension 1, such as the shown slice, can be separately aggregated along the remaining dimensions, 2 and 3, and that in general, for an N dimensional system, the second stage involves aggregation in N−1 dimensions. The principle of segmentation can be applied on the first stage as well, however, only a large enough data will justify such a sliced procedure in the first dimension. Actually, it is possible to consider each segment as an N−1 cube, enabling recursive computation.

Moreover, the MDD control module of the MDD Aggregation Module preferably administers the aggregation process according to the method illustrated in FIGS. 9A and 9B. Thus, in accordance with the principles of the present invention, data aggregation within the RDBMS can be carried out either as a complete pre-aggregation process, where the base data is fully aggregated before commencing querying, or as a query directed roll-up (QDR) process, where querying is allowed at any stage of aggregation using the "on-the-fly" data aggregation process of the present invention. The QDR process will be described hereinafter in greater detail with reference to FIG. 9C. The response to a request (i.e. a basic component of a client query) requiring "on-the-fly" data aggregation, or requiring access to pre-aggregated result data via the MDD handler is provided by a query/request serving mechanism of the present invention within the MDD control module, the primary operations of which are illustrated in the flow chart of FIG. 6D. The function of the MDD Handler is to handle multidimensional data in the storage(s) module in a very efficient way, according to the novel method of the present invention, which will be described in detail hereinafter with reference to FIGS. 10A and 10B.

Figure 6D:
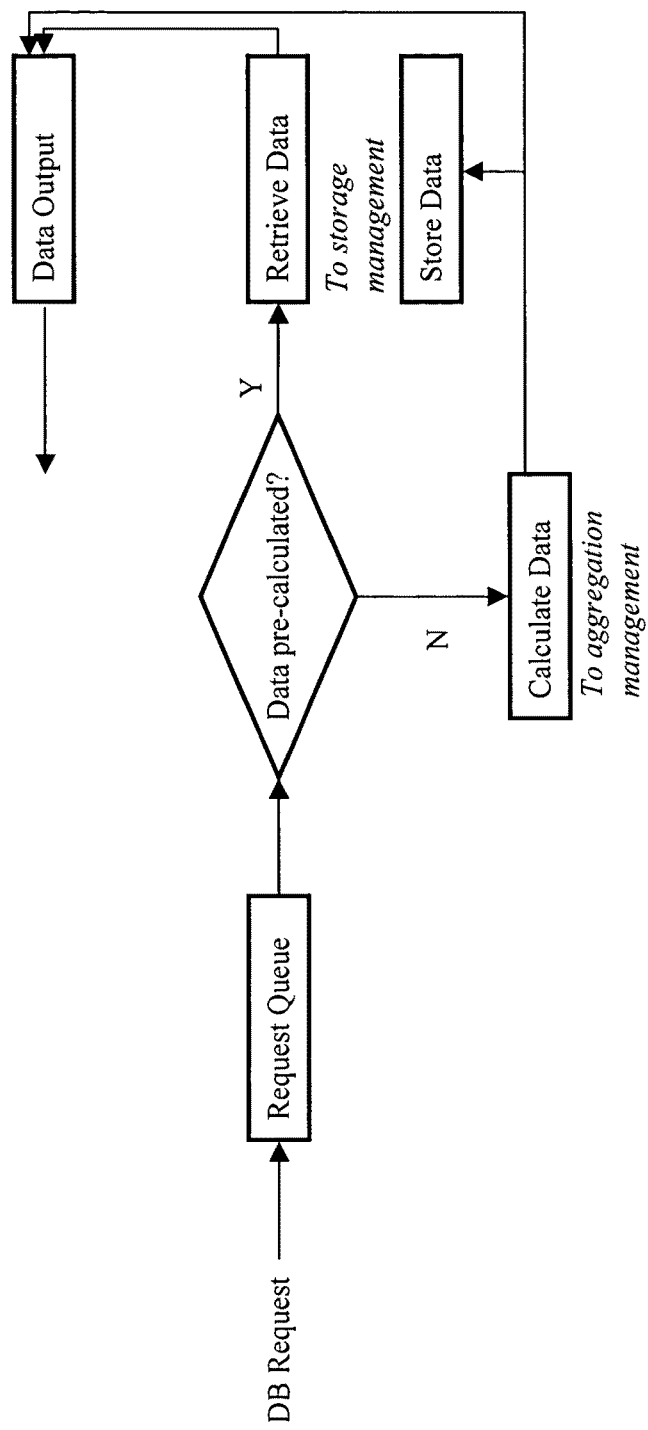
FIG. 6D is a flow chart representation of the primary operations carried out by the (DB) request serving mechanism within the MDD control module shown in FIG. 6B.
Figure 6E:
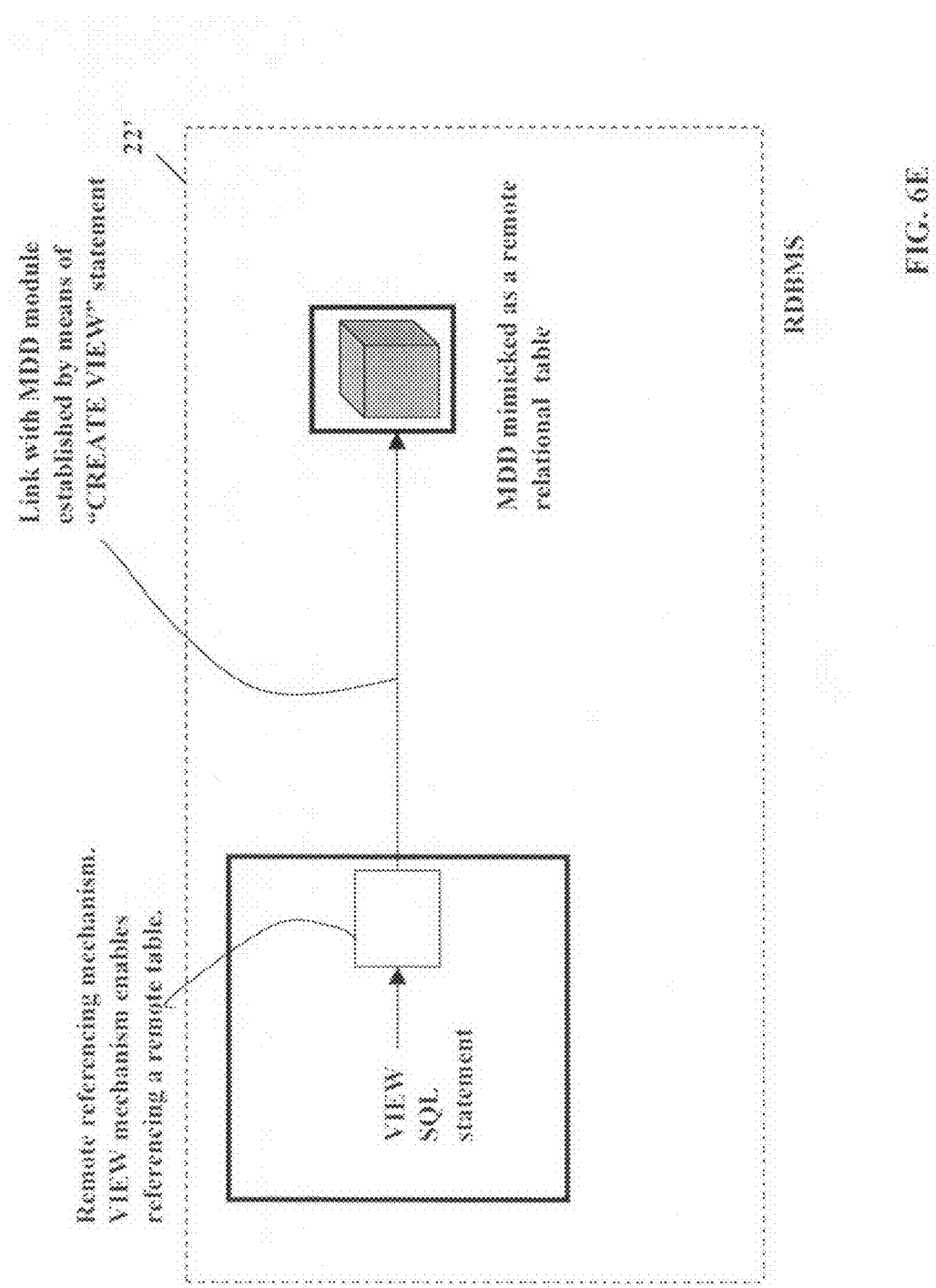
FIG. 6E is a schematic representation of the view mechanism of the RDBMS that enables users to query on the aggregated data generated and/or stored in the MDD Aggregation module according to the present invention.
Figure 6F:
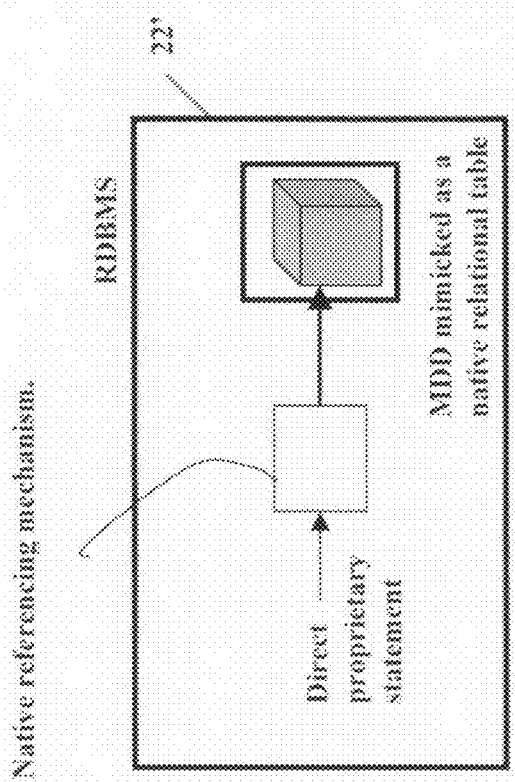
FIG. 6F is a schematic representation of the trigger mechanism of the RDBMS that enables users to query on the aggregated data generated and/or stored in the MDD Aggregation module according to the present invention.

The SQL handling mechanism shown in FIG. 6D is controlled by the MDD control module. Requests are queued and served one by one. If the required data is already pre-calculated, then it is retrieved by the MDD handler and returned to the client. Otherwise, the required data is calculated "on-the-fly" by the aggregation engine, and the result moved out to the client, while simultaneously stored by the MDD handler, shown in FIG. 6C.

Figure 7A:
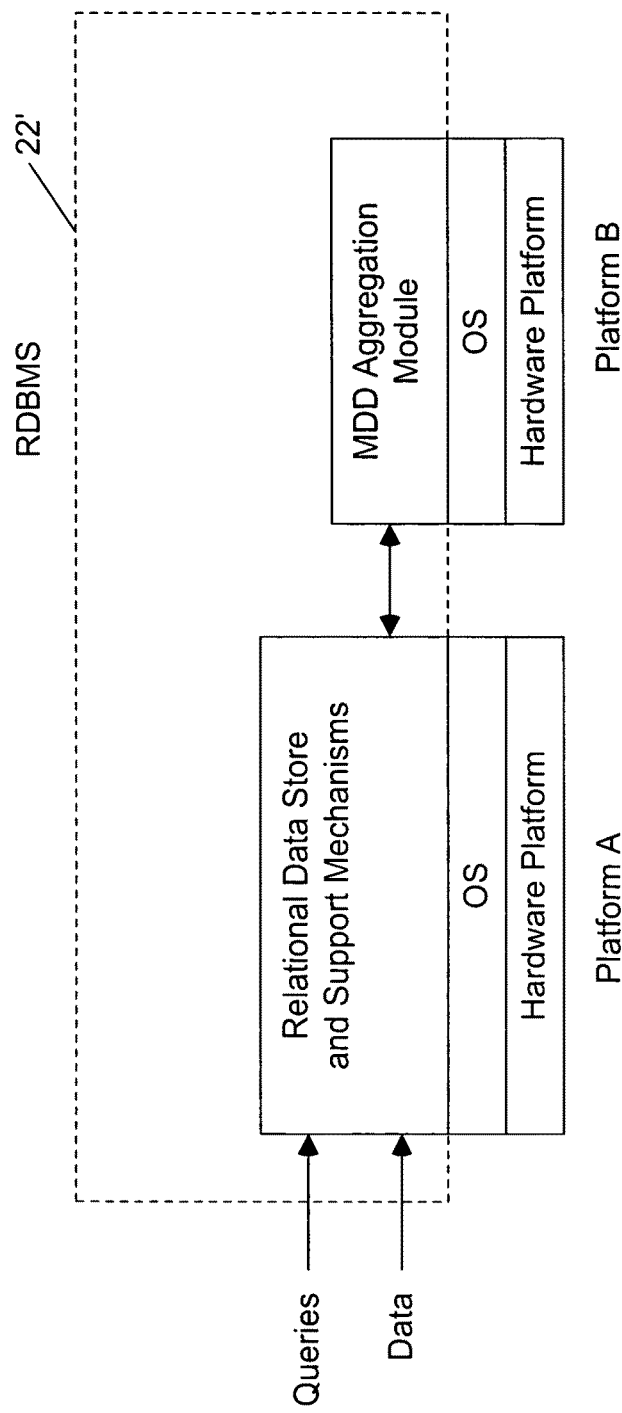
FIG. 7A shows a separate-platform implementation of the RDBMS system of the illustrative embodiment shown in FIG. 6A, wherein the query handling, fact table(s) and dictionary of the RDBMS resides on a separate hardware platform and/or OS system from that used to run the MDD Aggregation Module of the present invention.
Figure 7B:
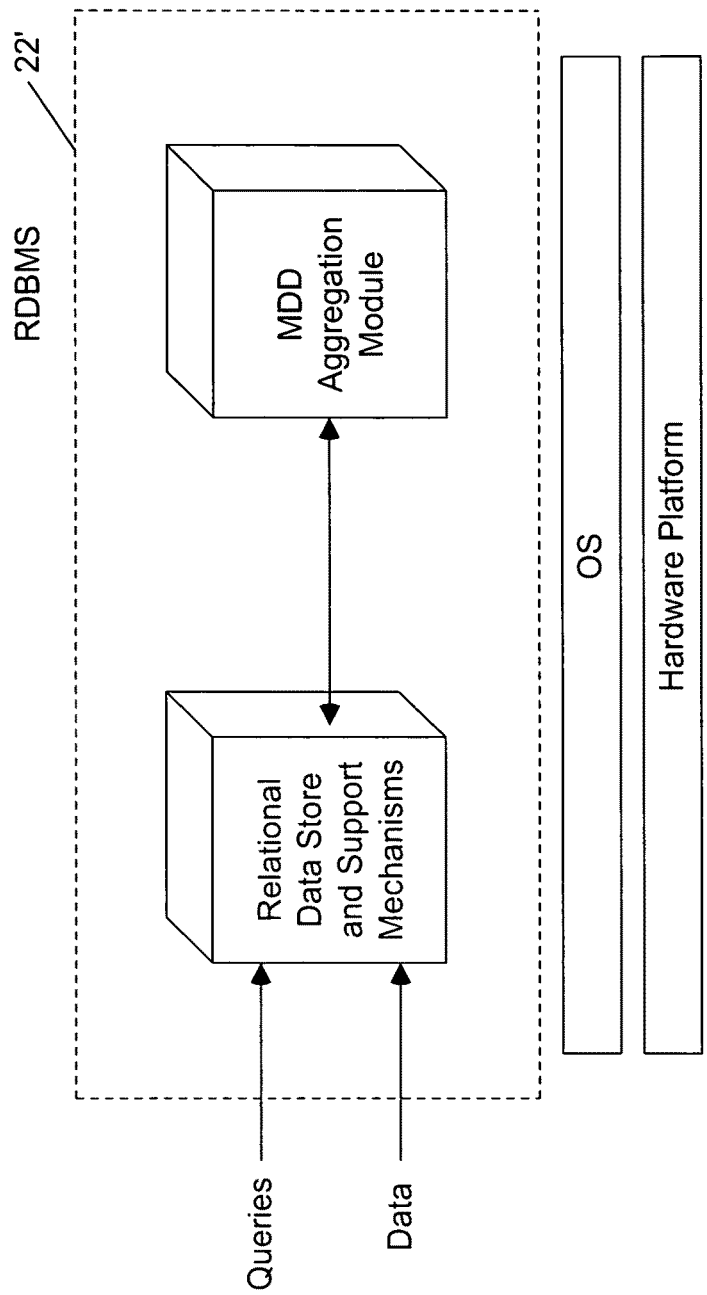
FIG. 7B shows a common-platform implementation of the RDBMS system of the illustrative embodiment shown in FIG. A, wherein the query handling, fact table(s) and dictionary of the RDBMS shares the same hardware platform and operating system (OS) that used to run the MDD Aggregation Module of the present invention.

FIGS. 7A and 7B outline two different implementations of the RDBMS system of the present invention. In both implementations, the query handler of the RDBMS system supplies aggregated results retrieved from the MDD to a client.

FIG. 7A shows a separate-platform implementation of the RDBMS system of the illustrative embodiment shown in FIG. 6A, wherein the support mechanisms (query handling) and relational data store (fact table(s) and dictionary) of the RDBMS resides on a separate hardware platform and/or OS system from that used to run the MDD Aggregation Module. In this type of implementation, it is even possible to run parts of the RDBMS system and the MDD Aggregation Module on different-type operating systems (e.g. NT, Unix, MAC OS).

FIG. 7B shows a common-platform implementation of the RDBMS system of the illustrative embodiment shown in FIG. A, wherein the support mechanisms (query handling) and the relational data store (fact table(s) and dictionary) of the RDBMS shares the same hardware platform and operating system (OS) that used to run the MDD Aggregation Module.

FIG. 8A shows a table setting forth the benchmark results of the MDD aggregation module, in accordance with the principles of the present invention. The platform and OS is realized using a Pentium II 450 Mhz, 1 GB RAM, 18 GB Disk, running the Microsoft NT operating system. The six (6) data sets shown in the table differ in number of dimensions, number of hierarchies, measure of sparcity and data size. A comparison with ORACLE Express, a major OLAP server, is made. It is evident that the MDD aggregation module of the present invention outperforms currently leading aggregation technology by more than an order of magnitude.☐

Preferably, the MDD aggregation module of the RDBMS of the present invention supports a segmented data aggregation method as described in FIGS. 9A through 9C2. These figures outline a simplified setting of three dimensions only; however, the following analysis applies to any number of dimensions as well.

The data is being divided into autonomic segments to minimize the amount of simultaneously handled data. The initial aggregation is practiced on a single dimension only, while later on the aggregation process involves all other dimensions.

At the first stage of the aggregation method, an aggregation is performed along dimension 1. The first stage can be performed on more than one dimension. As shown in FIG. 9A, the space of the base data is expanded by the aggregation process.

In the next stage shown in FIG. 9B, any segment along dimension 1, such as the shown slice, can be separately aggregated along the remaining dimensions, 2 and 3. In general, for an N dimensional system, the second stage involves aggregation in N−1 dimensions.

The principle of data segmentation can be applied on the first stage as well. However, only a large enough data set will justify such a sliced procedure in the first dimension. Actually, it is possible to consider each segment as an N−1 cube, enabling recursive computation.

It is imperative to get aggregation results of a specific slice before the entire aggregation is completed, or alternatively, to have the roll-up done in a particular sequence. This novel feature of the aggregation method of the present invention is that it allows the querying to begin, even before the regular aggregation process is accomplished, and still having fast response. Moreover, in relational OLAP and other systems requiring only partial aggregations, the QDR process dramatically speeds up the query response.

The QDR process is made feasible by the slice-oriented roll-up method of the present invention. ☐After aggregating the first dimension(s), the multidimensional space is composed of independent multidimensional cubes (slices). These cubes can be processed in any arbitrary sequence.

Consequently the aggregation process of the present invention can be monitored by means of files, shared memory sockets, or queues to statically or dynamically set the roll-up order.

In order to satisfy a single query, before the required aggregation result has been prepared, the QDR process of the present invention involves performing a fast on-the-fly aggregation (roll-up) involving only a thin slice of the multidimensional data.

FIG. 9C1 shows a slice required for building-up a roll-up result of the $2^{nd}$ dimension. In case 1, as shown, the aggregation starts from an existing data, either basic or previously aggregated in the first dimension. This data is utilized as a basis for QDR aggregation along the second dimension. In case 2, due to lack of previous data, a QDR involves an initial slice aggregation along dimension 3, and thereafter aggregation along the $2^{nd}$ dimension.

FIG. 9C2 shows two corresponding QDR cases for gaining results in the 3D dimension. Cases 1 and 2 differ in the amount of initial aggregation required in $2^{nd}$ dimension.

FIG. 10A illustrates the "Slice-Storage" method of storing sparse data on storage disks. In general, this data storage method is based on the principle that an ascending-ordered index along aggregation direction, enables fast retrieval of data. FIG. 10A illustrates a unit-wide slice of the multidimensional cube of data. Since the data is sparse, only few non-NA data points exist. These points are indexed as follows. The Data File consists of data records, in which each n−1 dimensional slice is being stored, in a separate record. These records have a varying length, according to the amount of non-NA stored points. For each registered point in the record, $IND_k$ stands for an index in a n-dimensional cube, and Data stands for the value of a given point in the cube.

Figure 10B:
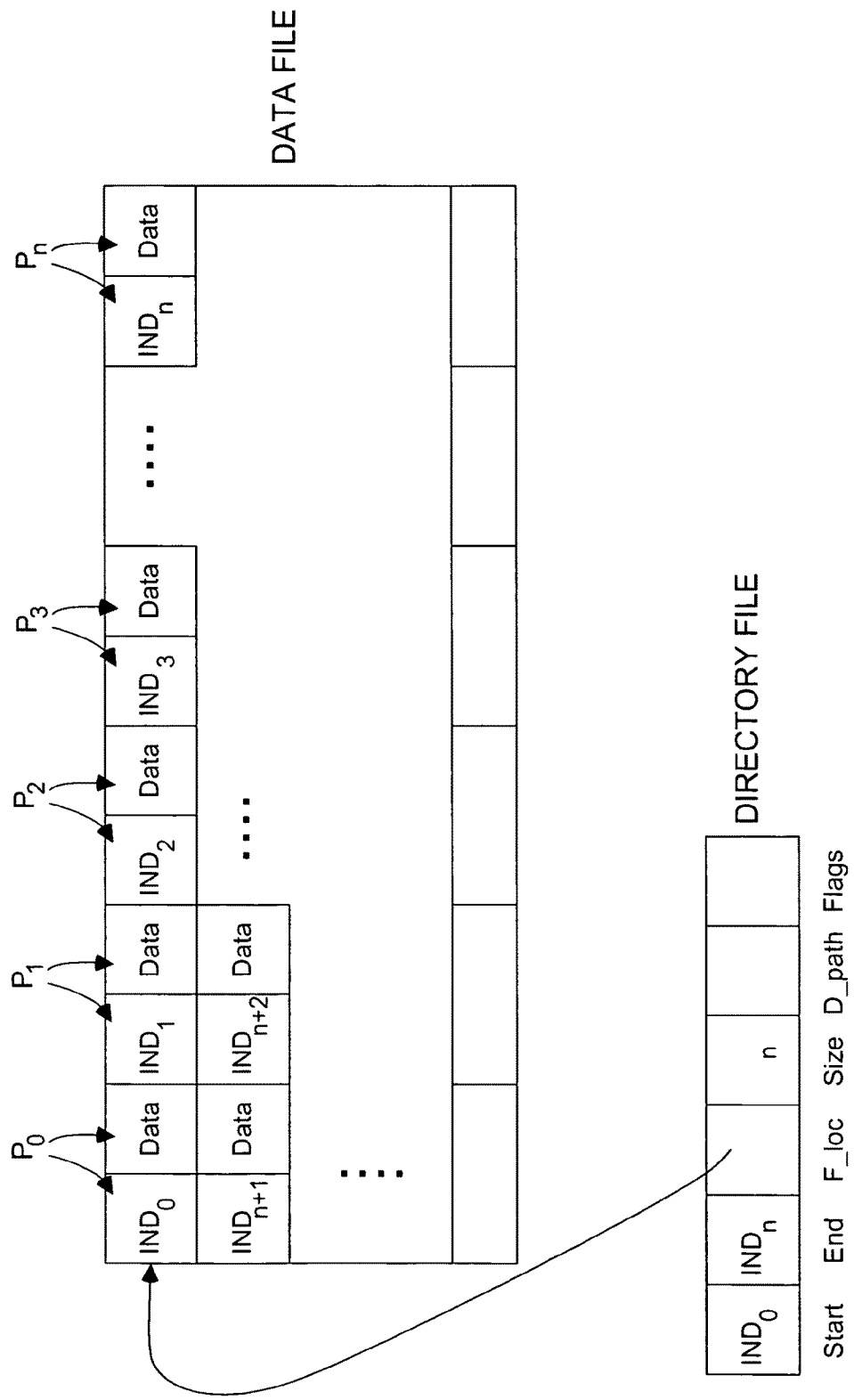
FIG. 10B is a schematic representation of the data organization of data files and the directory file used in the storage of the MDDB of FIG. 6B, and the method of searching for a queried data point therein using a simple binary search technique due to the data files ascending order.

FIG. 10B illustrates a novel method for randomly searching for a queried data point in the MDD of the RDBMS of the present invention by using a novel technique of organizing data files and the directory file used in the storage of the MDD, so that a simple binary search technique can then be employed within the aggregation module of the RDBMS. According to this method, a metafile termed DIR File, keeps pointers to Data Files as well as additional parameters such as the start and end addresses of data record ($IND_0$, $IND_n$), its location within the Data File, record size (n), file's physical address on disk (D_Path), and auxiliary information on the record (Flags).

A search for a queried data point is then performed by an access to the DIR file. The search along the file can be made using a simple binary search due to file's ascending order. When the record is found, it is then loaded into main memory to search for the required point, characterized by its index $IND_k$. The attached Data field represents the queried value. In case the exact index is not found, it means that the point is a NA.

Figure 11A:
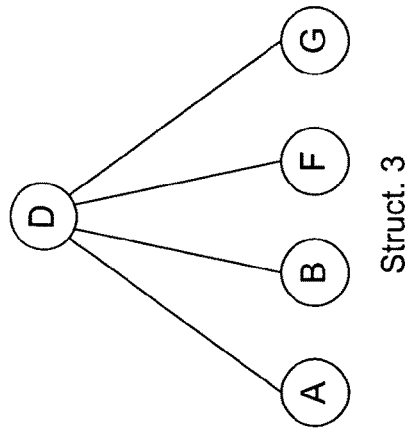
FIG. 11A is a schematic representation of three exemplary multi-hierarchical data structures for storage of data within the MDDB of FIG. 6B, having three levels of hierarchy, wherein the first level representative of base data is composed of items A, B, F, and G, the second level is composed of items C, E, H and I, and the third level is composed of a single item D, which is common to all three hierarchical structures.
Figure 11A:
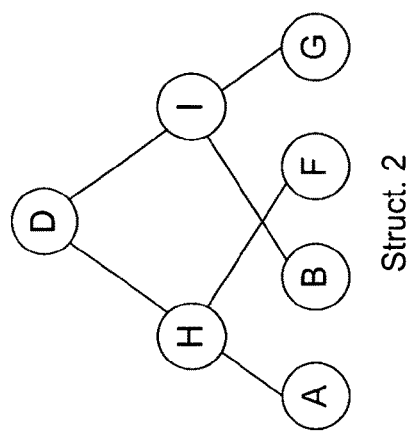
Figure 11A:
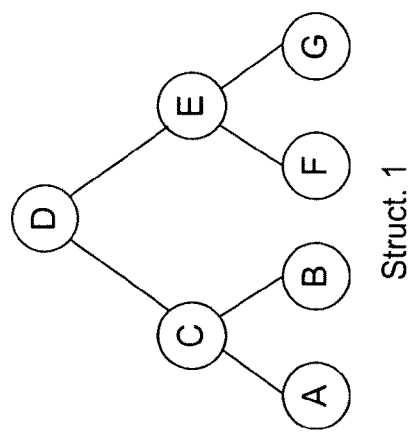
Figure 11B:
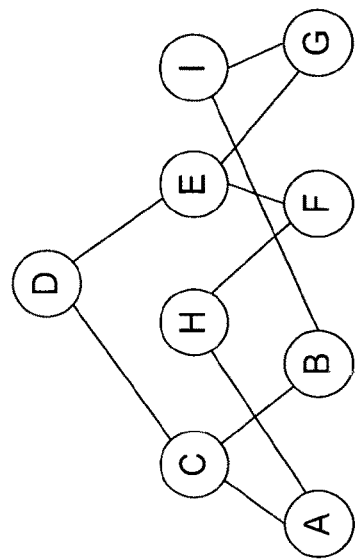
FIG. 11B is a schematic representation of an optimized multi-hierarchical data structure merged from all three hierarchies of FIG. 11A, in accordance with the principles of the present invention.

FIGS. 11A and 11B illustrate a novel method performed by the MDD aggregation module of the RDBMS of the present invention for pre-processing data such that multi-hierarchies in multi-hierarchical structures are optimally merged. According to the devised method, the inner order of hierarchies within a dimension is optimized, to achieve efficient data handling for summations and other mathematical formulas (termed in general "Aggregation"). The order of hierarchy is defined externally. It is brought from a data source to the stand-alone aggregation engine, as a descriptor of data, before the data itself. In the illustrative embodiment, the method assumes hierarchical relations of the data, as shown in FIG. 11A. The way data items are ordered in the memory space of the Aggregation Server, with regard to the hierarchy, has a significant impact on its data handling efficiency.

Notably, when using prior art techniques, multiple handling of data elements, which occurs when a data element is accessed more than once during aggregation process, has been hitherto unavoidable when the main concern is to effectively handle the sparse data. The data structures used in prior art data handling methods have been designed for fast access to a available data (not NA data). According to prior art techniques, each access is associated with a timely search and retrieval in the data structure. For the massive amount of data typically accessed from a Data Warehouse in an OLAP application, such multiple handling of data elements has significantly degraded the efficiency of prior art data aggregation processes. When using prior art data handling techniques, the data element D shown in FIG. 11A must be accessed three times, causing poor aggregation performance.

In accordance with the present invention, the MDD aggregation module of the RDBMS performs the loading of base data and the aggregation and storage of the aggregated data in a way that limits the access of to a singular occurrence, as opposed to multiple occurrences as taught by prior art methods. According to the present invention, elements of base data and their aggregated results are contiguously stored in a way that each element will be accessed only once. This particular order allows a forward-only handling, never backward. Once a base data element is stored, or aggregated result is generated and stored, it is never to be retrieved again for further aggregation. As a result the storage access is minimized. This way of singular handling greatly elevates the aggregation efficiency of large data bases. The data element D, as any other element, is accessed and handled only once.

FIG. 11A shows an example of a multi-hierarchical database structure having 3 hierarchies. As shown, the base data includes the items A, B, F, and G. The second level is composed of items C, E, H and I. The third level has a single item D, which is common to all three hierarchical structures. In accordance with the method of the present invention, a minimal computing path is always taken. For example, according to the method of the present invention, item D will be calculated as part of structure 1, requiring two mathematical operations only, rather than as in structure 3, which would need four mathematical operations. FIG. 11B depicts an optimized structure merged from all three hierarchies.

Figure 12:
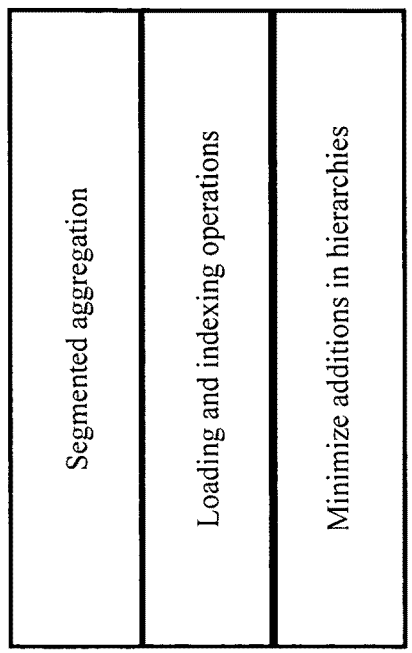
FIG. 12 is a schematic representation showing the levels of operations performed by the stand-alone Aggregation Server of FIG. 6B, summarizing the different enabling components for carrying out the method of segmented aggregation in accordance with the principles of the present invention.

FIG. 12 summarizes the different enabling components for segmented aggregation. The minimized operations in handling multi-hierarchies need analysis of the base data. It greatly optimizes data handling and contributes to aggregation speed. Based on this technology loading and indexing operations become very efficient, minimizing memory and storage access, and speeding up storing and retrieval operations. On top of all the enabling technologies is the segmented aggregation technique, not just outperforming by orders of magnitude the prior-art aggregation algorithms, but also enabling the unique QDR which waves out the need of waiting for full pre-aggregation.

Figure 13:
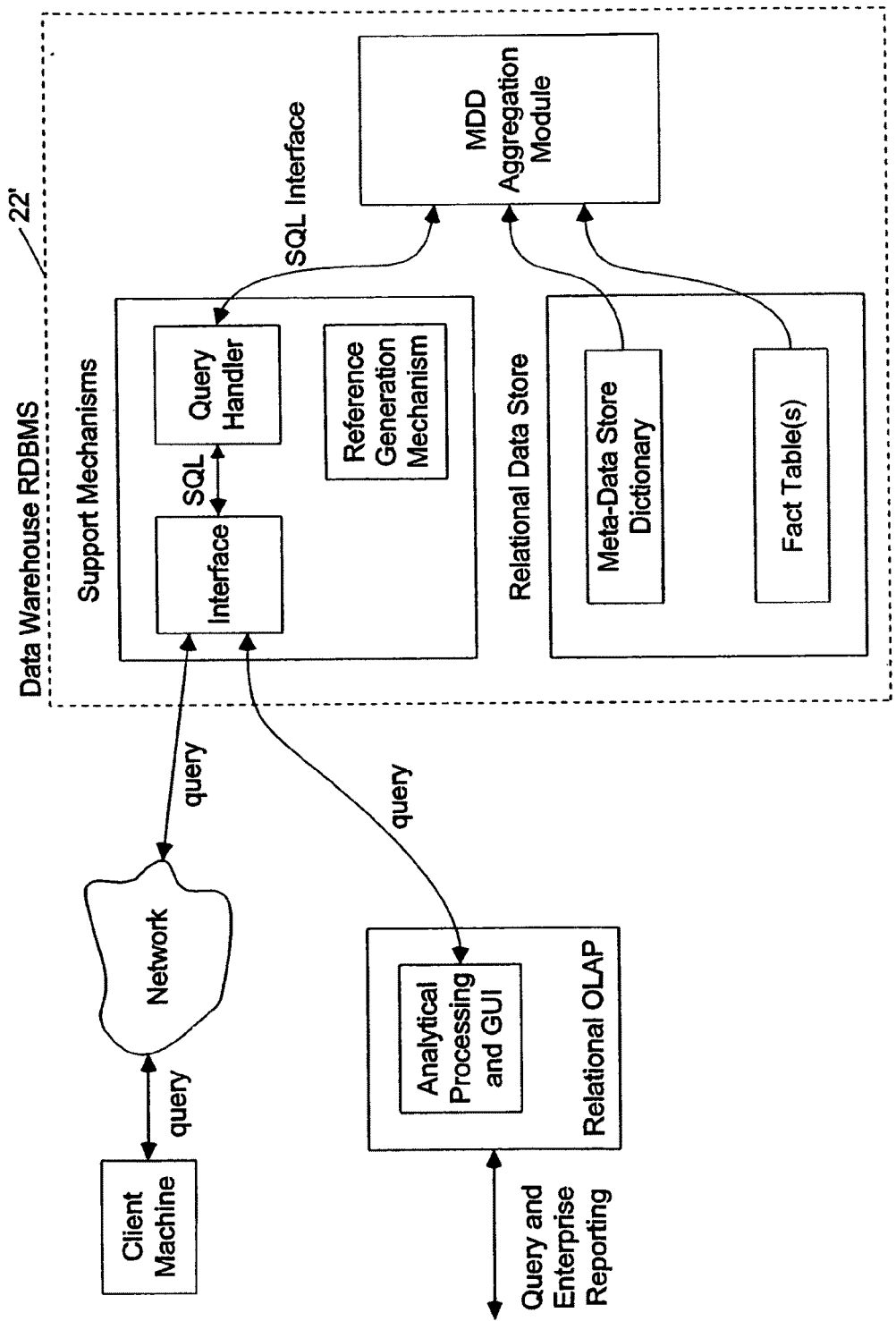
FIG. 13 is a schematic representation of the RDBMS of the present invention shown as a component of a central data warehouse, serving the data storage and aggregation needs of a ROLAP system (or other OLAP system).

FIG. 13 shows the improved RDBMS of the present invention as a component of a data warehouse, serving the data storage and aggregation needs of a ROLAP system (or other OLAP systems alike). Importantly, the improved RDBMS of the present invention provides flexible, high-performance access and analysis of large volumes of complex and interrelated data. Moreover, the improved Data Warehouse RDBMS of the present invention can simultaneously serve many different kinds of clients (e.g. data mart, OLAP, URL) and has the power of delivering an enterprise-wide data storage and aggregation in a cost-effective way. This kind of system eliminates redundancy over the group of clients, delivering scalability and flexibility. Moreover, the improved RDBMS of the present invention can be used as the data store component of in any informational database system as described above, including data analysis programs such as spread-sheet modeling programs, serving the data storage and aggregation needs of such systems.

Functional Advantages Gained by the Improved RDBMS of the Present Invention

The features of the RDBMS of the present invention, provides for dramatically improved response time in handling queries issued to the RDBMS that involve aggregation, thus enabling enterprise-wide centralized aggregation. Moreover, in the preferred embodiment of the present invention, users can query the aggregated data in an manner no different than traditional queries on an RDBMS.

The method of Segmented Aggregation employed by the novel RDBMS of the present invention provides flexibility, scalability, the capability of Query Directed Aggregation, and speed improvement.

Moreover, the method of Query Directed Aggregation (QDR) employed by the novel RDBMS of the present invention minimizes the data handling operations in multi-hierarchy data structures, eliminates the need to wait for full aggregation to be complete, and provides for build-up of aggregated data required for full aggregation.

It is understood that the System and Method of the illustrative embodiments described herein above may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A database management system comprising:
   a relational data store storing fact data;
   a multi-dimensional data store configured to store aggregated fact data in a multi-dimensional data structure;
   a communication interface operably connected between the relational data store and the multi-dimensional data store for the communication of fact data from the relational data store to the multi-dimensional data store and for the communication of aggregated fact data from the multi-dimensional data store to the relational data store; and
   a computer system comprising computer hardware, the computer system programmed to implement:
   a multi-dimensional data store generation mechanism configured to generate the multi-dimensional data store by calculating aggregated fact data from data stored in the relational data store according to a multi-dimensional data aggregation process, and store the aggregated fact data in the multi-dimensional data store;
   a query servicing mechanism configured to service one or more natural language queries from a user, the query servicing mechanism comprising:
      a query processing mechanism configured to process a given natural language query, the query processing mechanism configured to:
         make a determination of whether servicing the given natural language query needs data stored in the relational data store or the multi-dimensional data store; and
         generate one or more structured query language ("SQL") statements, wherein the SQL statements refer to the relational data store or the multi-dimensional data store based on said determination,
      wherein the multi-dimensional data aggregation process comprises:
      (i) determining if the aggregated fact data needed to service the given natural language query is already pre-calculated and stored within the multi-dimensional data store, and
         in response to determining that the aggregated fact data needed to service the given natural language query is already pre-calculated and stored within the multi-dimensional data store,
         retrieving the pre-calculated fact data and returning the retrieved pre-calculated fact data to the query processing mechanism; and
      (ii) in response to determining that the needed fact data is not already pre-calculated and stored within the multi-dimensional data store, calculating the needed aggregated fact data on demand, and automatically forwarding the aggregated fact data to the query processing mechanism.

2. The database management system of claim 1, wherein the query servicing mechanism is implemented in a module within the database management system.

3. The database management system of claim 2, wherein the database management system is configured to receive the given natural language query from a user via a web-enabled browser, and the database management system is configured to communicate the given natural language query to the query servicing mechanism.

4. A method comprising:
   by a computer system comprising computer hardware, including
   a relational data store storing fact data, and
   a multi-dimensional data store configured to store aggregated fact data in a multi-dimensional data structure:
      generating the multi-dimensional data store by calculating aggregated fact data from data stored in the relational data store according to a multi-dimensional data aggregation process, and storing the aggregated fact data in the multi-dimensional data store,
      receiving one or more natural language queries from a user;
      determining whether servicing a given natural language query of the one or more natural language queries needs data stored in the relational data store or in the multi-dimensional data store, wherein the relational data store is configured to communicate fact data to the multi-dimensional data store and the multi-dimensional data store is configured to communicate aggregated fact data to the relational data store; and
      generating one or more SQL statements, wherein the SQL statements refer to the relational data store or the multi-dimensional data store based on said determining,
   wherein the multi-dimensional data aggregation process comprises:
   (i) in response to determining that the aggregated fact data needed to service the given natural language query is already pre-calculated and stored within the multi-dimensional data store, then the pre-calculated aggregated fact data is retrieved and returned to the user; and
   (ii) in response to determining that the needed fact data is not already pre-calculated and stored within the multi-dimensional data store, then the needed aggregated fact data is calculated on demand, and the aggregated fact data is automatically forwarded to the user.

5. The method of claim 4, the method further comprising receiving at the computer system a natural language query over a network from a user browser.

6. A non-transitory computer-readable medium encoded with instructions thereon, wherein the instructions are readable by a computing device in order to cause the computing device to perform operations comprising:
   receiving one or more natural language queries from a user;
   generating a multi-dimensional data store by calculating aggregated fact data from data stored in a relational data store according to a multi-dimensional data aggregation process, and store the aggregated fact data in the multi-dimensional data store,
   determining whether servicing a given natural language query needs data stored in a the relational data store or in a the multi-dimensional data store, wherein the multi-dimensional data store is generated via a segmented aggregation process involving aggregation along multiple dimensions in a determined sequence comprising aggregation involving a first dimension followed by aggregation involving one or more other dimensions; and generating one or more SQL statements, wherein the SQL statements refer to the relational data store or the multi-dimensional data store generated via the segmented aggregation process based on said determining, wherein the multi-dimensional data aggregation process comprises:

(ii) determining if the aggregated fact data needed to service the given natural language query is already pre-calculated and stored within the multi-dimensional data store, and in response to determining that the aggregated fact data needed to service the given natural language query is already pre-calculated and stored within the multi-dimensional data store, retrieving the pre-calculated fact data and returning the retrieved pre-calculated fact data to the query processing mechanism; and (ii) in response to determining that the needed fact data is not already pre-calculated and stored within the multi-dimensional data store, calculating the needed aggregated fact data on demand, and automatically forwarding the aggregated fact data to the query processing mechanism.

7. The computer-readable medium of claim 6, the operations further comprising receiving a natural language query over a network from a user browser.

* * * * *